United States Patent [19]
Bräuer

[11] Patent Number: 5,597,969
[45] Date of Patent: Jan. 28, 1997

[54] MUSIC SLIDE RULE REFERENCE DEVICE AND SYSTEM

[75] Inventor: Karl K. K. M. Bräuer, San Jose, Calif.

[73] Assignee: Leslie Mayr, San Jose, Calif.

[21] Appl. No.: 202,781

[22] Filed: Feb. 23, 1994

[51] Int. Cl.$^6$ .................................. G09B 15/02
[52] U.S. Cl. .......................... 84/473; 84/477 R
[58] Field of Search .................. 84/473, 485 SR, 84/601, 470 R, 471 SR, 477 R, 485 R

[56] References Cited

U.S. PATENT DOCUMENTS

| | | | |
|---|---|---|---|
| 3,867,866 | 2/1975 | Adams | 84/473 |
| 3,949,640 | 4/1976 | Cournoyer | 84/473 |
| 3,968,722 | 7/1976 | Cournoyer | 84/473 |
| 3,974,733 | 8/1976 | Cournoyer | 84/473 |
| 4,031,797 | 6/1977 | Schmoyer | 84/470 |
| 4,037,518 | 7/1977 | Garcia Lorenzen | 84/474 |
| 4,069,735 | 1/1978 | Bertram | 84/474 |
| 4,074,607 | 2/1978 | Bond | 84/471 SR |
| 4,307,649 | 12/1981 | Arthur | 84/485 SR |
| 4,552,052 | 11/1985 | Lee | 84/473 |
| 4,602,550 | 7/1986 | Dadi et al. | 84/473 |
| 4,620,471 | 11/1986 | Dunn | 84/480 |
| 4,677,893 | 7/1987 | Fahnestock | 84/473 |
| 4,960,029 | 10/1990 | Nelson | 84/473 |
| 4,961,362 | 10/1990 | Gunn | 84/474 |
| 5,107,744 | 4/1992 | Bradley | 84/480 |
| 5,113,739 | 5/1992 | Thomson | 84/473 |

OTHER PUBLICATIONS

The Willis Music Co., Keyboard Chord Calculator, 1983.
Song Dex, Song Dex Twin Chord Chart, 1953.
King Music Publishing Corp., Song Dex Twin Chord Chart, 1951 & 1953.

Primary Examiner—Patrick J. Stanzione
Attorney, Agent, or Firm—Oblon, Spivak, McClelland, Maier & Neustadt P.C.

[57] ABSTRACT

A musical slide rule having a slide rule body in the form of a flattened sleeve having two flat surfaces defining a front and back side at two substantially parallel edges and having two open opposing ends. The front and back sides have spatially arranged (horizontally and vertically) apertures and music data printed thereby for displaying cooperative music data which is printed on a flat slide which is inserted through and between the front and back side of the slide rule body at one of the two opposing ends. The slide is operatively positioned by the user to display a correlation between the music data of the slide (showing through the apertures of the slide rule body) and the music data of the rule body. In cooperative combination, the slide and rule provide a useful apparatus and system to a novice or expert musical alike, for displaying substantially all music data including: (1) chord tones and intervals for all keys; (2) scales with various numbers of tones from three to thirteen; (3) a vast variety of intervals, modulations and resolutions to aid the composer, with the various tones displayed for any key; (4) information for transcribing and transposing a score from one clef to another; (5) a universal transposition portion; as well as, (6) a specific guide to individual instruments defining their key relative to the concert key, and providing the appropriate transposition interval.

8 Claims, 65 Drawing Sheets

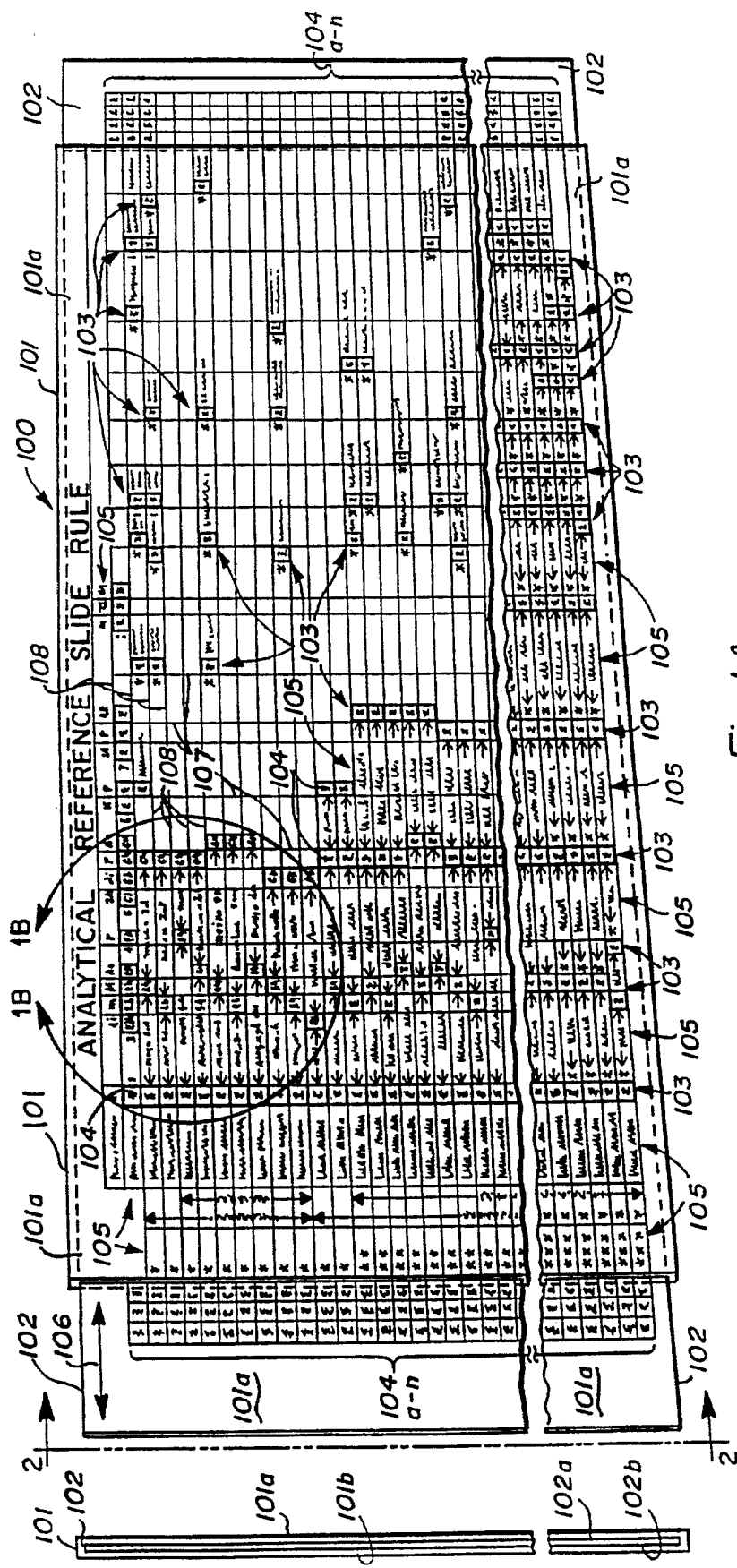

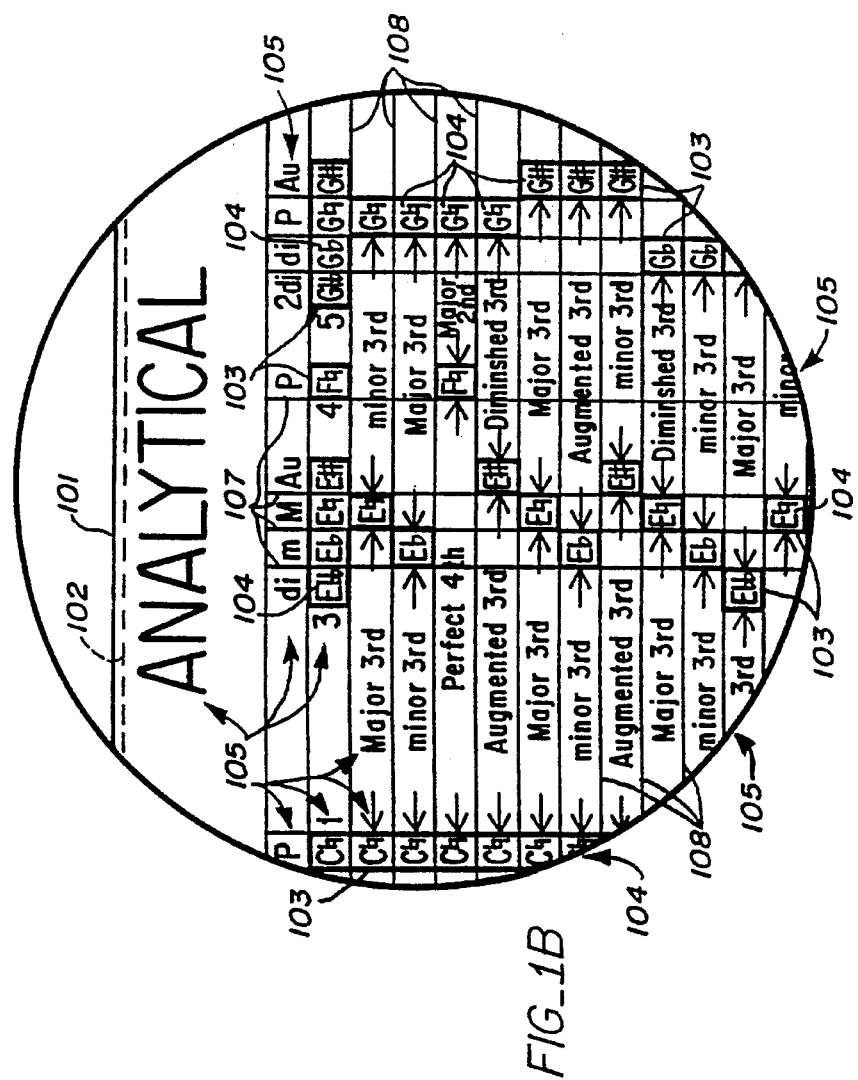
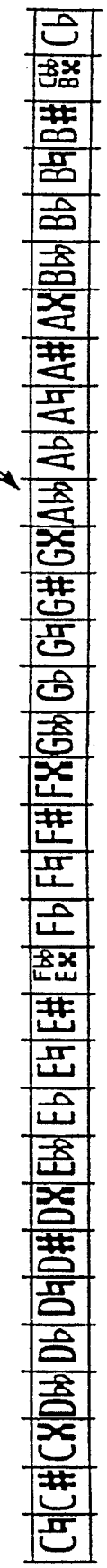
FIG_1B
FIG_1C

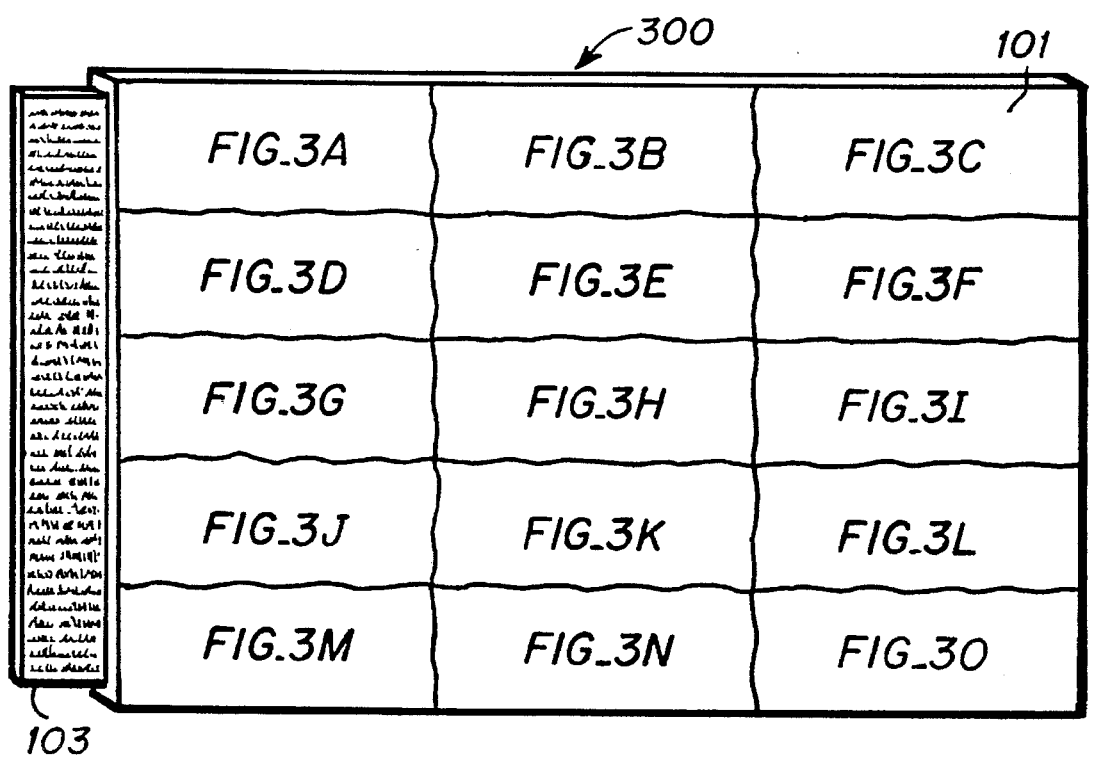
FIG_3

| 300 | | 304 305 306 307 303 | 101a | 301 → Interval Qualified |
|---|---|---|---|---|
| | | | | 302 → Interval Classified |
| | 1 | Consonant chords | M3-P5 | Major (Perfect Major) |
| Three note chords (Triads) with: | 2 | | m3-P5 | Minor (Perfect Minor) |
| | 3 | Dissonant chords | P4-P5 | Major Suspended |
| | 4 | | a3-P5 | Perfect with Augmented 3rd |
| | 5 | | M3-a5 | Augmented |
| | 6 | | m3-a5 | Augmented with Minor 3rd (Enharmonic) (Neapolitan) |
| | 7 | | a3-a5 | Augmented with Augmented 3rd |
| | 8 | | M3-d5 | Diminished with Major 3rd |
| | 9 | | m3-d5 | Diminished (Leading Tone Triad) |
| | 10 | | d3-d5 | Diminished with Diminished 3rd (Italian Sixth) |
| | 11 | Consonant chords | M3-P5 - M6 | Major 6th (Major with added 6th) |
| | 12 | | m3-P5 - M6 | Minor 6th (Minor with Added 6th) |
| Four note chords (Tetrads) with: | 13 | Dissonant chords | M3-P5 - M7 | Major 7th Chord (Major Triad with Major 7th) |
| | 14 | | m3-P5 - M7 | Major 7th with Minor 3rd Chord (Minor Triad with Major 7th) |
| | 15 | | a3-P5 - M7 | Major 7th with Augmented 3rd Chord |
| | 16 | | M3-a5 - M7 | Major 7th - Augmented 5th Chord (Augmented Triad with Major 7th) |
| | 17 | | a3-a5 - M7 | Major 7th - Augmented 3rd and 5th Chord |
| | 18 | | M3-P5 - m7 | Dominant 7th Chord (Major Triad with Minor 7th) |
| | 19 | | m3-P5 - m7 | Minor 7th Chord (Minor Triad with Minor 7th) |
| | 20 | | P4-P5 - m7 | Seventh Suspended Chord (Major Suspended- Minor 7th Chord) |
| | 21 | | M3-a5 - m7 | Seventh - Augmented 5th Chord (Augmented Triad with Minor 7th) |
| | 22 | | m3-a5 - m7 | Minor 7th - Augmented-5th Chord (Enharmonic Triad with Minor 7th) |
| | 23 | | M3-d5 - m7 | Minor 7th with Diminished 5th Chord (French Sixth) |
| | 24 | | m3-d5 - m7 | Minor 7th with Diminished 5th Chord (Leading Tone 7th Chord) |
| | 25 | | d3-d5 - m7 | Minor 7th - Diminished 3rd and 5th Chord |

FIG.-3A

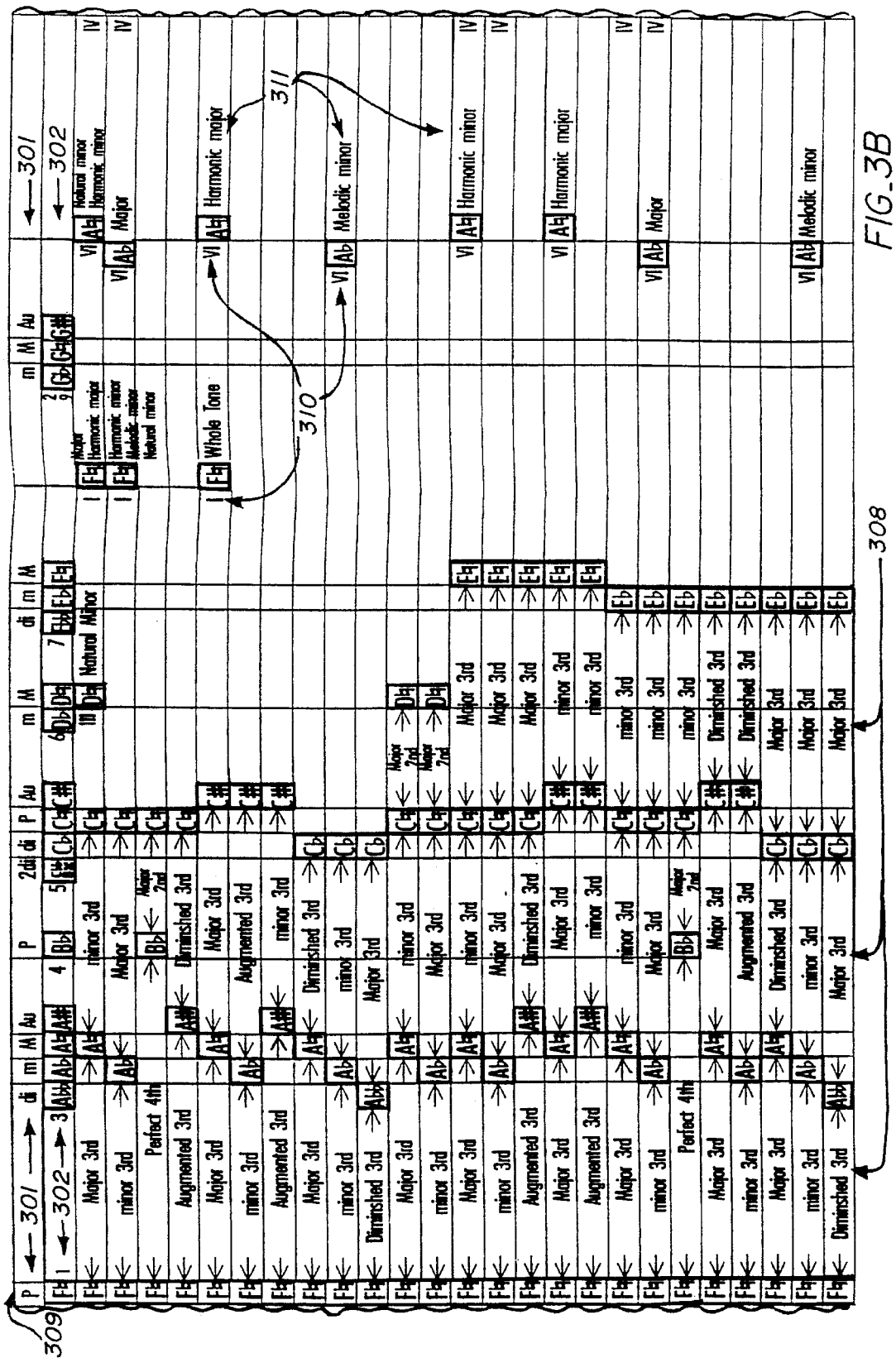
FIG_3B

FIG._3G

| | Interval Qualified → | P | | | m M | | Au | | di P Au |
|---|---|---|---|---|---|---|---|---|---|
| | Interval Classified → | 1 | | | 3 | | 4 | | 5 |
| 54 | M3- P5 - M7- M9- P11 11th Chord with a Major 7th and Diminished Triad | ⬇ | Major 3rd | ⬇ | | ⬆ | minor 3rd | | ⬇ |
| 55 | m3- P5 - M7- M9- P11 11th Chord with a Minor-Major 7th and Diminished Triad | ⬇ | minor 3rd | | ⬇ | | Major 3rd | ⬆ | ⬇ |
| 56 | M3- α5 - M7- M9- P11 11th Chord with a Major 7th - Augmented 5th and Diminished Triad | ⬇ | Major 3rd | ⬆ | | | Major 3rd | ⬆ | ⬇ |
| 57 | M3- P5 - m7- M9- P11 11th Chord with a Dominant 7th and Major Triad | ⬇ | Major 3rd | | ⬇ | | minor 3rd | ⬆ | ⬇ |
| 58 | m3- P5 - m7- M9- P11 11th Chord with a Minor-Minor 7th and Major Triad | ⬇ | minor 3rd | ⬆ | | ⬆ | Major 3rd | | ⬇ |
| 59 | m3- d5 - m7- M9- P11 11th Chord with a Leading Tone 7th and Major Triad | ⬇ | minor 3rd | ⬆ | | ⬆ | minor 3rd | | ⬇ |
| 60 | M3- P5 - M7- m9- P11 11th Chord with a Major 7th and Diminished Triad with Diminished 3rd | ⬇ | Major 3rd | | ⬇ | ⬆ | minor 3rd | | ⬇ |
| 61 | M3- P5 - m7- m9- P11 11th Chord with a Dominant 7th and Minor Triad | ⬇ | Major 3rd | | ⬇ | ⬆ | minor 3rd | | ⬇ |
| 62 | m3- P5 - m7- m9- P11 11th Chord with a Minor-Minor 7th and Minor Triad | ⬇ | minor 3rd | ⬆ | | ⬆ | Major 3rd | | ⬇ |
| 63 | m3- d5 - m7- m9- P11 11th Chord with a Leading tone 7th Chord and Minor Triad | ⬇ | minor 3rd | ⬆ | | ⬆ | minor 3rd | | ⬇ |
| 64 | m3- d5 - d7 - m9- P11 11th Chord with a Diminished 7th and Augmented Triad | ⬇ | minor 3rd | ⬆ | | | Major 3rd | ⬆ | ⬇ |
| 65 | M3- P5 - M7- M9- α11 11th Chord with a Major 7th and Diminished Triad with Major 3rd | ⬇ | Major 3rd | | ⬇ | | Major 3rd | ⬆ | ⬇ |
| 66 | M3- P5 - M7- M9- α11 11th Chord with a Major 7th and Minor Triad | ⬇ | Major 3rd | | ⬇ | | Major 3rd | ⬆ | ⬇ |
| 67 | m3- P5 - M7- M9- α11 11th Chord with a Minor-Major 7th and Minor Triad | ⬇ | minor 3rd | ⬆ | | | Major 3rd | ⬆ | ⬇ |
| 68 | M3- P5 - M7- M9- α11 11th Chord with a Major 7th - Augmented 5th and Minor Triad | ⬇ | Major 3rd | | ⬇ | | Major 3rd | ⬆ | ⬇ |
| 69 | M3- P5 - m7- M9- α11 11th Chord with a Dominant 7th and Augmented Triad | ⬇ | Major 3rd | | ⬇ | | Major 3rd | ⬆ | ⬇ |
| 70 | m3- P5 - M7- M9- α11 11th Chord with a Minor-Minor 7th and Augmented Triad | ⬇ | minor 3rd | ⬆ | | | Major 3rd | ⬆ | ⬇ |
| 71 | M3- P5 - m7- M9- α11 11th Chord with a Dominant 7th and Augmented Triad with Minor 3rd | ⬇ | Major 3rd | | ⬇ | | Major 3rd | ⬆ | ⬇ |
| 72 | M3- P5 - M7- m9- α11 11th Chord with a Major 7th and Major Triad | ⬇ | Major 3rd | | ⬇ | | Major 3rd | ⬆ | ⬇ |
| 73 | M3- P5 - m7- m9- α11 11th Chord with a Dominant 7th and Major Triad | ⬇ | Major 3rd | | ⬇ | | Major 3rd | ⬆ | ⬇ |
| 74 | m3- P5 - M7- m9- d11 11th Chord with a Minor- Minor 7th and Diminished Triad | ⬇ | minor 3rd | ⬆ | | | minor 3rd | ⬆ | ⬇ |
| 75 | m3- P5 - m7- m9- d11 11th Chord with a Leading Tone 7th and Diminished Triad | ⬇ | minor 3rd | ⬆ | | | minor 3rd | ⬆ | ⬇ |
| 76 | m3- d5 - d7 - m9- d11 11th Chord with a Diminished 7th and Major Triad | ⬇ | minor 3rd | ⬆ | | | minor 3rd | ⬆ | ⬇ |

← Six note chords (Hexads) with: —→
← Dissonant chords —→

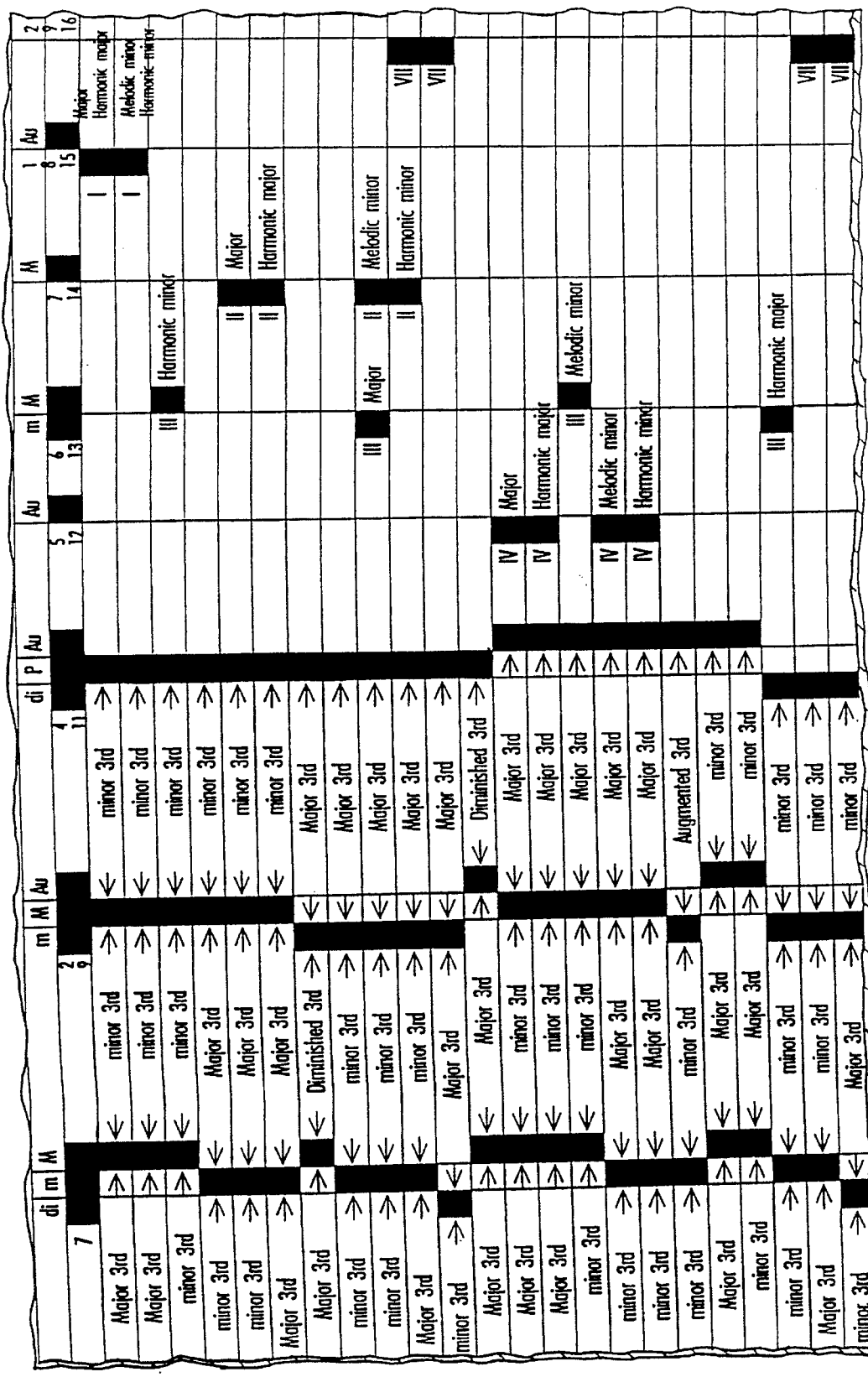
FIG_3H

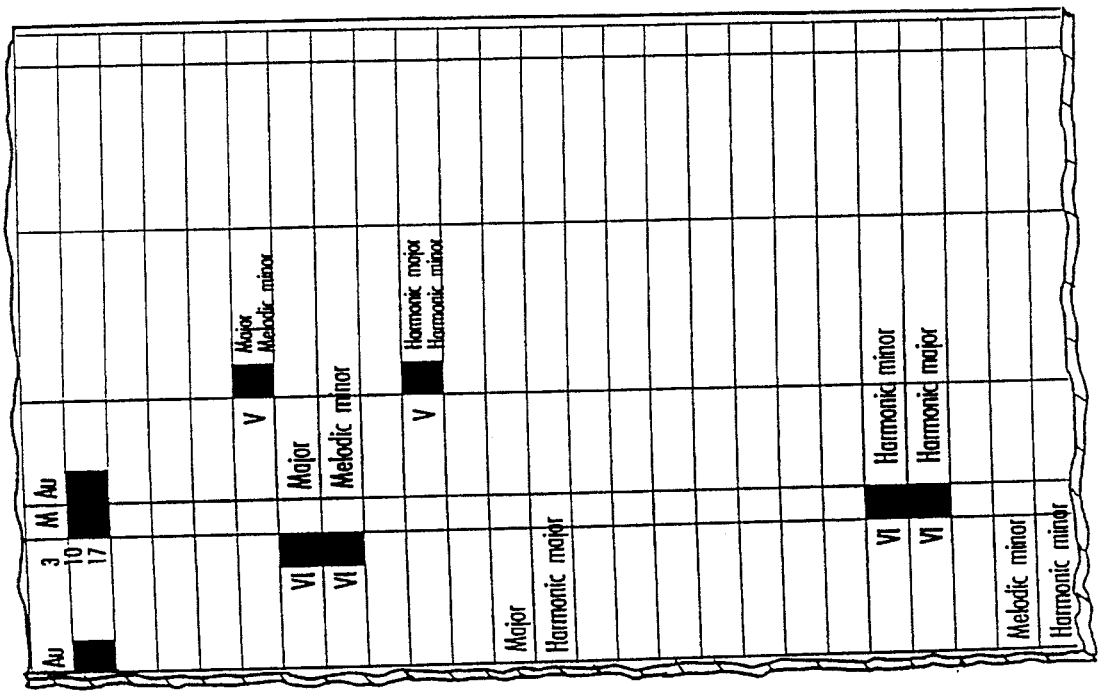
FIG_31

FIG_3J

| # | Seven note chords (Heptads) with: Dissonant chords | | |
|---|---|---|---|
| 77 | M3-P5-M7-M9-P11-M13 13th Chord with a Major 7th and a Leading Tone 7th | Major 3rd | minor 3rd |
| 78 | m3-P5-M7-M9-P11-M13 13th Chord with a Minor-Major 7th and Leading Tone 7th | minor 3rd | Major 3rd |
| 79 | M3-d5-M7-M9-P11-M13 13th Chord with a Major 7th - Aug. 5th and a Leading Tone 7th | Major 3rd | Major 3rd |
| 80 | M3-P5-m7-M9-P11-M13 13th Chord with a Dominant 7th and a Major 7th | Major 3rd | minor 3rd |
| 81 | m3-P5-m7-M9-P11-M13 13th Chord with a Minor 7th and a Major 7th | minor 3rd | Major 3rd |
| 82 | M3-P5-M7-m9-P11-M13 13th Chord with a Major 7th and Minor 7th with Dim. 3rd and 5th | Major 3rd | Major 3rd |
| 83 | m3-P5-m7-m9-P11-M13 13th Chord with a Dominant 7th and a Minor-Major 7th | Major 3rd | minor 3rd |
| 84 | m3-P5-m7-m9-P11-M13 13th Chord with a Minor-Major 7th and a Minor-Major 7th | minor 3rd | Major 3rd |
| 85 | m3-d5-m7-M9-P11-M13 13th Chord with a Leading Tone 7th and a Major 7th | minor 3rd | minor 3rd |
| 86 | m3-d5-m7-m9-P11-M13 13th Chord with a Leading Tone 7th and a Minor - Major 7th | minor 3rd | minor 3rd |
| 87 | M3-P5-M7-a9-P11-M13 13th Chord with a Major 7th and a Minor 7th Diminished 5th | Major 3rd | Major 3rd |
| 88 | M3-P5-m7-M9-a11-M13 13th Chord with a Major 7th and a Minor 7th | Major 3rd | minor 3rd |
| 89 | m3-P5-m7-M9-a11-M13 13th Chord with a Minor-Major 7th and a Minor 7th | Major 3rd | minor 3rd |
| 90 | M3-P5-M7-M9-a11-M13 13th Chord with a Dominant 7th and a Major 7th - Augmented 5th | minor 3rd | Major 3rd |
| 91 | m3-P5-M7-M9-a11-M13 13th Chord with a Major 7th - Augmented 5th and a Minor 7th | minor 3rd | Major 3rd |
| 92 | M3-P5-M7-a9-a11-M13 13th Chord with a Major 7th - Augmented 5th and a Minor 7th | Major 3rd | Major 3rd |
| 93 | M3-d5-M7-a9-a11-M13 13th Chord with a Major 7th - Augmented 5th and a Dominant 7th | Major 3rd | minor 3rd |
| 94 | M3-P5-M7-a9-a11-M13 13th Chord with a Major 7th - Augmented 5th and a Dominant 7th | Major 3rd | Major 3rd |
| 95 | M3-P5-M7-M9-P11-m13 13th Chord with a Major 7th and a leading tone 7th | Major 3rd | minor 3rd |

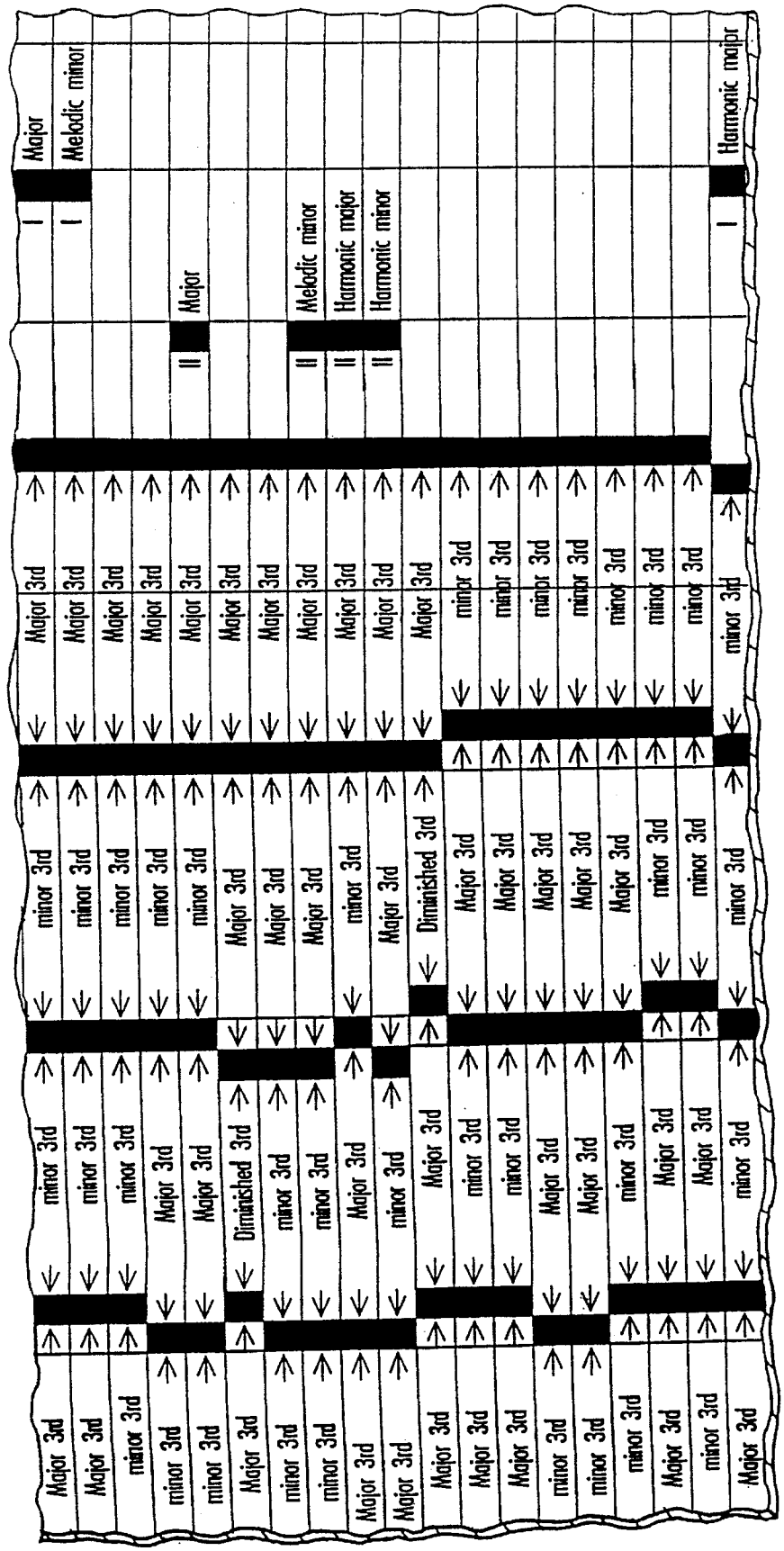
FIG._3K

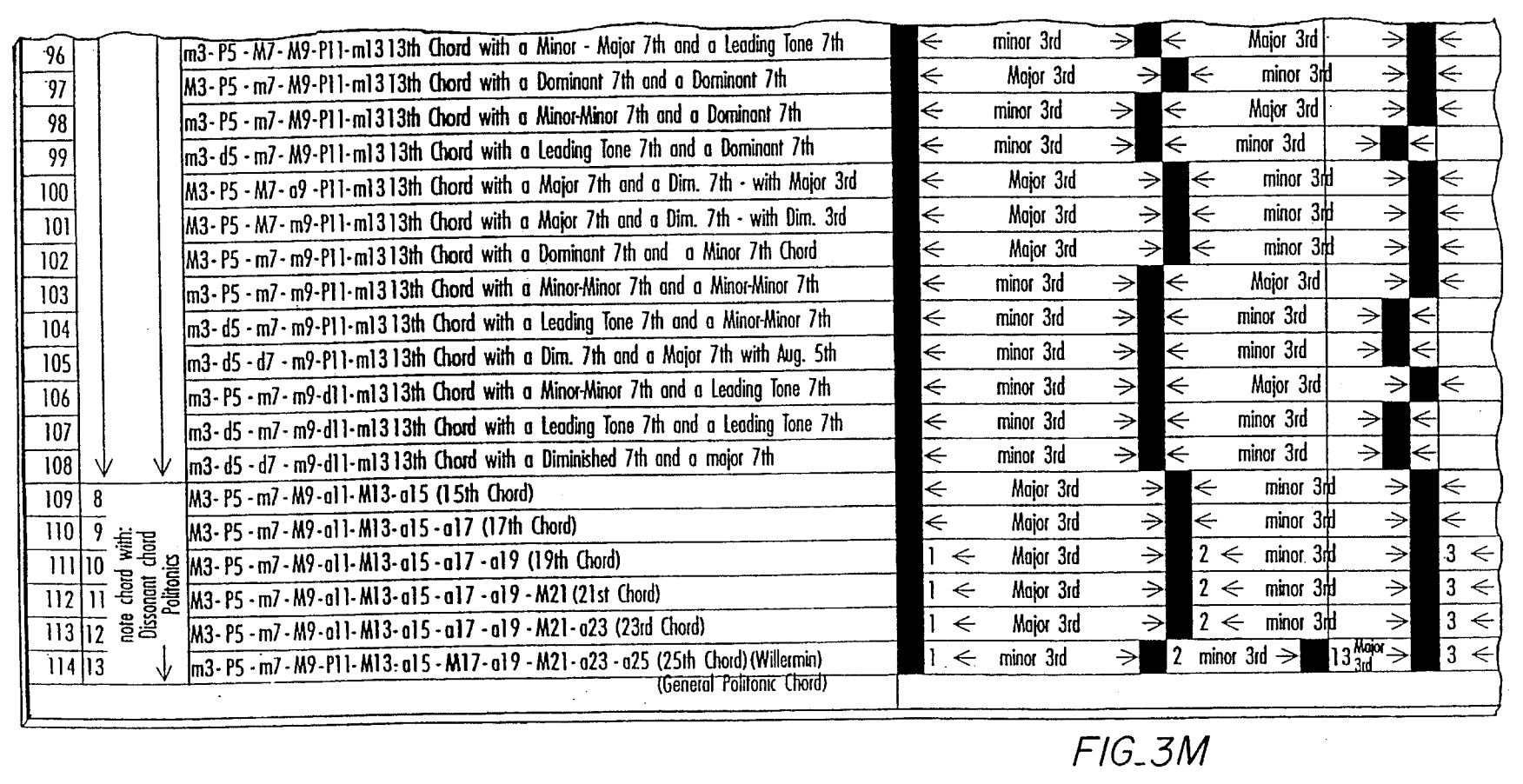

FIG_3M

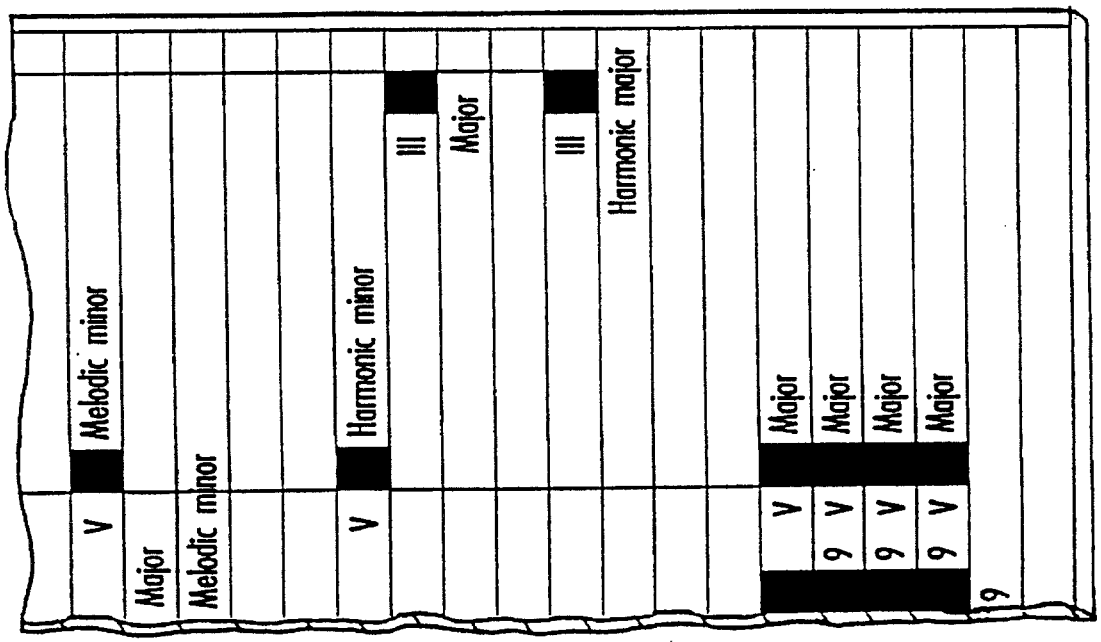
FIG._30

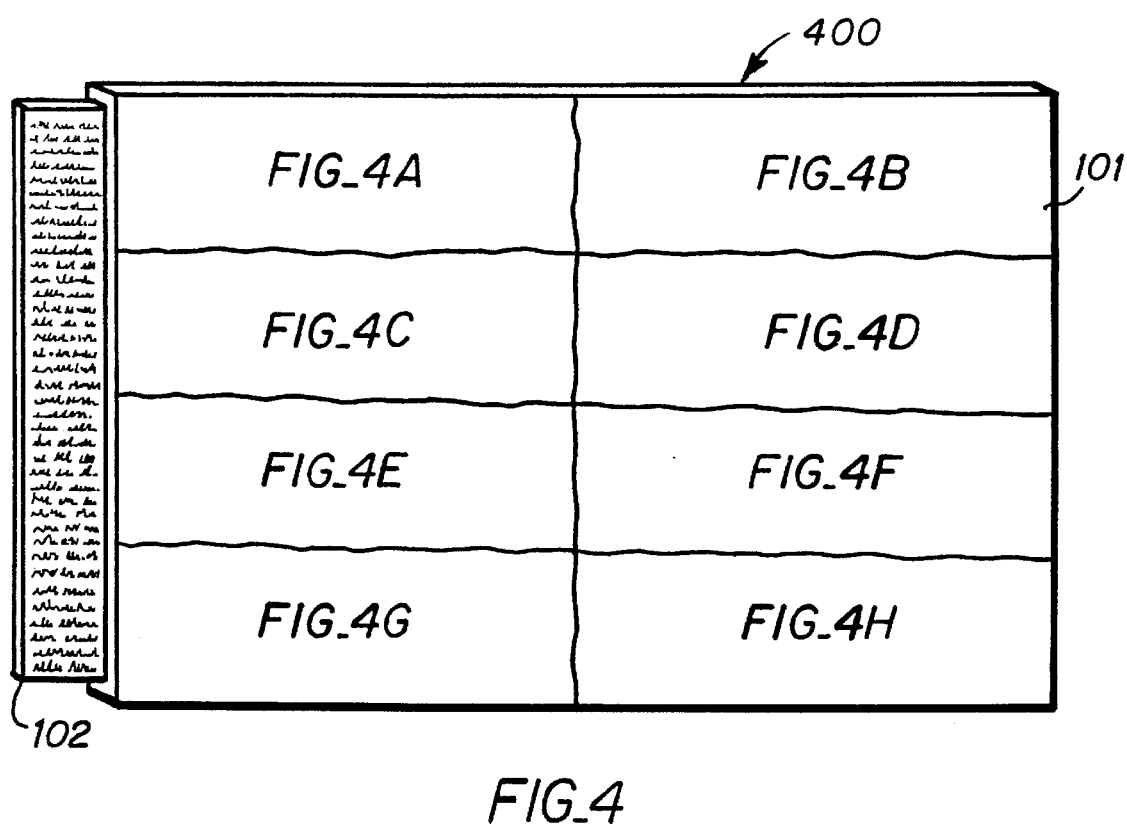
FIG_4

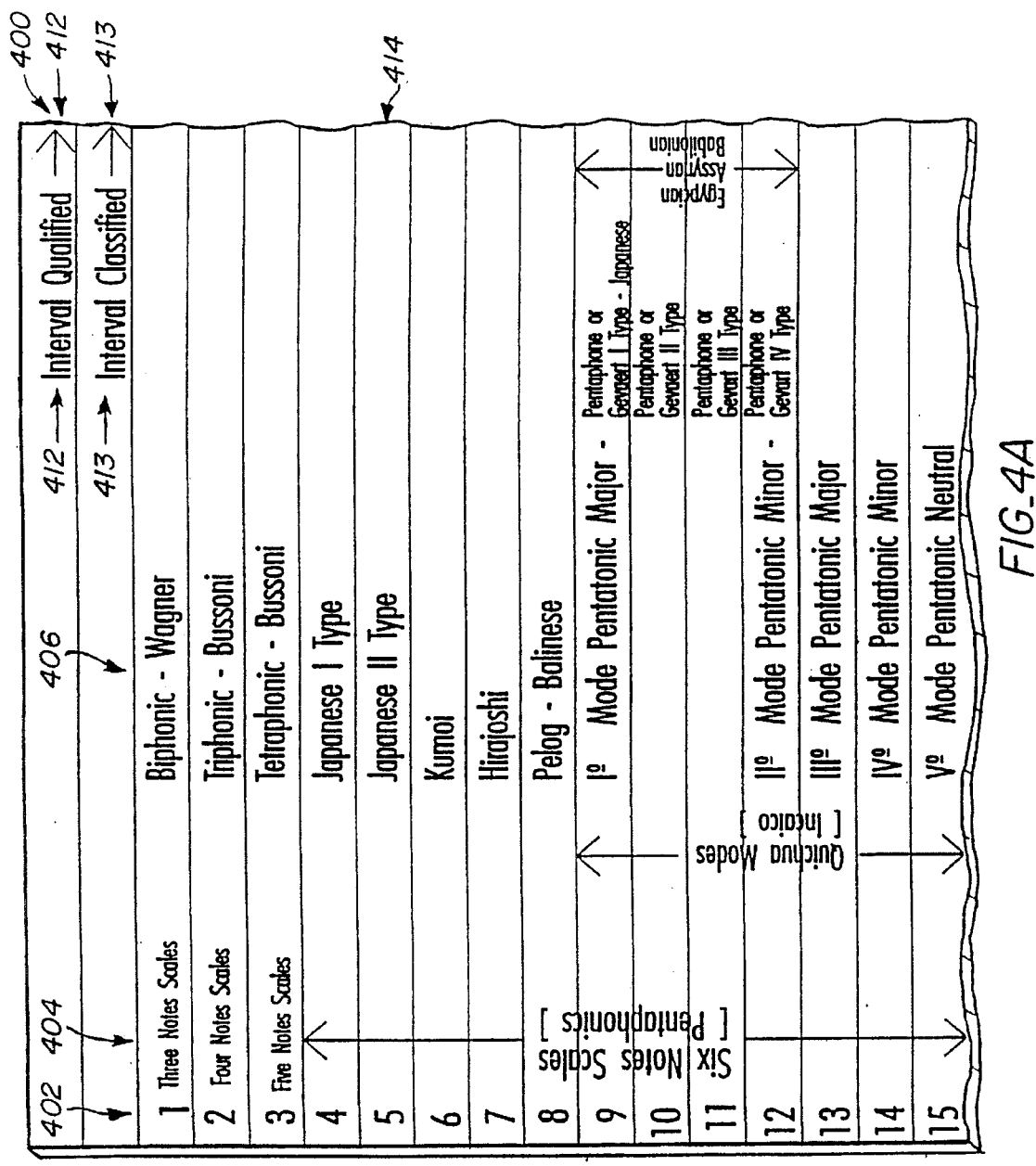
FIG_4A

| # | Scale Name |
|---|---|
| 16 | Whole Tone - Debussy I Type - China |
| 17 | Whole Tone - Debussy II Type - China |
| 18 | Blues |
| 19 | Exotic Ascendent |
| 20 | Exotic Descendent |
| 21 | Eight - Tone Spanish |
| 22 | Symmetrical - Bop |
| 23 | Dodecaphonic Chromatic I Type - 5 Descendent Alterations - 0 Ascendent Alteration |
| 24 | Dodecaphonic Chromatic II Type - 4 Descendent Alterations - 1 Ascendent Alteration |
| 25 | Dodecaphonic Chromatic III Type - 3 Descendent Alterations - 2 Ascendent Alterations |
| 26 | Dodecaphonic Chromatic IV Type - 2 Descendent Alterations - 3 Ascendent Alterations |
| 27 | Dodecaphonic Chromatic V Type - 1 Descendent Alteration - 4 Ascendent Alterations |
| 28 | Dodecaphonic Chromatic VI Type - 0 Descendent Alteration - 5 Ascendent Alterations |
| 29 | Harmonics - Upper Resonance |
| 30 | Harmonics - Lower Resonance |

Rows 16–17: Seven Notes Scales [Hexaphonics]
Rows 18–21: Nine Notes Scales [Octaphonics]
Rows 22–28: Thirteen Notes Scales [Dodecaphonics]
Rows 29–30: Sixteen Notes [Hexadecaphonics]

| Heptac Eight Not | | |
|---|---|---|
| 46 | Neapolitan Major | |
| 47 | Arabian | |
| 48 | Overtone | |
| 49 | Scriabin | |
| 50 | Major Minor - Hauptman - Basevi Mid Mode - Weitzmann Mild Major Mode | |
|  | Major Harmonic - Major Artificial Mixed - Heintz Semi Major Mode | |
| 51 | Harmonic Minor | |
| 52 | Neapolitan Minor | |
| 53 | Spanish Gypsy | |
| 54 | Hungarian Major | |
| 55 | Enigmatic - Verdi | |
| 56 | Hungarian Gypsy - Exotic - Double Harmonic | |
| 57 | Persian | |
| 58 | Oriental - Wollet | |
| 59 | Oriental - Bohemia - Hungarian Minor - Magyr | |
| 60 | Egyptian | |

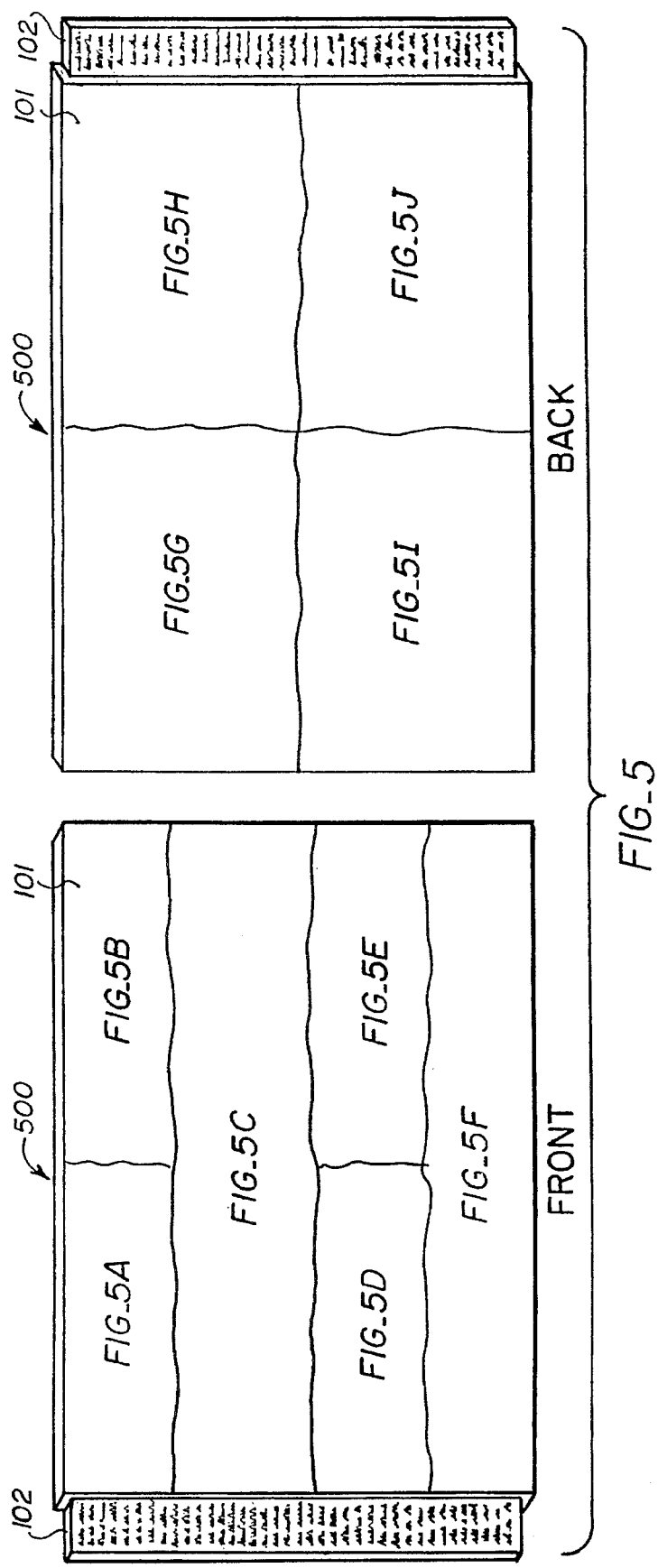
FIG_5

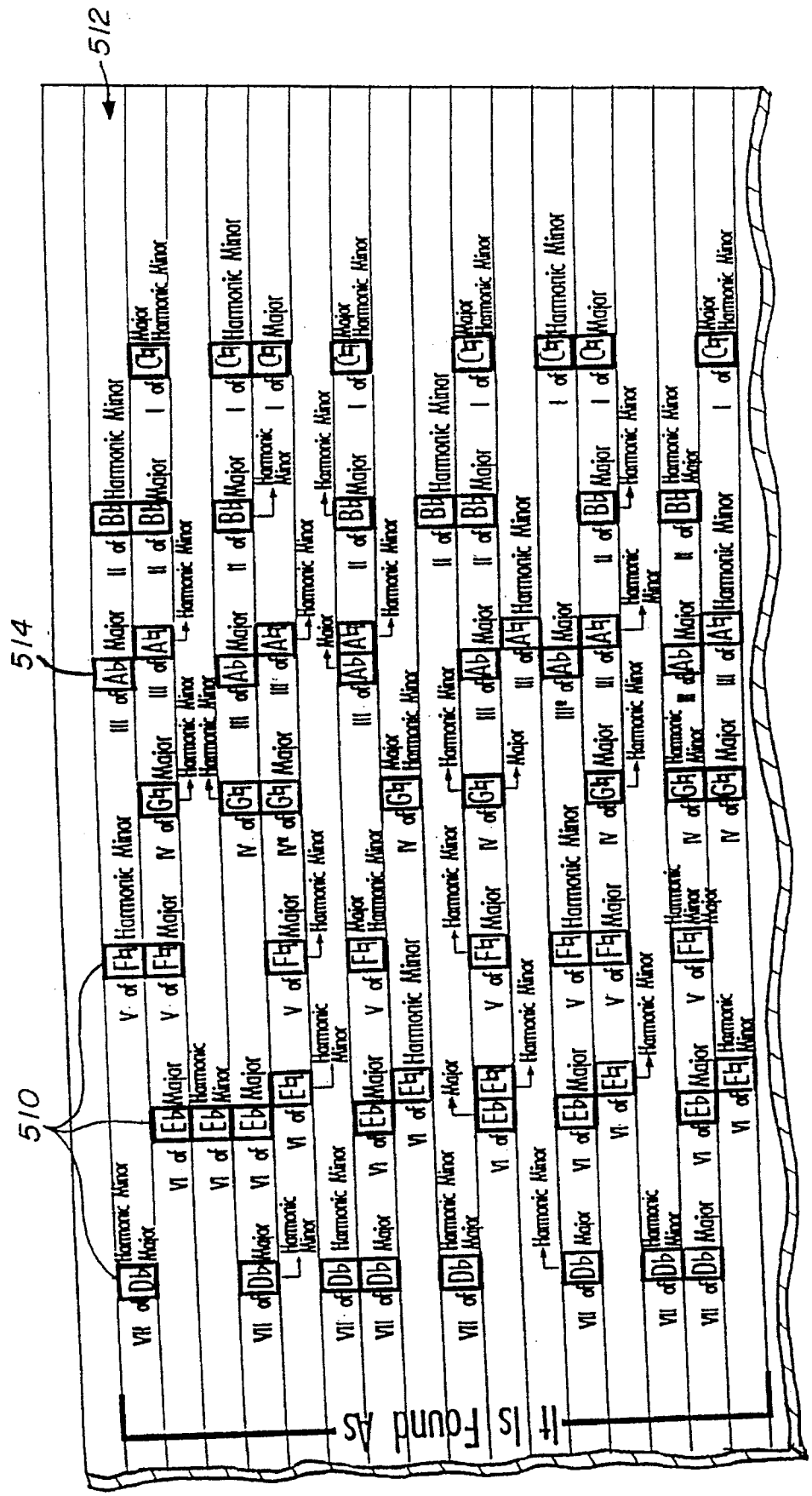
FIG._5B

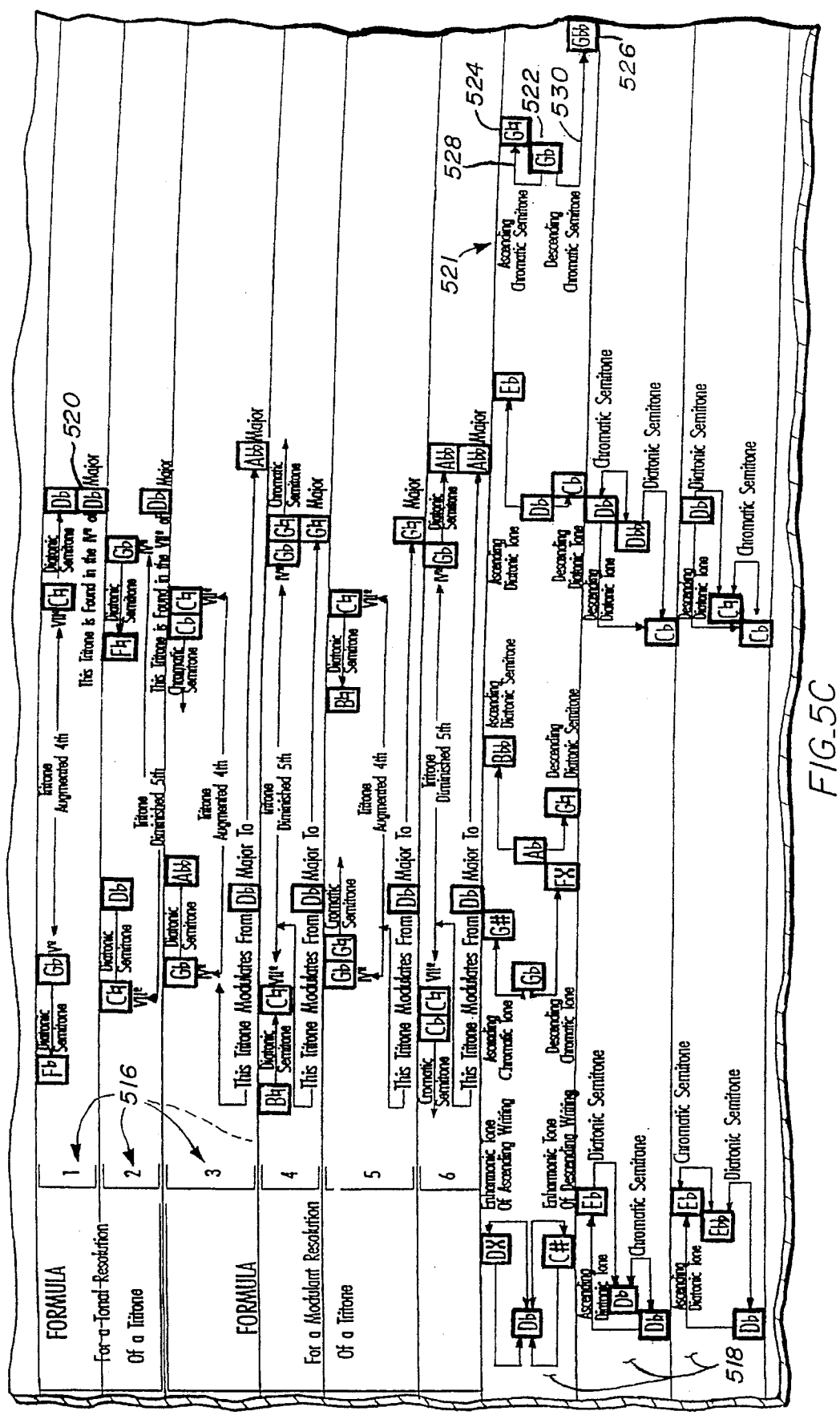
FIG_5C

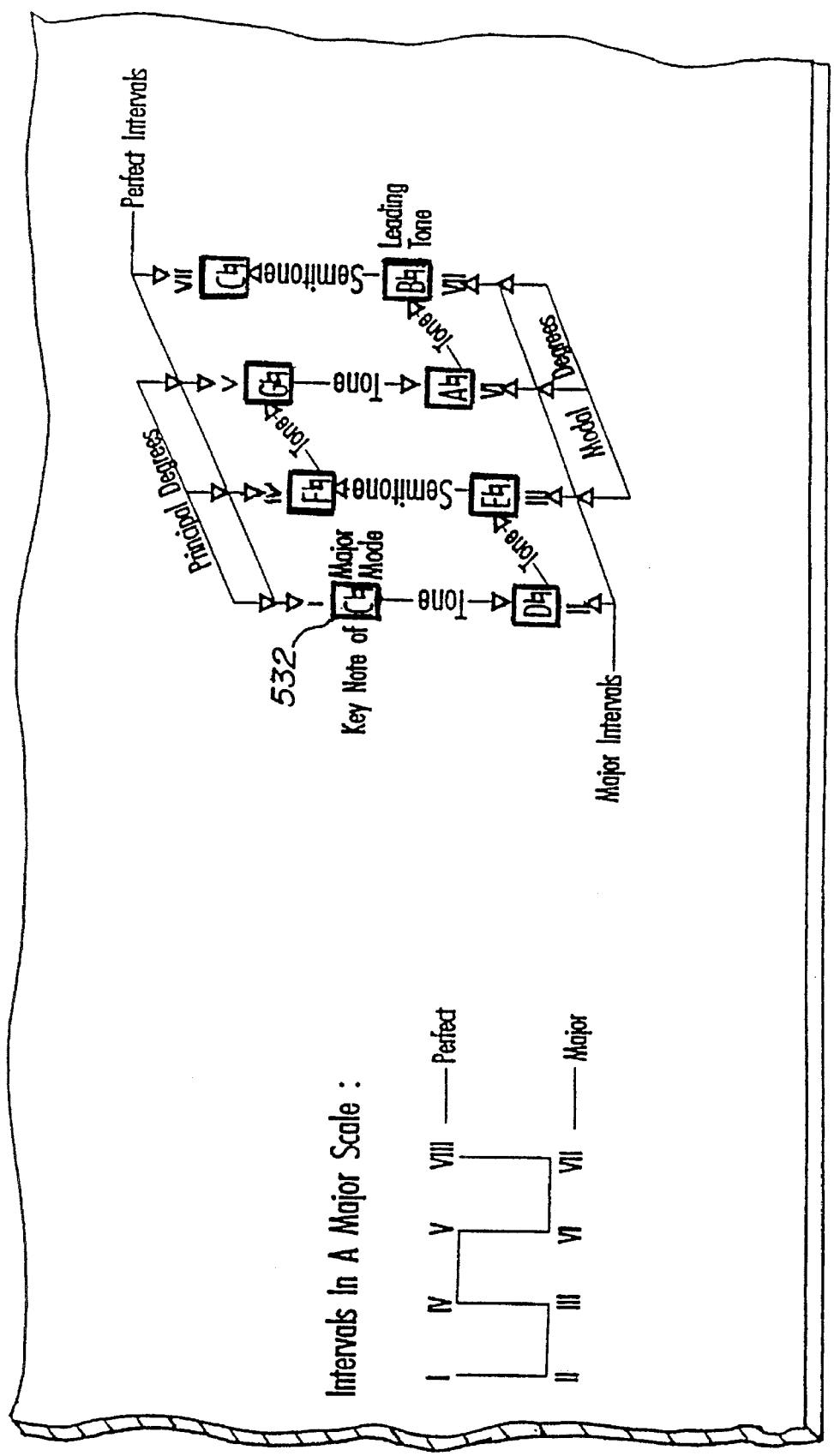
FIG_5D

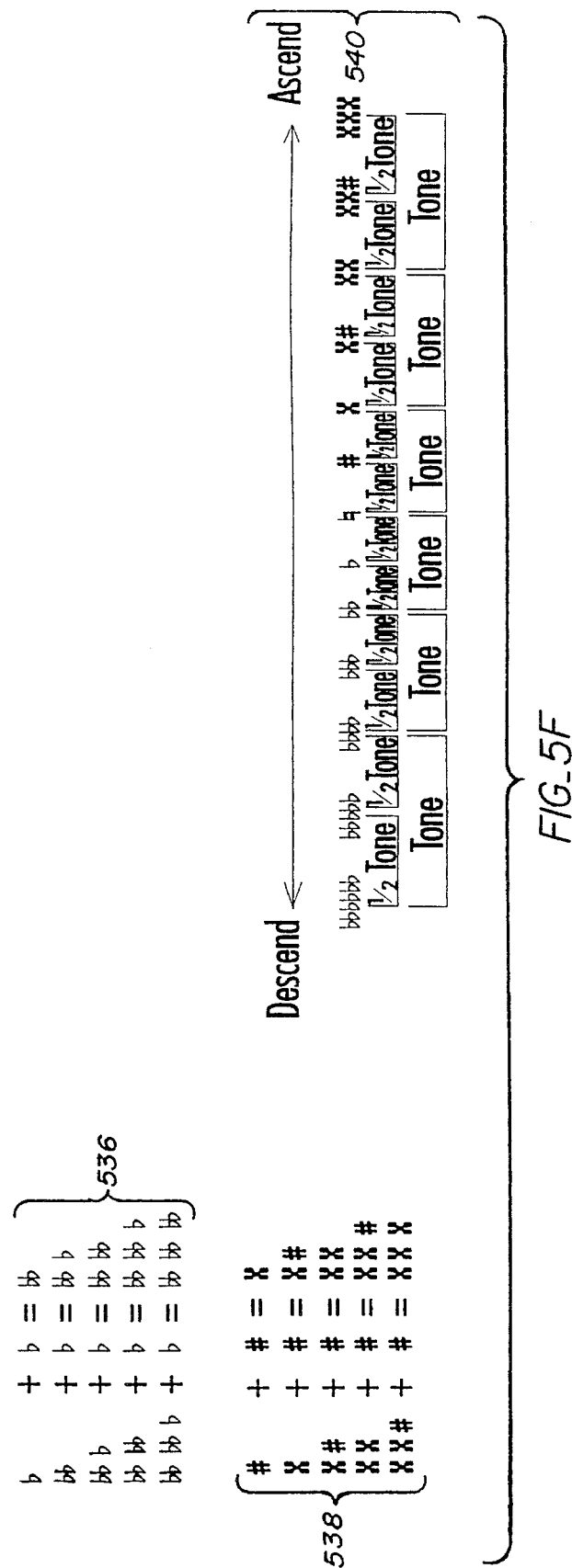

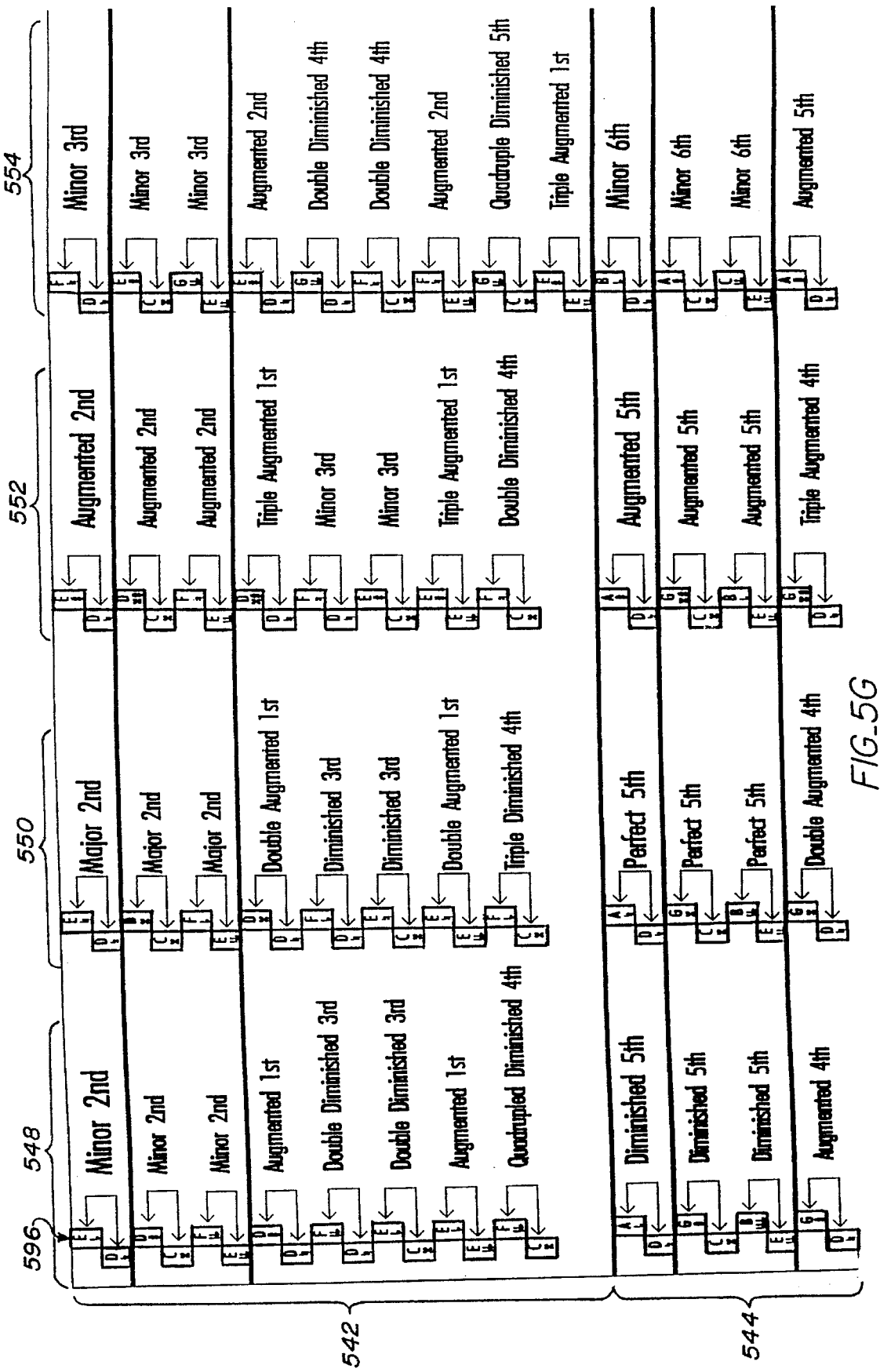
FIG_5G

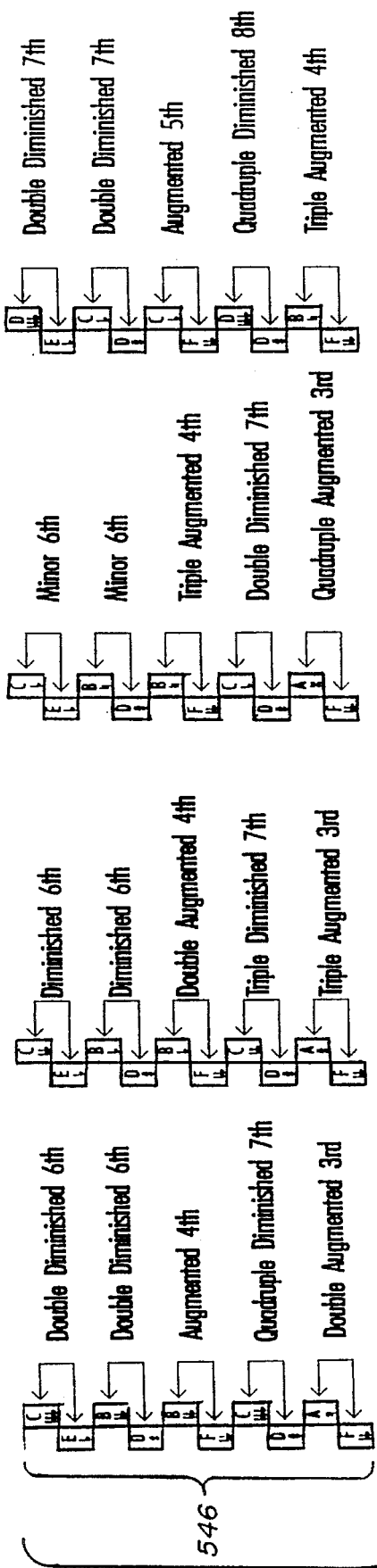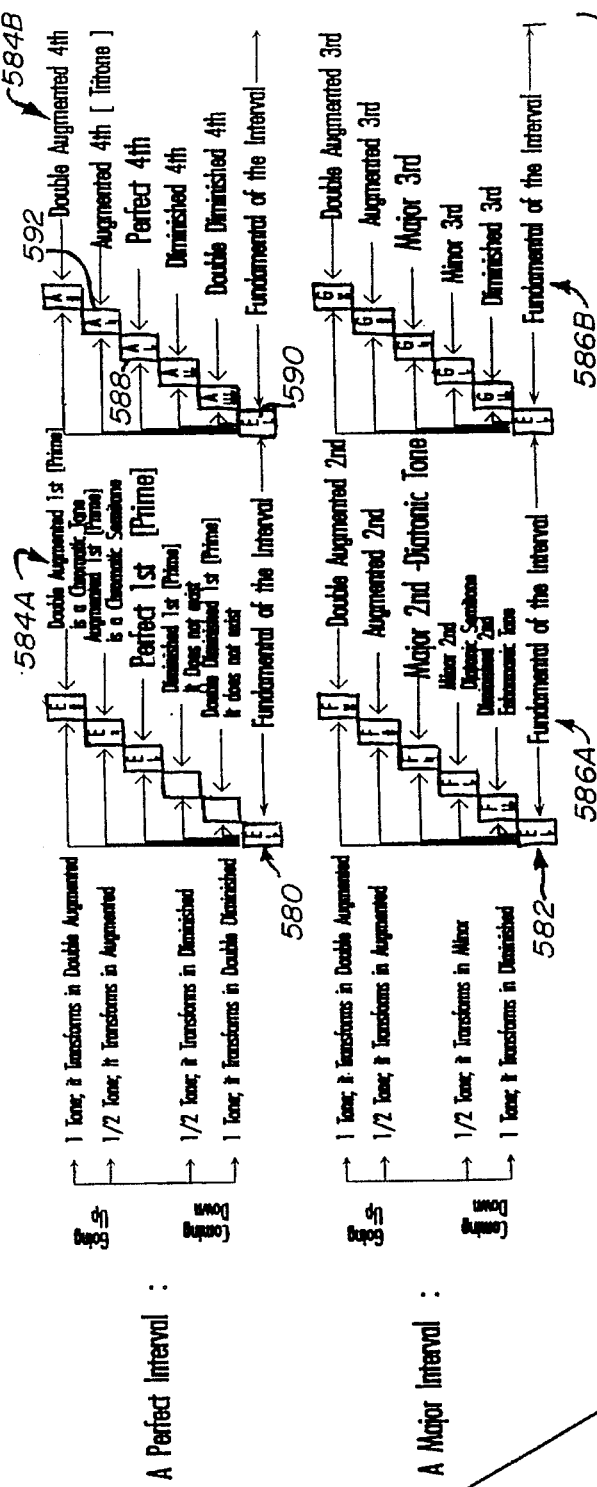
FIG._51

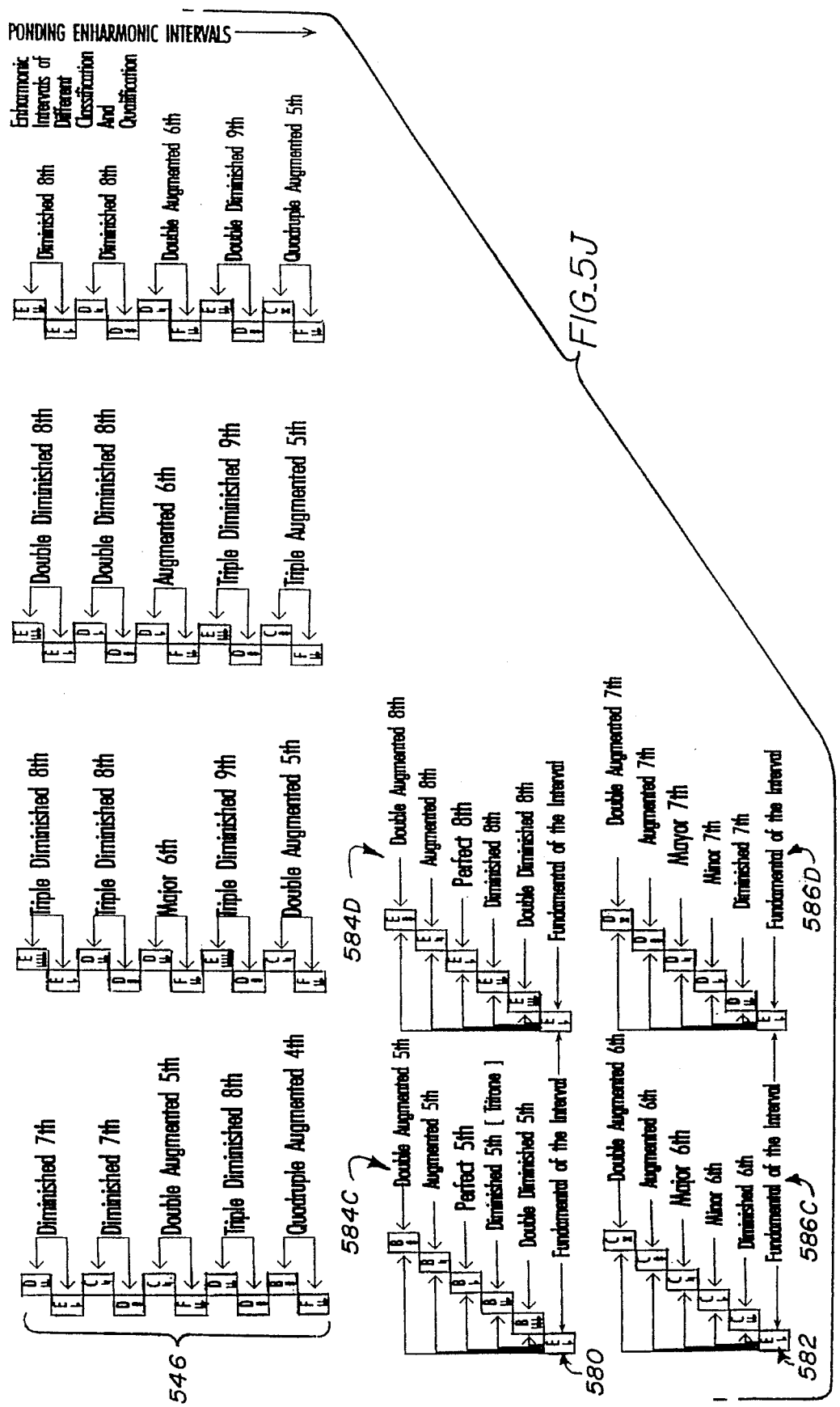

FIG. 5K

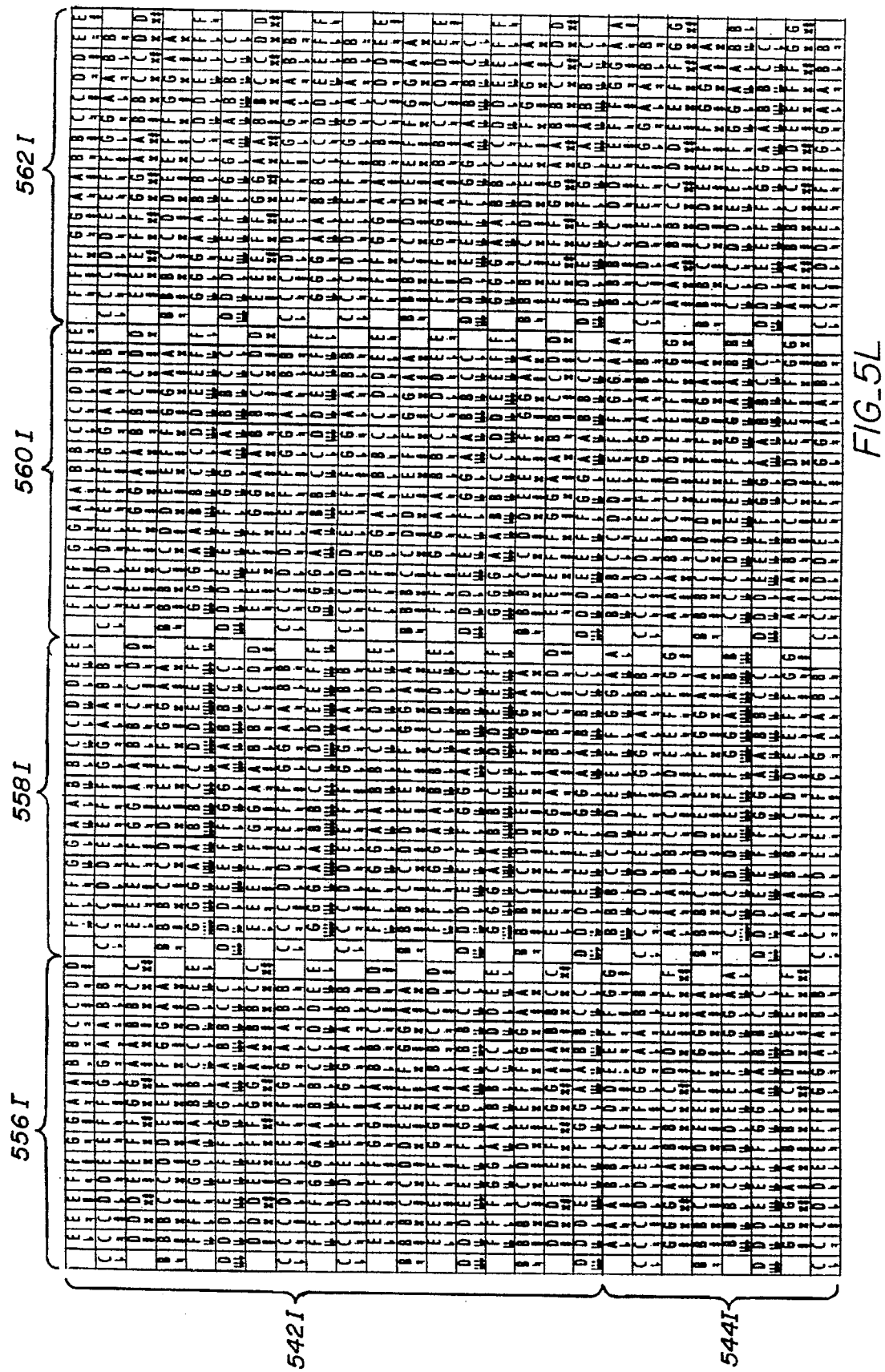
FIG._5L

FIG_5M

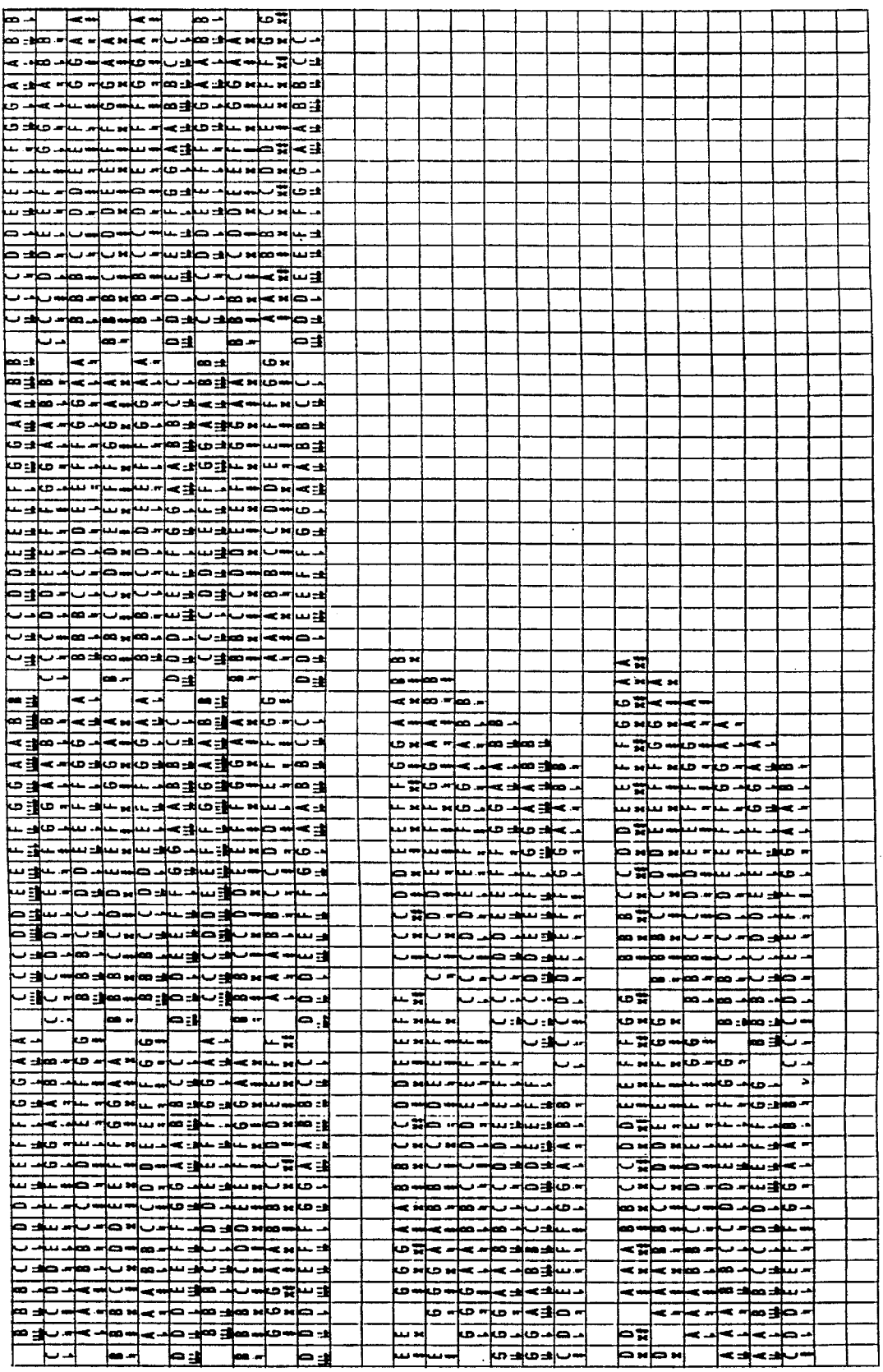
FIG_5N

FIG. 6

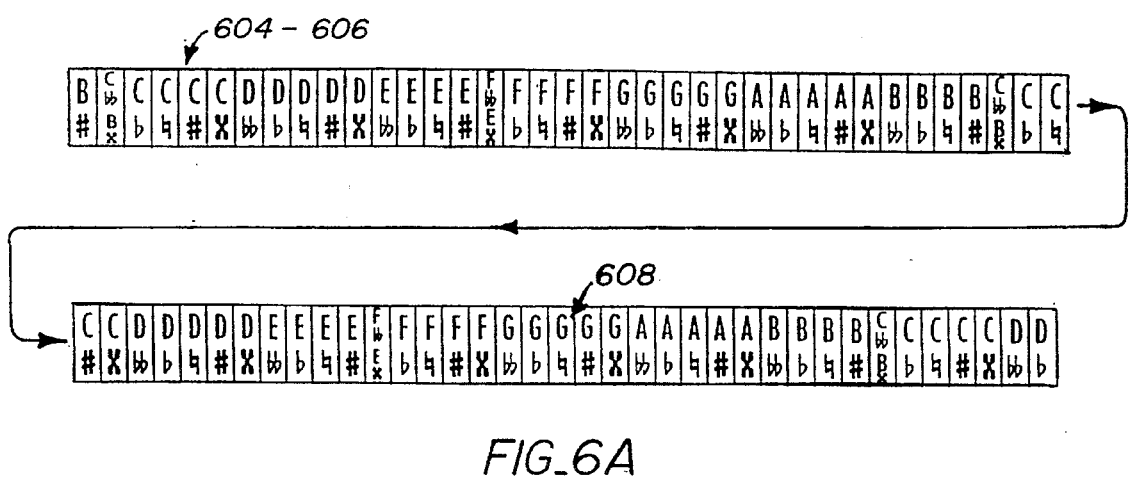
FIG_6A

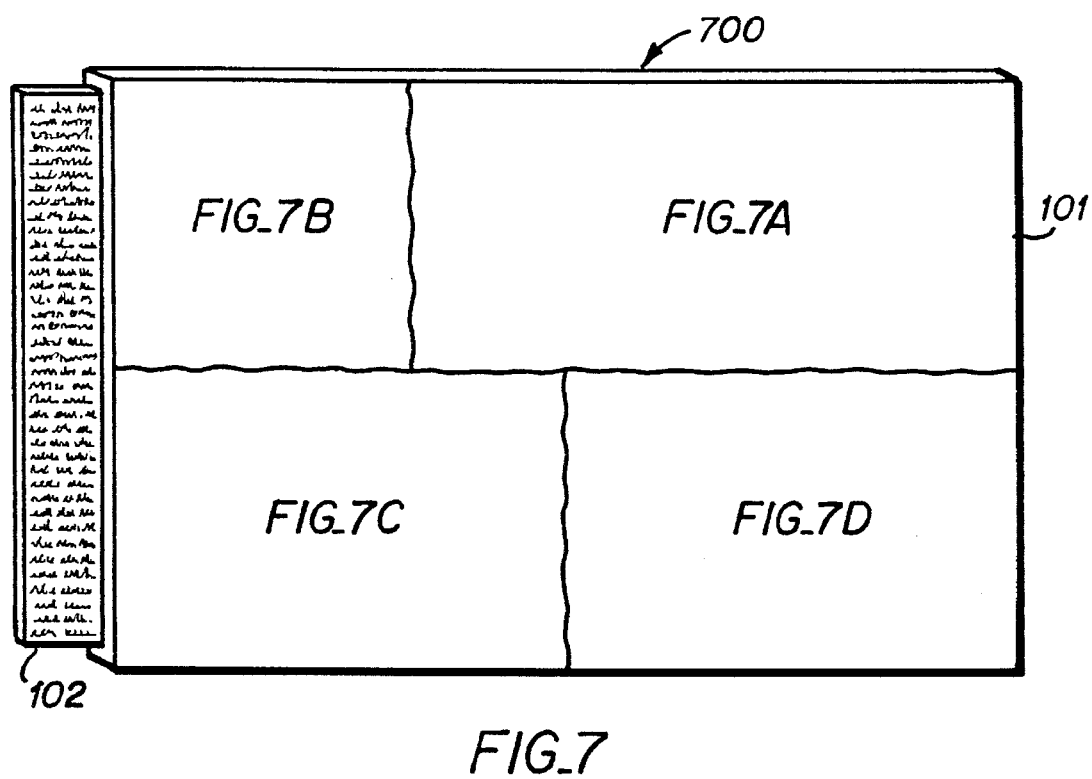
FIG_7

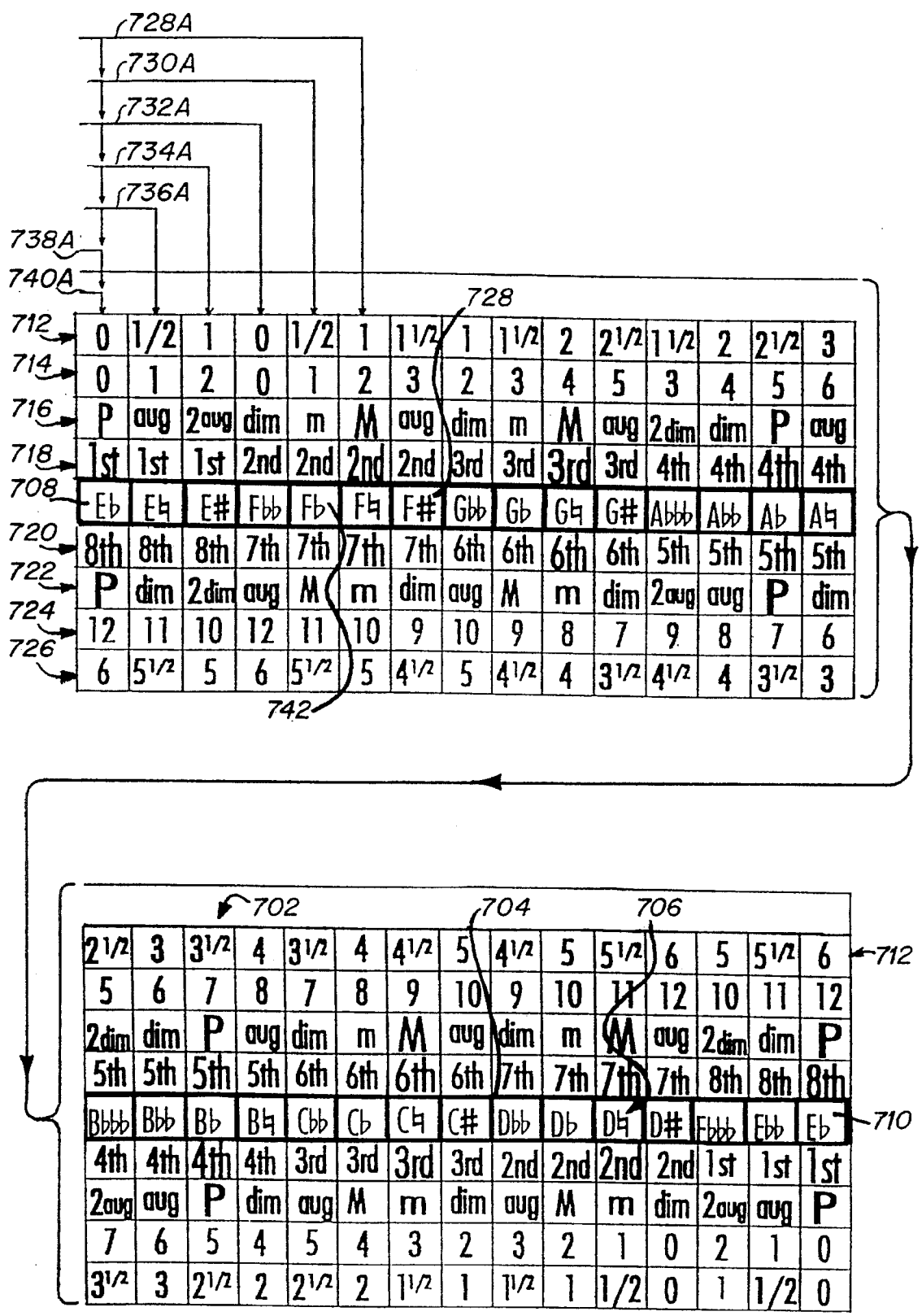
FIG_7A

| 7 | Diatonic Tone | ← 728 |
| 6 | Diatonic Semitone | ← 730 |
| 5 | Enharmonic Tones | ← 732 |
| 4 | Chromatic Tone | ← 734 |
| 3 | Chromatic Semitone | ← 736 |
| 2 | Prime - Unison | ← 738 |
| 1 | Key of the Interval | ← 740 |
| | Number of Tones in the Interval | ← 712 |
| | Number of 1/2 Tones in the Interval | ← 714 |
| | Qualification of the Interval | ← 716 |
| | Classification of the Interval | ← 718 |
| | | |
| | Classification in the Inversion of the Interval | ← 720 |
| | Qualification in the Inversion of the Interval | ← 722 |
| | Number of 1/2 Tones in the Inversion of the Interval | ← 724 |
| | Number of Tones in the Inversion of the Interval | ← 726 |

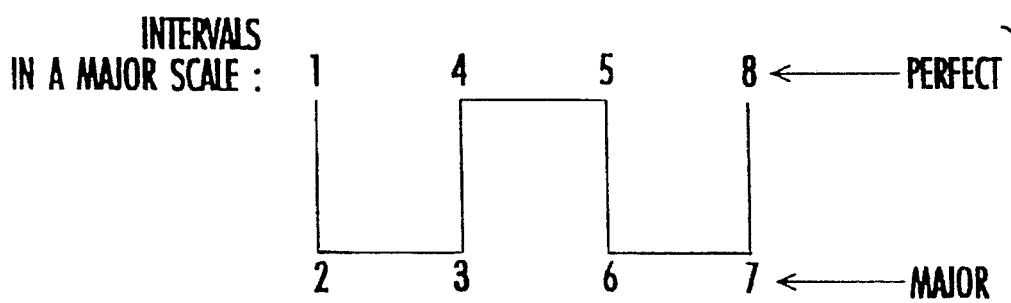

*FIG. 7C*

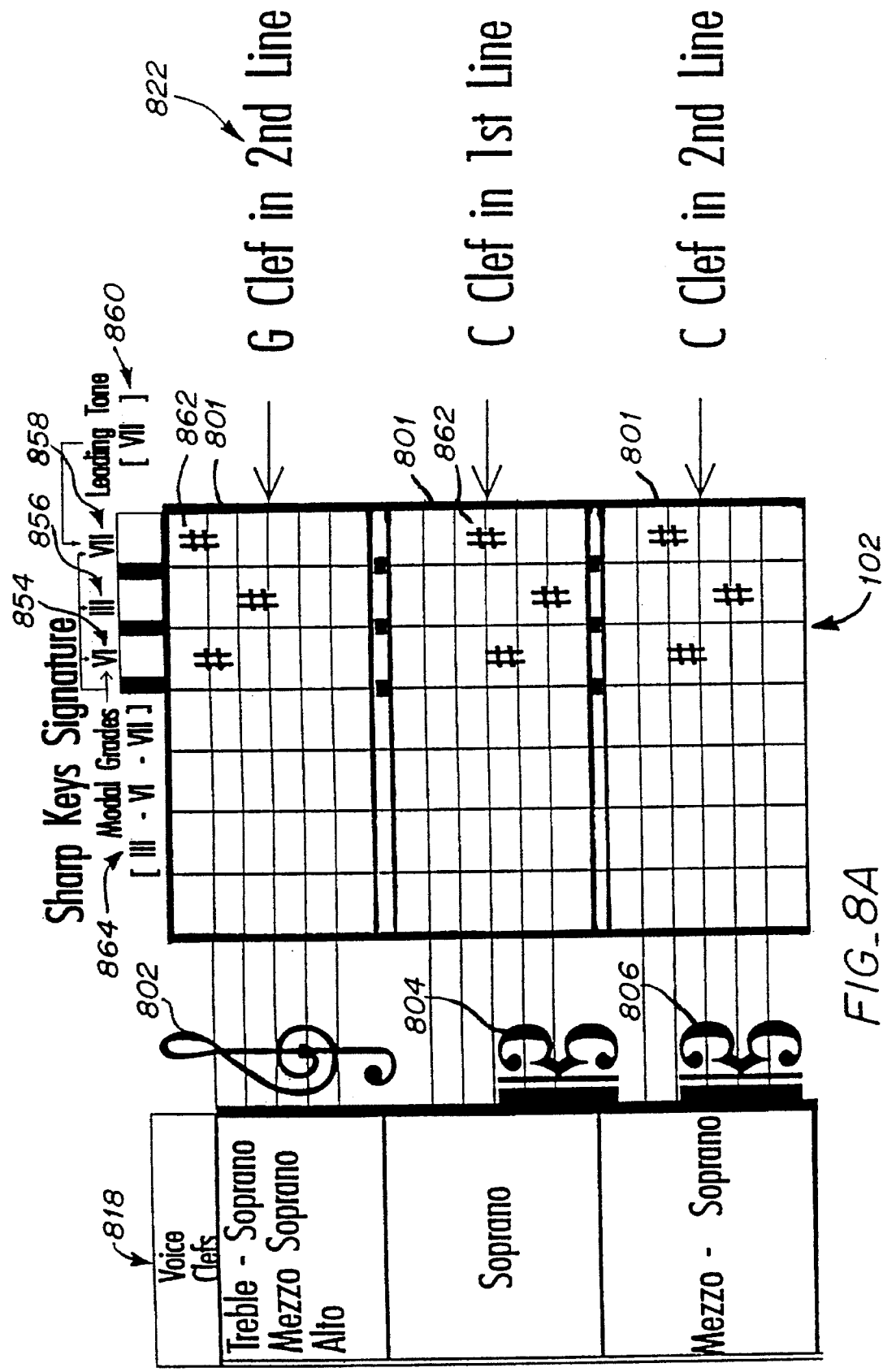
FIG._8A

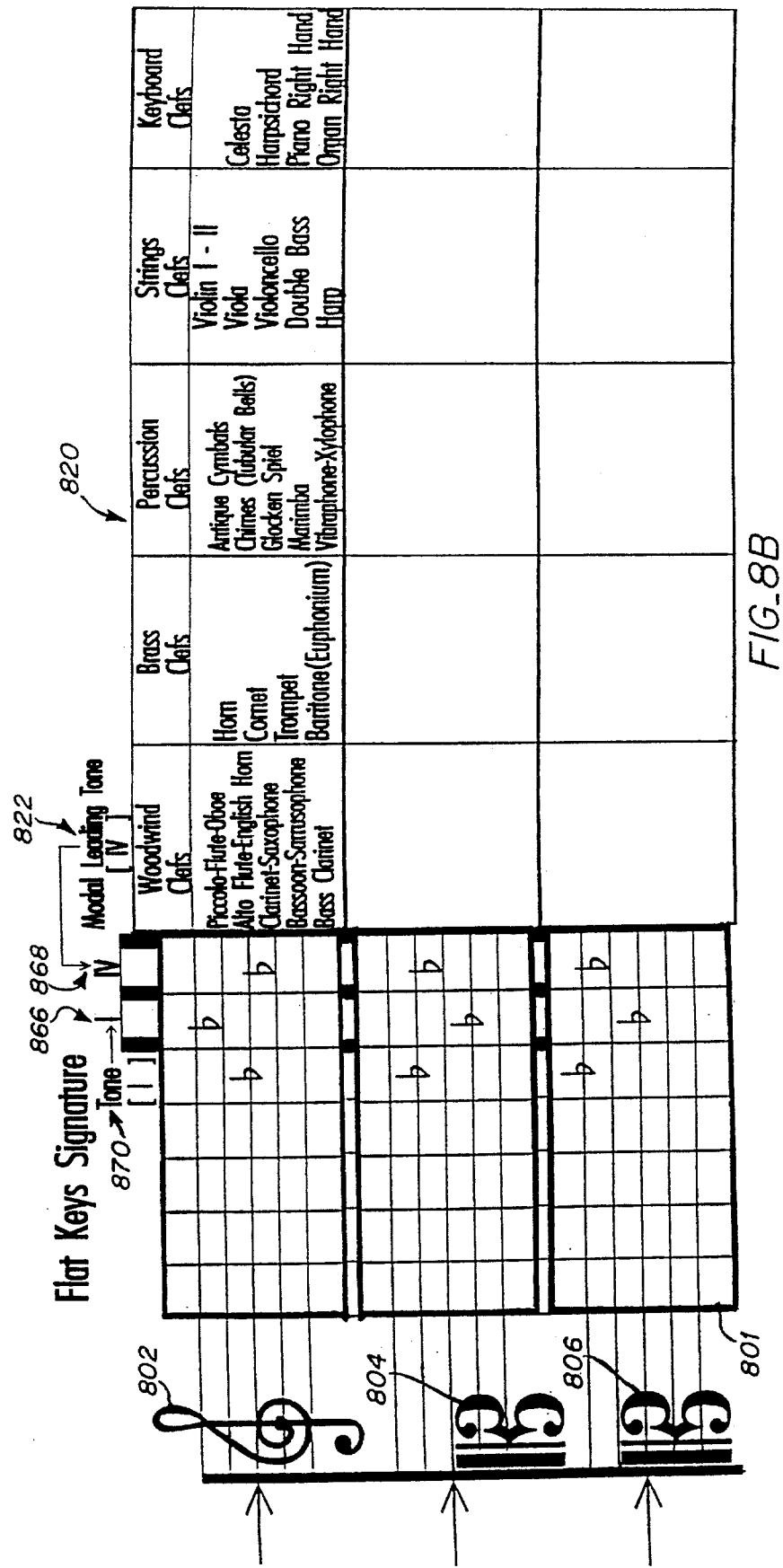
FIG._8B

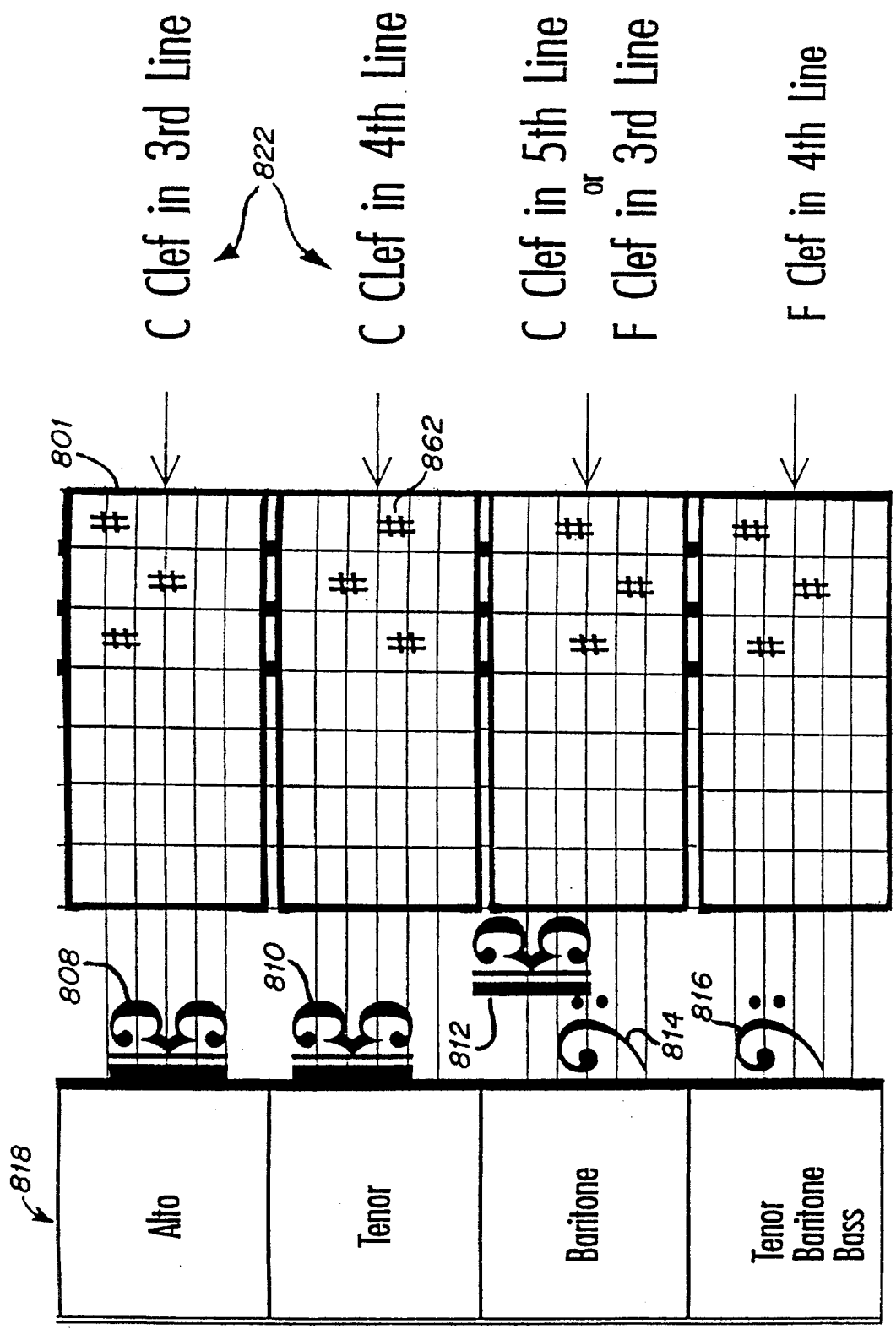
FIG._8C

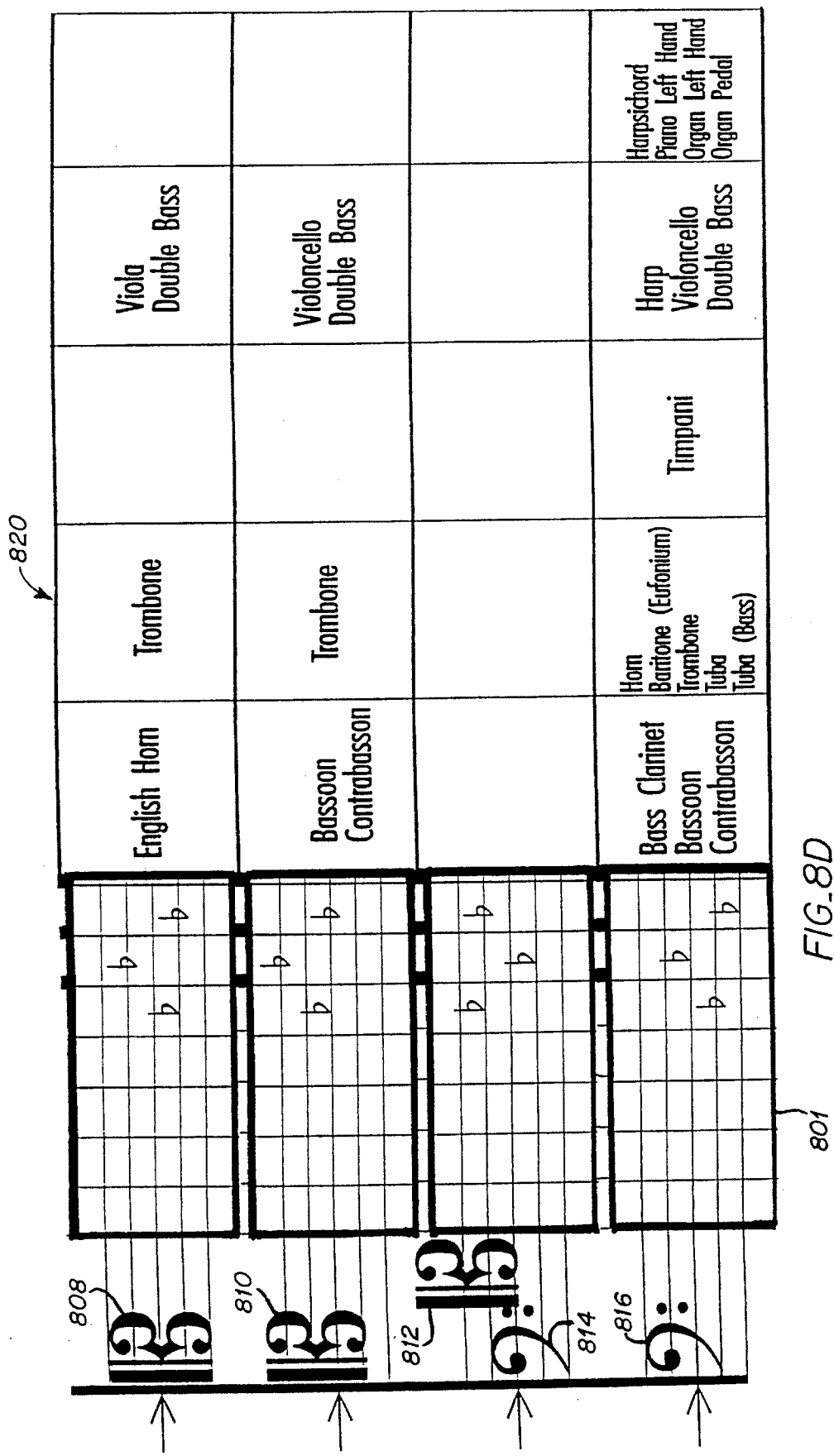

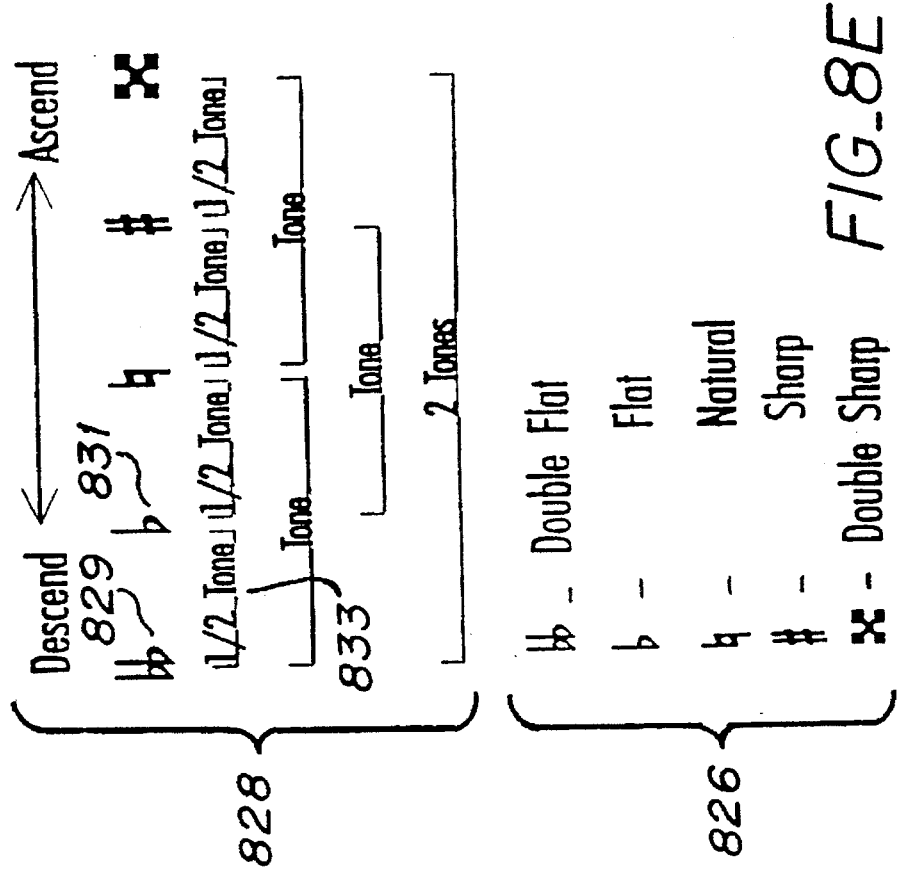
FIG_8E

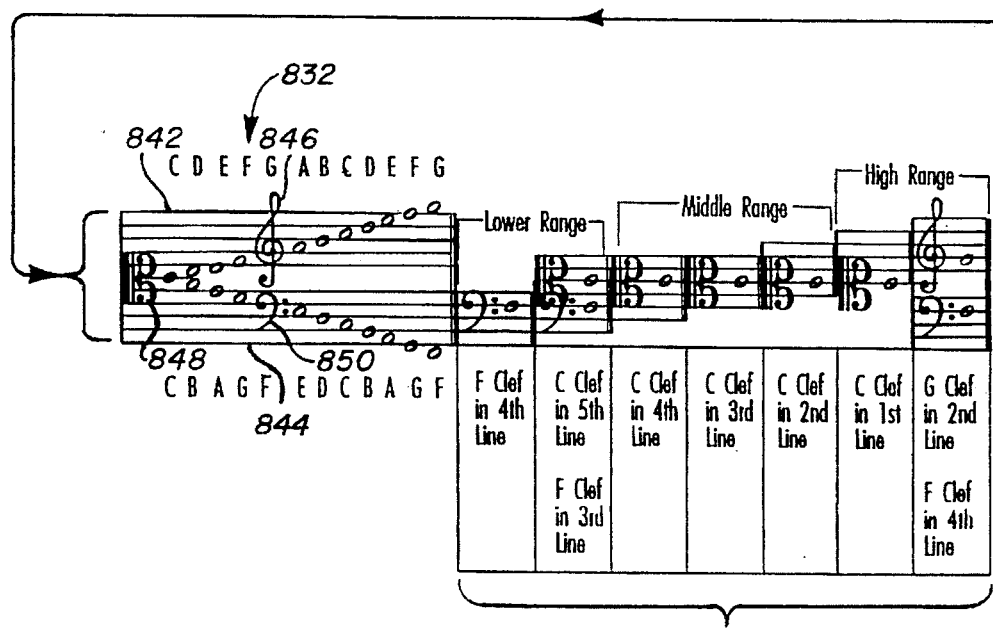
FIG_8F

FIG.8H

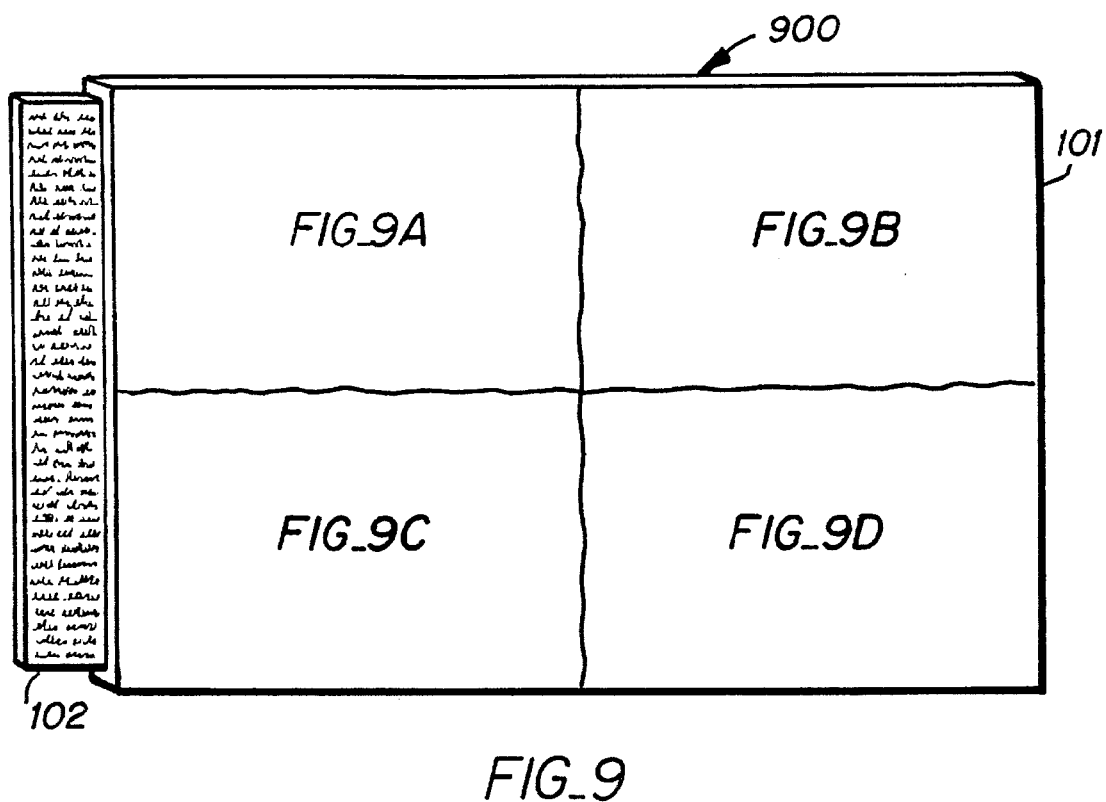
FIG_9

FIG.9A

TRANSPOSING CLEFS

| From G2 | To The Clef Of | Ascendent C3 | Descendent C4 | Ascendent F4 |
|---|---|---|---|---|
| 906 | | 908a 2nd-914 | 908b 2nd-914 | 908c 3rd-914 |
| | | 910 | 912 | |
| | | 904 | 904 | |

BRASS — 934

| | | | |
|---|---|---|---|
| Fliscorno, Saxhorn Sopranino Petit Bugle, Oktav Kornett | Bb - 62 | Fliscorno, Saxhorn Basse Basse à Pistons, Saxhorn Baryton Euphonium, Barytonhorn | Bb - C - 34 |
| Fliscorno, Saxhorn Soprano Flugelhorn, Petit Bugle, Bugle Soprano Klein Kornett, Saxhorn Sopranino | Eb - 43 | Fliscorno, Saxhorn Contrebasse Bombardon Contrebasse à Pistons Saxhorn Basse Bass Tuba | Eb - C - 34 |
| Fliscorno, Saxhorn Contralto Bugle Soprano, Saxhorn Soprano Flugelhorn, Kornett | Eb - 10 | Fliscorno, Saxhorn Bourdon Contrebasse à Pistons, Saxhorn Contrebasse BBb Bass, Kontrabasstuba | Bb - C - 34 |
| Fliscorno, Saxhorn Tenor Bugle Alto, Saxhorn Alto Althorn, Alto Kornett | Bb - 29 | Fliscorno, Saxhorn Bourdon EEb, Subbasstuba | Eb - C - 34 |
| Fliscorno, Saxhorn Baryton Bugle Tenor, Saxhorn Tenor Tenor Horn | Bb - C - 34 | Fliscorno, Saxhorn Bourdon Subcontrabass Tuba, Subkontrabasstuba | Bb - C - 34 |

935

| | | | | | |
|---|---|---|---|---|---|
| Piccolo Clarinet | B - 63 | Soprano Clarinet | A - 25 | Contrabasset Horn | Eb - 10 | Fife Flute | Ab - 57 |
| Piccolo Clarinet | Ab - 57 | Alto Clarinet | F - 15 | Contrabass Clarinet | Bb - 43 | Tierce Flute | Eb - 43 |
| Sopranino Clarinet | F - 48 | Alto Clarinet | Eb - 10 | Contrabass Clarinet | A - 25 | Tierce Flute | Db - 38 |
| Sopranino Clarinet | Eb - 43 | Bass Clarinet | C - 1 | Bassoon | C - 34 | Concert Flute | C - 34 |
| Sopranino Clarinet | D - 39 | Bass Clarinet | Bb - 43 | Contrabassoon | C - 1 | Flute D'amour | A - 25 |
| Soprano Clarinet | C - 34 | Bass Clarinet | A - 25 | Piccolo Flute | Db - 38 | Flute D'amour | Ab - 24 |
| Soprano Clarinet | Bb - 29 | Contrabasset Horn | F - 15 | Piccolo Flute | C - 67 | Alto Flute | G - 20 |

| | Descendent C1 ~908d 3rd ~904 914 | Ascendent C2 ~908e 4th ~904 914 | Descendent F3 ~908f 4th ~904 914 |
|---|---|---|---|
| Wagner Tenor Tuba | | Bb - 29 | |
| Wagner Bass Tuba | | F - 15 | |
| Bass Tuba, Bombardon | Eb - C - 34 | | |
| Helicon, Sousaphone | | | |
| Contrabasse à Pistons | F - C - 34 | | |
| Tuba Contrebasse | | | |
| Contrabass Tuba, BBb Bass | Bb - C - 34 | | |
| Sousaphone | C - C - 34 | | |
| Subbass Tuba, EEb Bass | Eb - C - 34 | | |
| Subcontrabass Tuba | Bb - C - 34 | | |
| Horn Alto | | Bb - 29 | |
| Horn | | A - 25 | |
| Horn | | Ab - 24 | |
| Horn | | G - 20 | |
| Horn | | Gb - 19 | |
| Horn | | F - 15 | |
| Horn | | E - 11 | |
| Horn | | Eb - 10 | |
| Horn | | D - 6 | |
| Horn | | Db - 5 | |
| Horn | | B - 30 | |
| Horn Basso Bb | | Bb - 29 | |
| Trombone Soprano | | | Bb - C - 34 |
| Trombone Alto | | | Eb - C - 34 |
| Trombone Tenor | | | Bb - C - 34 |
| Trombone Bass | | | F - C - 34 |
| Trombone Bass | | | Eb - C - 34 |
| Trombone Contrabass | | | Bb - C - 34 |
| Sarrusophone Sopranino | | | Eb - 43 |
| Sarrusophone Soprano | | | Bb - 29 |
| Sarrusophone Alto | | | Eb - 10 |
| Sarrusophone Tenor | | | Bb - 29 |
| Sarrusophone Baritone | | | Eb - 10 |
| Sarrusophone Bass | | | Bb - 29 |
| Sarrusophone Contrabass | | | Eb - 10 |
| Sarrusophone Subcontrabass | | | Bb - 29 |
| High Trumpet Eb | | | 43 |
| Trumpet D | | | 39 |
| Trumpet C | | | 67 |
| Trumpet B | | | 63 |
| Trumpet Bb | | | 62 |
| Trumpet A | | | 58 |
| Trumpet Ab | | | 57 |
| Medium Trumpet G | | | 53 |
| Trumpet Gb | | | 52 |
| Trumpet F | | | 48 |
| Trumpet E | | | 44 |
| Trumpet Eb | | | 43 |
| Low Trumpet D | | | 39 |
| Trumpet Db | | | 38 |
| Trumpet C | | | 34 |
| Trumpet B | | | 30 |
| Trumpet Bb | | | 29 |
| Trumpet A | | | 25 |

WOODWINDS

| | |
|---|---|
| Alto Flute | Eb - 10 |
| Alto Flute | Db - 5 |
| Bass Flute | C - 1 |
| Oboe Sopranino Eb | Eb - 43 |
| Oboe Soprano | D - 39 |
| Oboe Soprano | C - 34 |
| Oboe Soprano | Bb - 29 |
| Oboe Mezzo-Soprano A | A - 25 |
| Oboe D'amour | A - 25 |
| Oboe Alto (Tenor) | F - 15 |
| Oboe Baritone | C - 1 |
| Basset | C - 1 |
| Oboe Bass | F - 15 |
| English Horn | F - 15 |

STRINGS

| | |
|---|---|
| Violin | C - 34 |
| Viola | C - 34 |
| Cello | C - 34 |
| Double Bass | C - 34 |
| Harp | C - 34 |

Percusion

| | |
|---|---|
| Timpani | C - 34 |
| Xylophone | C - 67 |
| Glockenspiel | C - 67 |
| Vibraphone | C - 34 |
| Marimba | C - 34 |
| Bells (chimes) | C - 67 |

FIG. 9C

TRANSPOSING INSTRUMENTS

OR
D ( AS WRITTEN )

NATURE USED BY EACH TRANSPOSING INSTRUMENTS
NOTATION FOR TRANSPOSING INSTRUMENTS

INSTRUMENTS SOUNDING HIGHER ~932

→ KEY OF THE INSTRUMENT

→ NUMBER OF TONES AND 1/2 TONES UP FROM C 34

→ QUALIFICATIONS OF THE INTERVALS FROM C UP

→ CLASSIFICATIONS OF THE INTERVALS UP FROM C

Metals

Saxophone Sopranino    Eb - 43
Saxophone Soprano      Bb - 29
Saxophone Alto         Eb - 10
Saxophone Tenor        Bb - 29
Saxophone Baritone     Eb - 10
Saxophone Bass         Bb - 29
Saxophone Contrabass   Eb - 10

FIG.9D

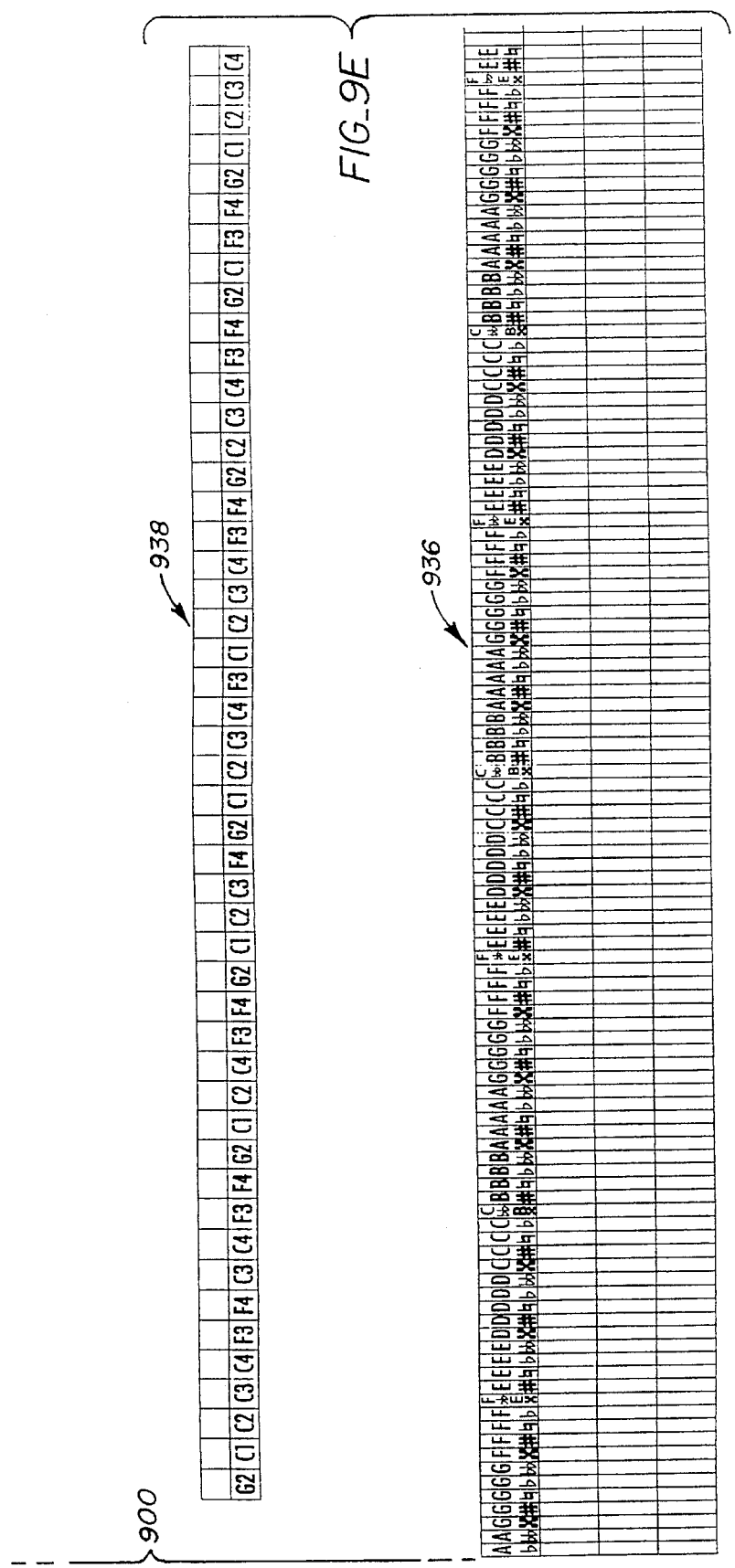

5,597,969

MUSIC SLIDE RULE REFERENCE DEVICE AND SYSTEM

SPECIFICATION

1. Field of the Invention

The invention relates to the field of music, and more particularly, to a slide rule type reference apparatus including specially arranged indicia to be used as a tool and system for the comprehensive computation, analysis, learning, teaching and composing of music, including but not limited to, the determination of chords, keys, scales, modes, intervals, transpositions, and transposing instruments.

2. Background

There currently exist a number of musical reference aids for analysis, teaching and composition. These are in the form of text books, charts and rule type devices. One such slide rule allows the display of 12 of the more common chords on one side for the various keys, and has a number of scales on the back for easy reference. Chord charts are common, which display various chords in all keys. Keyboard charts are also common, helping the student to learn the notes. Most of these devices are targeted to serve the beginner musician in one way or other, and are far from comprehensive in their presentation of music information.

Although the needed information to accomplish a finished music composition is available, it must be extracted from various separate sources, or from among pages of lengthy text. There is therefore a need for a comprehensive, compact analytical music slide rule reference aimed at providing the student, teacher and composer of music alike a single tool and system for the comprehensive computation, analysis, learning, teaching and composing of music.

THE INVENTION

OBJECTS OF THE INVENTION

It is an object of the present invention to provide a musical slide rule providing a more comprehensive, yet compact and easy to use chord reference.

It is a further object of the present invention to provide a musical slide rule having a more comprehensive, yet compact and easy to use reference to scales.

It is a still further object of the present invention to provide a musical slide rule with a comprehensive and easy to use reference to intervals and their inversions.

It is another object of the present invention to provide a musical slide rule providing a comprehensive, compact and easy to use reference for transposing clefs.

It is a further object of the present invention to provide a musical slide rule providing a comprehensive, compact and easy to use reference for transposing the various instruments to any key.

It is a still further object of the present invention to provide a comprehensive, compact and well organized reference system of data for musical composition.

These and other objects and advantages of the present invention will no doubt become apparent to those skilled in the art after having read the following detailed description of a preferred embodiment illustrated in the several figures of the drawing.

DRAWINGS

The invention is illustrated in the drawings and the sheets of Appendix A as follows:

FIG. 1A is a partially broken-away isometric view of a schematic representation of the first embodiment of the music slide rule reference device of this invention, and the various indicia that may be used are shown on sheets 1–17 of Appendix A;

FIG. 1B is an enlarged view of a portion of the first embodiment of the slide rule of FIG. 1A.

FIG. 1C is a representation portion of the slide indicia of the music slide rule, and said portion or variation of said portion may be seen on sheets 3, 6, 8, 11, 13 and 17 of the seventeen sheets of Appendix A.

FIG. 2 is a partially broken end view of the slide rule reference device looking from the left in FIG. 1A;

FIG. 4 is an isometric view of the Slide-Rule of Scales portion of the music slide rule divided into segments 4A–4H;

FIGS. 4A–4H are segments 4A–4H of FIG. 4 enlarged to show the detail of the Slide-Rule of Scales portion of the music slide rule, and the detail is also shown on sheets 4 and 5 of 17 of Appendix A;

FIG. 5 is an isometric view of the Analytical Reference Slide-Rule of Intervals portion of the music slide rule divided into segments 5A–5J;

FIGS. 5A–5J are segments 5A–5J of FIG. 5 enlarged to show the detail of the Analytical Reference Slide-Rule of Intervals portion of the music slide rule, and the detail is also shown on sheets 7 and 9 of 17 of Appendix A;

FIGS. 5K–5N show the back of the slide of the Analytical Reference Slide Rule of Intervals in four enlarged segments, FIG. 5K upper left, FIG. 5L upper right, FIG. 5M lower left, and FIG. 5N lower right, respectively, and the detail is also shown of sheet 10 of 17 of Appendix A;

Figure 6:
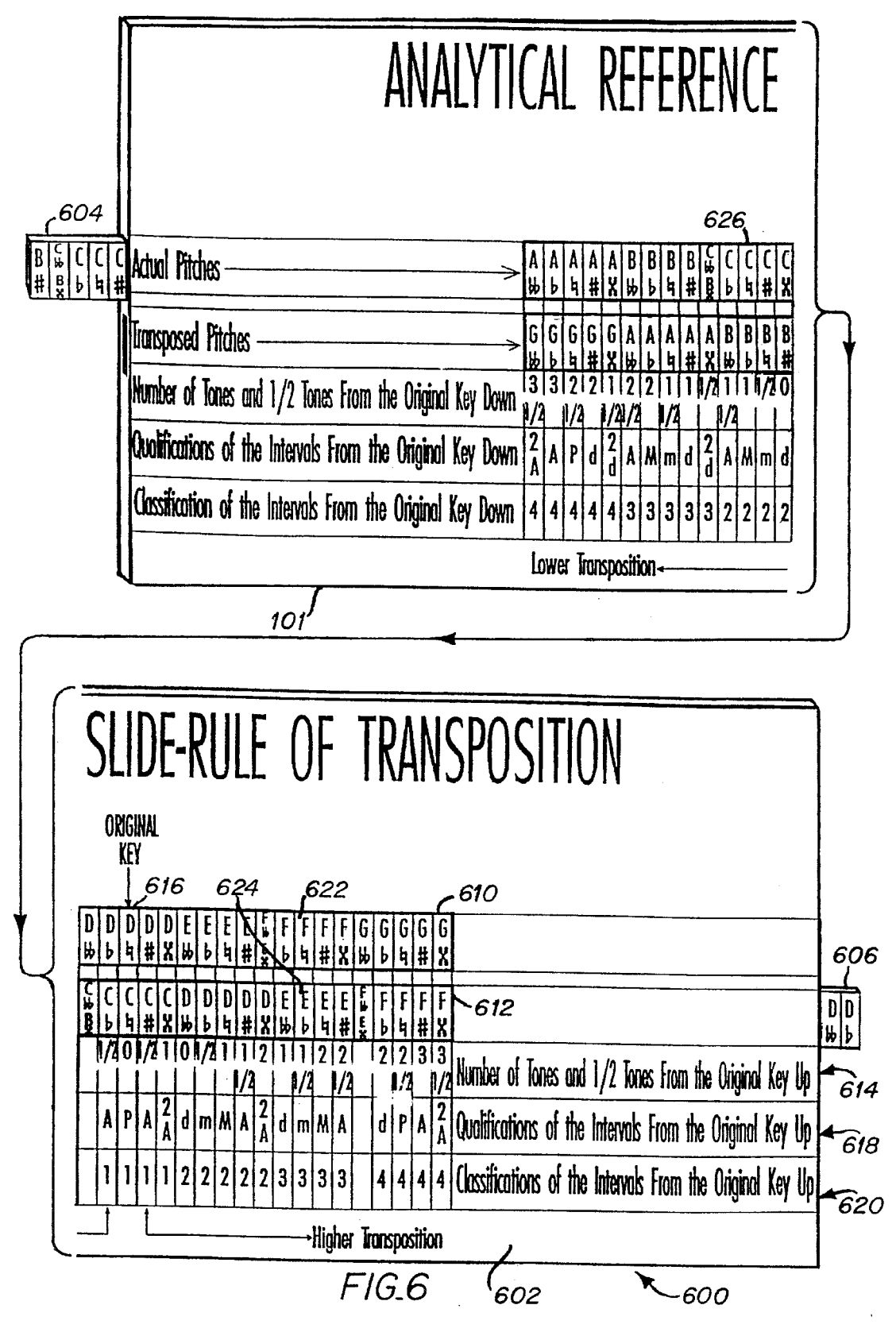

FIG. 6 is an isometric view of the Analytical Reference Slide-Rule of Transposition portion of the music slide rule, and is also shown on sheet 11 of 17 of Appendix A;

FIG. 6A is a representation portion of the slide indicia used with the rule of FIG. 6, and is shown on sheet 11 of 17 of Appendix A.

FIG. 7 is an isometric view of the Analytical Reference Slide-Rule of Intervals and Their Inversions portion of the music slide rule divided into segments 7A–7D;

FIGS. 7A–7D are segments 7A–7D of FIG. 7 enlarged to show the detail of the Analytical Reference Slide-Rule of Intervals and Their Inversion portion of the music slide rule, and the detail is also shown on sheet 12 of 17 of Appendix A;

FIGS. 8A–8F are segments 8A–8F of FIG. 8 enlarged to show the detail of the Analytical Reference Slide-Rule of Key Signatures portion of the music slide rule, and the detail is also shown on sheet 14 of 17 of Appendix A;

FIGS. 8G–8H show the arrangement of slide indicia used with the rule of FIGS. 8A–AF, and which slide indicia is also shown on sheet 15 of 17 of Appendix A;

Figure 9C:
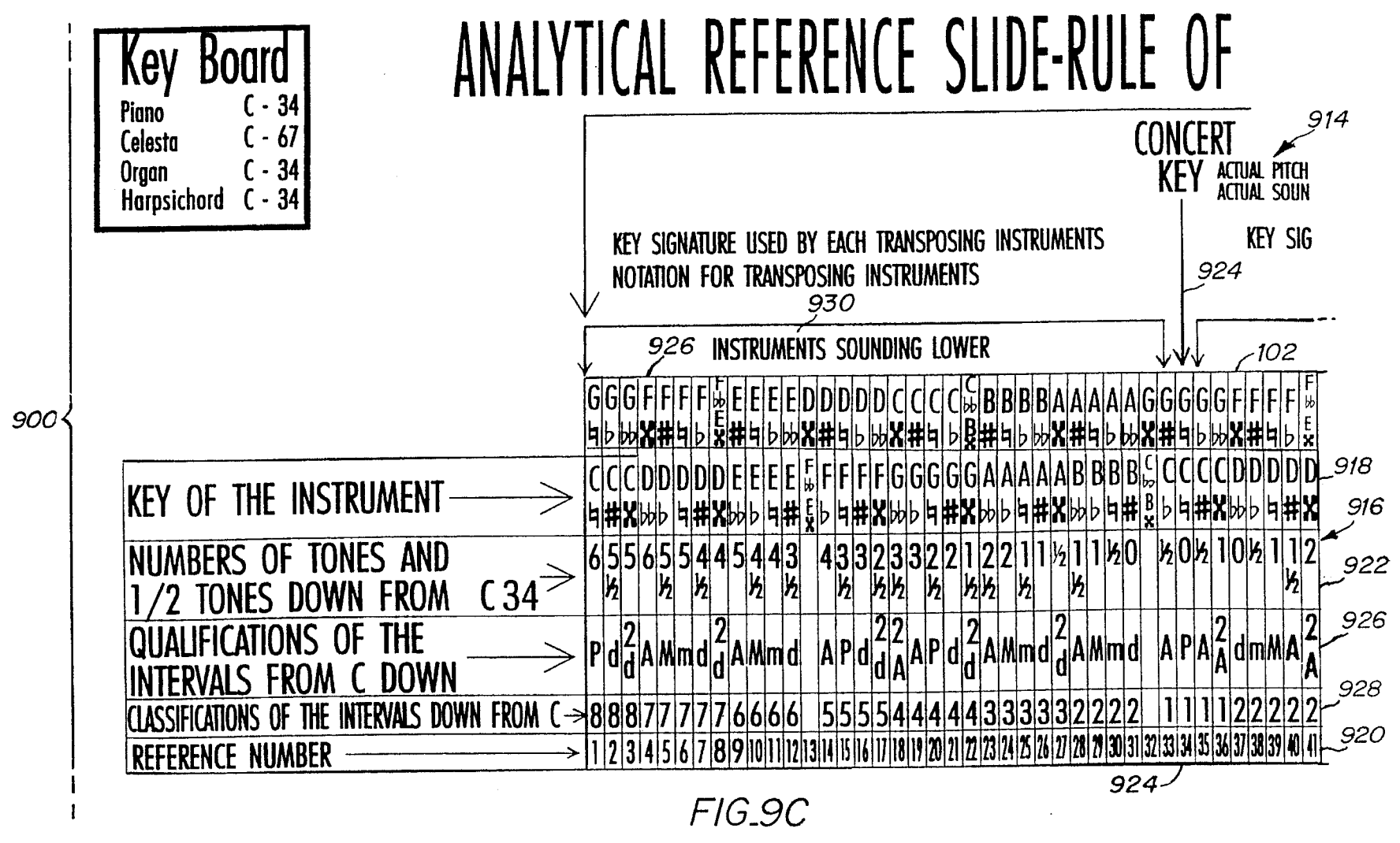

FIG. 9 is an isometric view of the Analytical Reference Slide-Rule of Transposing Instruments and the Transposing Clefs portions of the music slide rule divided into sections 9A–9D;

FIG. 9E shows the slide indicia used with the Transposing Clefs portions of the rule depicted in FIGS. 9A–9B, and which slide indicia is also on sheet 17 of 17 of Appendix A;

FIGS. 9A–9D are segments 9A–9D of FIG. 9 enlarged to show the detail of the Analytical Reference Slide-Rule of Transposing Instruments and the Transposing Clefs portions of the music slide rule.

APPENDIX A OF DRAWINGS

Figure 3C:
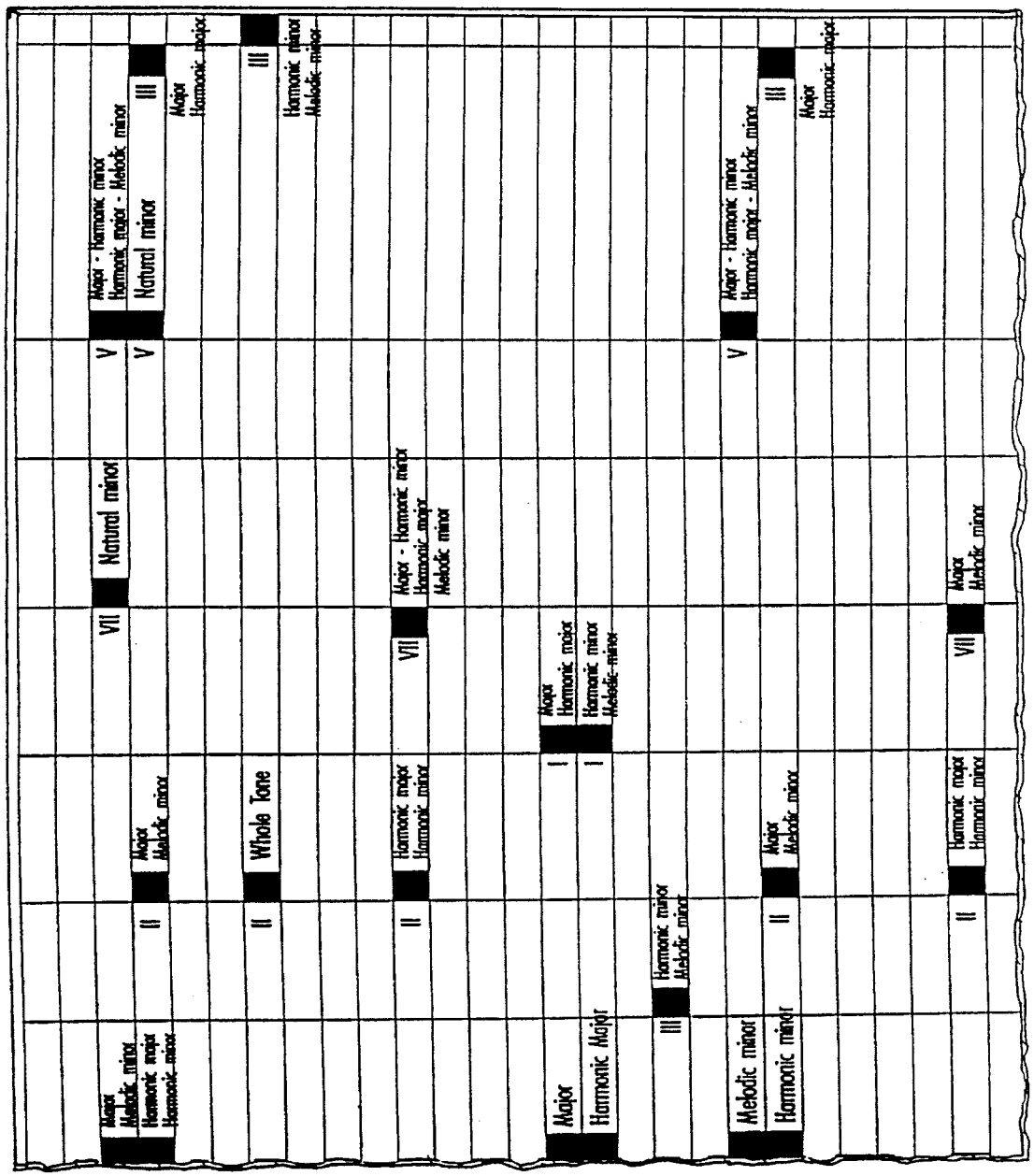
FIG. 3 is an isometric view of the Slide-Rule of Chords portion of the music slide rule divided into segments 3A–3o.
FIGS. 3A–3o are segments 3A–3o of FIG. 3 enlarged to show the detail of the Slide-Rule of Chords portion of the music slide rule, and the detail is also shown on sheets 1 and 2 of 17 of Appendix A.
Figure 3D:
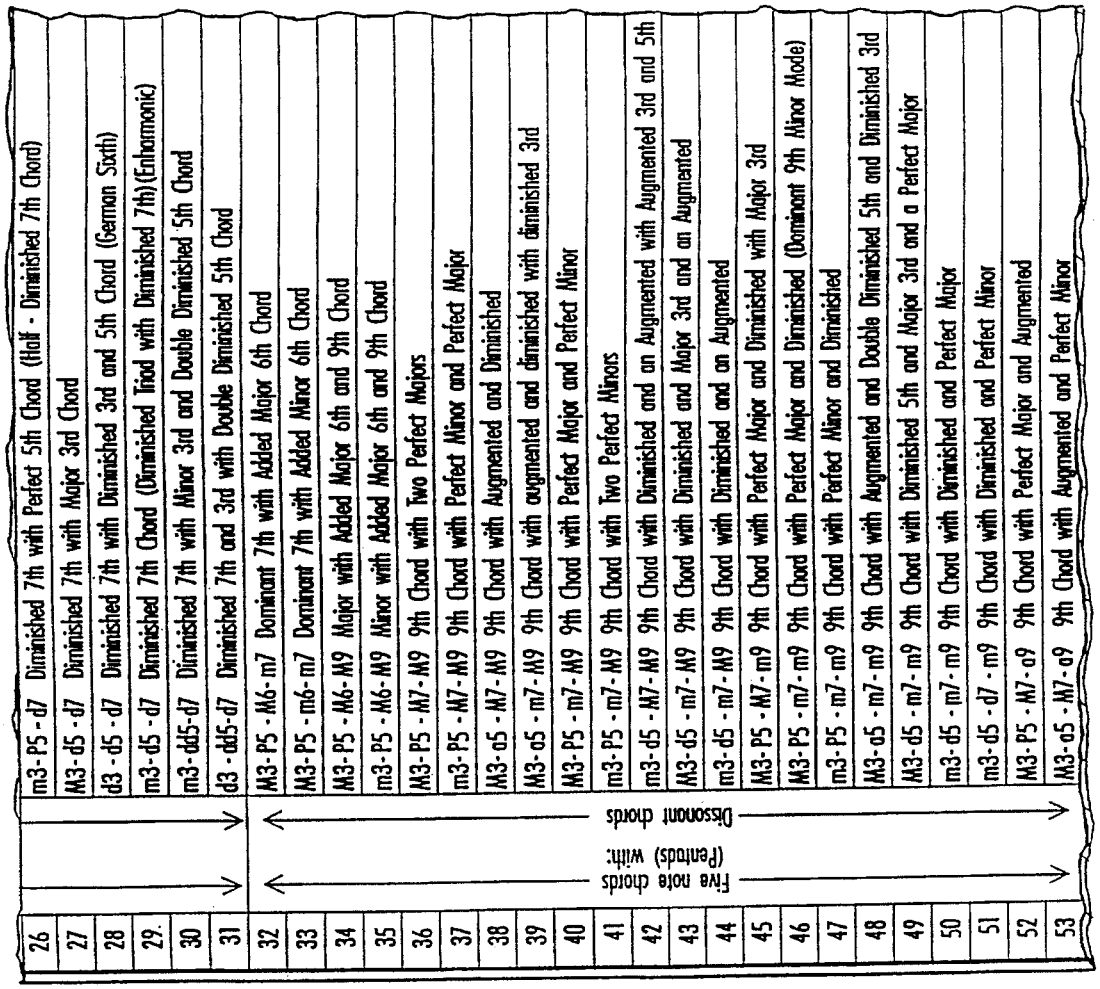
Figure 3E:
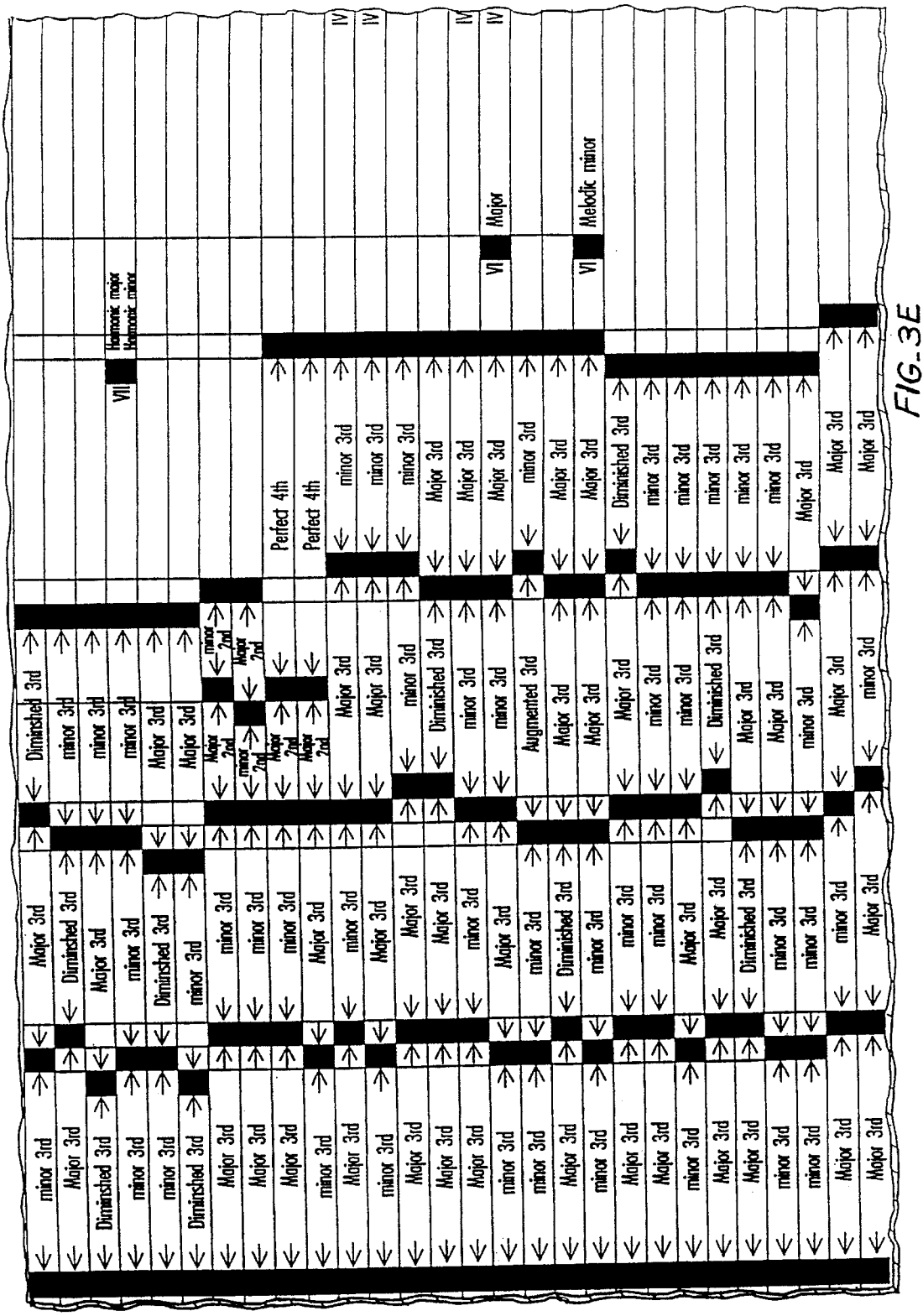
Figure 3F:
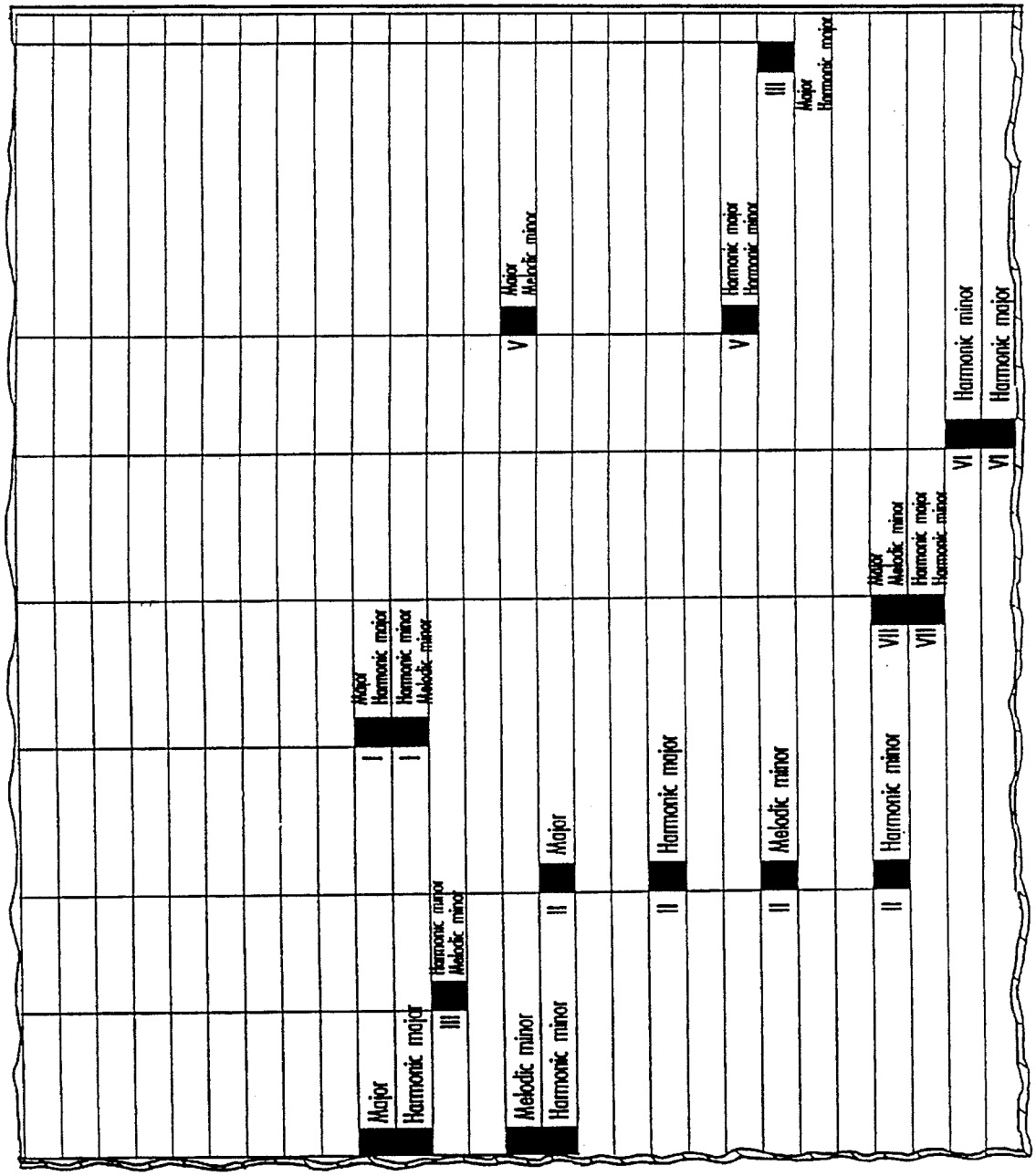
Figure 3L:
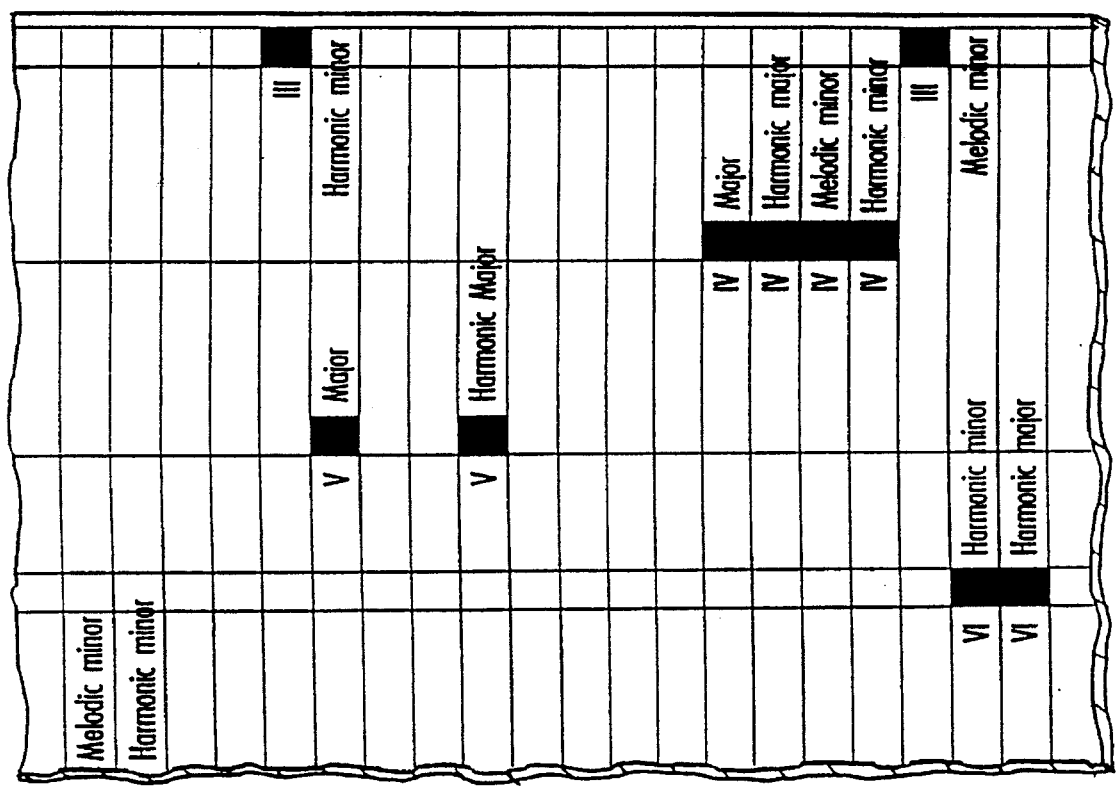
Figure 3N:
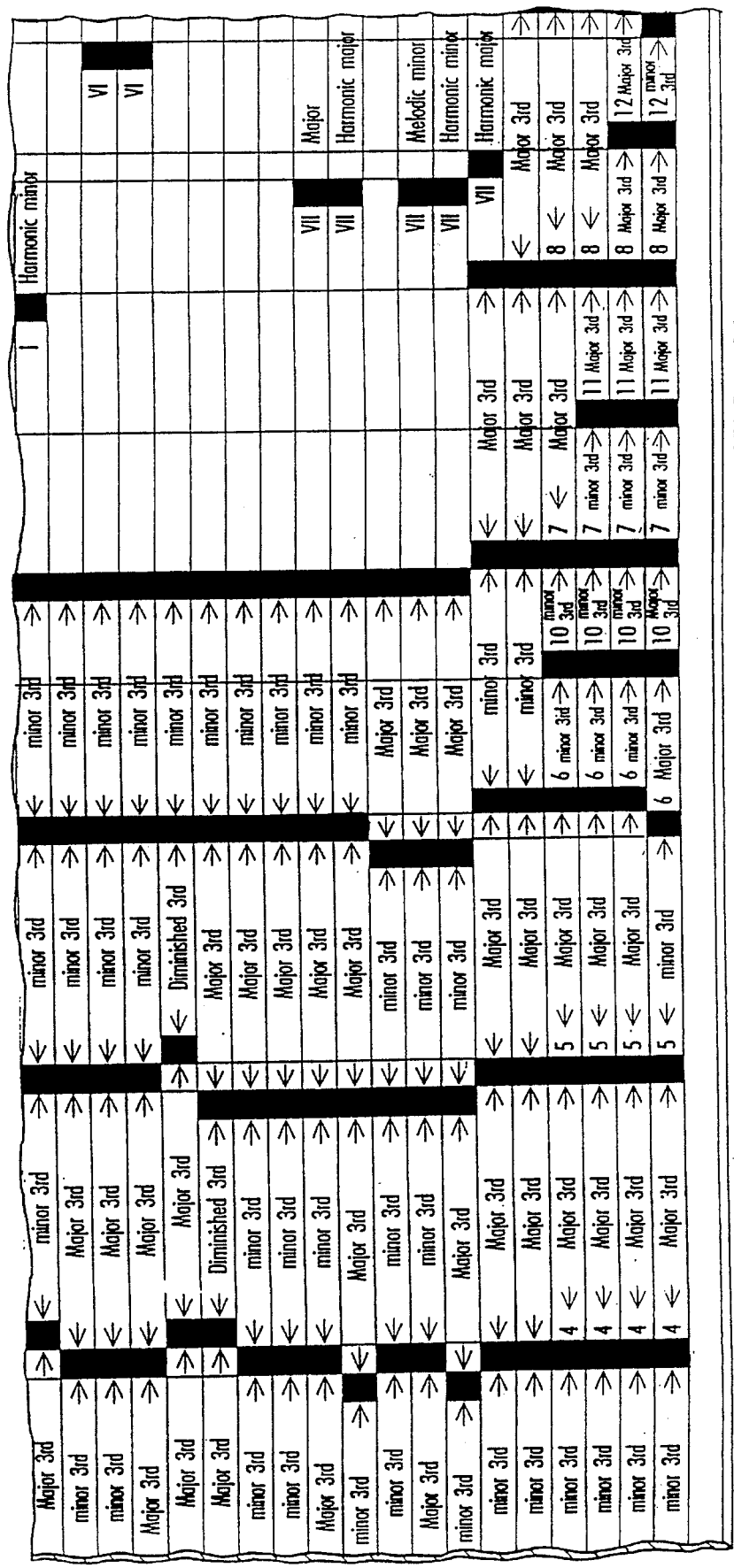

Appendix A comprises a series of seventeen oversized sheets of drawings showing the music indicia and cooperative aperture positioning of the invention shown in FIGS. 1A–9E respectively as follows:

Sheet 1 of 17: Analytical Reference Slide Rule of Chords, rule body indicia and cooperative aperture positioning for chord reference nos. 1–53;

Sheet 2 of 17: Analytical Reference Slide Rule of Chords, rule body indicia and cooperative aperture positioning for chord reference nos. 54–114;

Sheet 3 of 17: Analytical Reference Slide Rule of Chords, slide indicia cooperative to the portion of the rule body indicia and apertures shown in sheets 1 and 2 of 17;

Sheet 4 of 17: Analytical Reference Slide Rule of Scales, rule body indicia and cooperative aperture positioning for scale reference nos. 1–30;

Sheet 5 of 17: Analytical Reference Slide Rule of Scales, rule body indicia and cooperative aperture positioning for scale reference nos. 31–60;

Sheet 6 of 17: Analytical Reference Slide Rule of Scales, slide indicia cooperative to the portion of the rule body indicia and apertures shown in sheets 4 and 5 of 17;

Sheet 7 of 17: Analytical Reference Slide Rule of Intervals, rule body indicia and aperture positioning;

Sheet 8 of 17: Analytical Reference Slide Rule of Intervals; slide indicia cooperative to the portion of the rule body indicia and apertures shown in sheet 7 of 17;

Sheet 9 of 17: Analytical Reference Slide Rule of Intervals, rule body indicia and aperture positioning;

Sheet 10 of 17: Analytical Reference Slide Rule of Intervals, slide indicia cooperative to the portion of the rule body indicia and apertures shown in sheet 9 of 17;

Sheet 11 of 17: Analytical Reference Slide Rule of Transposition, rule body indicia and aperture positioning (lower portion of sheet) and slide rule indicia (upper portion of sheet) cooperative to the rule body indicia and aperture;

Sheet 12 of 17: Analytical Reference Slide Rule of intervals and Their Inversions, rule body indicia and aperture positioning;

Sheet 13 of 17: Analytical Reference Slide Rule of Intervals and Their Inversions, slide indicia cooperative to the portion of the rule body indicia and apertures shown in sheet 12 of 13;

Sheet 14 of 17: Analytical Reference Slide Rule of Key Signatures in 7 Clefs, rule body indicia and cooperative aperture positioning;

Sheet 15 of 17: Analytical Reference Slide Rule of Key Signatures in 7 Clefs, slide indicia cooperative to the portion of the rule body indicia and apertures shown in sheet 14 of 17;

Sheet 16 of 17: Analytical Reference Slide Rule of Transposing Clefs and Transposing Instruments, rule body indicia and cooperative aperture positioning; and Sheet 17 of 17: Analytical Reference Slide Rule of Transposing Clefs and Transposing Instruments, slide indicia cooperative to the portion of the rule body indicia and apertures shown in sheet 16 of 17.

SUMMARY OF THE INVENTION

A preferred embodiment of the invention includes a slide rule body in the form of a flattened sleeve having two rectangular flat surfaces defining a front and back side, at two substantially parallel edges, and having two open opposing ends. The front and back sides have musical data printed thereon and cooperative apertures through which is displayed musical data ("indicia") printed on a rectangular flat slide that is inserted into and through the slide rule body (sleeve) at one of the open ends. A cooperation between the indicia of the slide rule body and slide provide useful musical information to the user.

Horizontally and vertically aligned data (indicia) on the slide and body define chord tones and intervals for all keys. Scales with various numbers of tones from three to thirteen are defined. A vast variety of intervals, modulations and resolutions are given to aid the composer, with the various tones displayed for any key. Data is given for aiding in transcribing and transposing a score from one clef to another. A universal transposition rule section is included, as well as a specific guide to individual instruments defining their key relative to the concert key, and providing the appropriate transposition interval. The various sections ("portions") of the slide rule may all be incorporated on one large rule, or included in a preferred set of a number of more convenient separate rules.

An advantage to the present invention over the prior art is that it provides more extensive musical information in a more compact form. Another advantage is that it provides musical information in a compact, comprehensive form organized so as to aid the serious musician and composer. A still further advantage is that it provides a learning tool and system for use in understanding, teaching and composing music, due to its extensive reference information relative to composition.

A summary of the music information given by the musical slide rule are further described as follows:

A. ANALYTICAL REFERENCE SLIDE-RULE OF CHORDS

This Slide-Rule of Chords portion of the invention gives a total of 71,788 answers. It includes 3,306 chords over 29 different roots. Each of the roots, therefore, will have 114 different chords. This portion:

1. Analyzes the chord as follows:

in its formation;

in its intervalic from the fundamental; and in its intervalic by thirds. 2. Classifies the chord by the number of notes that it contains as:

Consonant,

Dissonant,

Natural, or

Artificial. 3. Places the chord:

in its respective modes, and in its respective grades. 4. Gives the chord:

its name or names, and its name according to the number of notes.

5. Has a Distance Verifier that gives:

the Intervalic Classified, the Intervalic Qualified, the Simple Intervalic, the Compound Intervalic, and the Compared Intervalic.

6. Transports chords:

As a result of its sliding function, this slide-rule has the capacity of transposing a chord to all different tones, even the Theoric tones.

7. Provides a comparative study:

Having all the chords laid out at the same time is the only way to compare them one to another, in order to be able to establish the differences that exist between them.

8. Provides the fundamental of each chord:

It is important, in a group of notes, to determine which one is the fundamental, since from the fundamental all of the relationships in a chord are established. Plus, it gives us the place in which the chord is formed.

B. ANALYTICAL REFERENCE SLIDE-RULE OF SCALES

The Slide-Rule of Scales portion of the invention includes 93,496 answers with more than 2,700 scales. This portion:

1. Analyzes the formation of the scales as follows:

in the Intervalic from the roots, in the Intervalic between consecutive grades as:
  a. Enharmonic Sound,
  b. Chromatic Semitone,
  c. Diatonic Semitone,
  e. 1½=minor 3rd, and
  f. 1-12=augmented 2nd 2. Classifies the scale by the number of notes that it contains:

by the total number of notes in a scale, and by the number of real sounds in a scale.

3. It gives any particular scale, the following:

name, or names—all the different names that appear in a line are the different scales with the same sound.

gives the 3 minor scales for each corresponding major scale, and indicates the corresponding major scale for each of the three minor scales.

4. It has a Distance Verifier that gives:

the Intervalic Classified, the Intervalic Qualified, and the Intervalic Simple.

5. Transposes scales: as a result of the slide function, it has the capacity to transpose a specific scale to all the different tones—even the Theoric tones.

6. Provides a comparative study:

a. to find all the scales that have the same number of notes (real sounds), b. to determine scales that sound exactly the same, but have different names, c. to view simultaneously the formation of a scale in relation to all the other scales, and d. when the scales with the same number of notes are found (real sound), to easily establish the equalities, similarities and differences that exist between the scale being analyzed and the rest of the scales having the same number of real sounds. By way of example, when speaking of similarities, and not equalities, we have the scales under the numbers 15 and 19. When compared, it can be established that both have 2 times 1½ Tone, but that in scale number 15, the 1½ is a minor 3rd, whereas in scale number 19, the 1½ is an augmented 2nd. This means that the minor 3rd is consonant and the augmented 2*d* is dissonant.

C. ANALYTICAL REFERENCE SLIDE-RULE OF KEY SIGNATURE IN 7 CLEFS

The Slide-Rule of Key Signatures portion of the invention includes 48,075 answers and contains the key signature for more than 2,700 scales in 7 clefs, separating them in flat and sharp key signatures. This portion:

1. Analyzes the Key Signature:

in relation to the Leading Tone, in relation to the Modal Grades, in relation to the Tone (up to 7 tones can be analyzed with respect to one key signature), and in relation to the Modal Leading Tone.

2. Analyzes the Clefs as follows:

analyzes the existing clefs, it relates one clef to every other existing one, analyzes the clef that can take the place of another one without changing the name of the notes, shows the clef to be used at a certain height according to the total range of the voices, whether human or instrumental, analyzes the clefs, separating them between: Lower, Medium and High ranges, between two different clefs, it shows which one is higher and which one is lower, it shows the clef used for any particular instrument, it also shows the instruments that use the same clef, separates the musical instrument or human voice that uses only one clef, separates the musical instrument or human voice that uses two clefs, separates the musical instrument that uses three clefs, and analyzing the number of clefs that exist in F, C, and G (only three clefs appear in the Grand Staff, the F, C and G Clefs, but when having a fixed staff, 7 Clefs appear).

3. Analyzes the Accidentals as follows:

gives the other name for the accidentals.

shows the number of accidentals or alterations.

gives the name to each accidental or alteration.

shows the accidentals or alterations that are found:
  a. at a distance of one semitone, ascending or descending,
  b. at a distance of a tone and a half, ascending or descending,
  c. at a distance of a tone, ascending or descending.
  d. at a distance of two tones, ascending or descending.

D. ANALYTICAL REFERENCE SLIDE-RULE OF TRANSPOSING INSTRUMENTS

The Slide-Rule of Transposing Instruments portion of the invention includes a list of 174 instruments and their pitches and gives a total of 14,513 answers. This portion:

1. Analyzes the instruments by groups by:
   a. presenting 6 groups of instruments:

| (1) | Bronze | (4) | Percussion |
   |---|---|---|---|
   | (2) | Wood | (5) | KeyBoard |
   | (3) | Metal | (6) | String | b. identifying the instruments that are transposing from those that are not,
   c. identifying the instruments that have in the pitch name the name of a transposing instrument, but are not transposing,
   d. organizing the instruments from the highest pitch to those that having the lowest pitch,
   e. identifying the several different instruments for one pitch, and
   f. identifying the same instruments known by other names depending on the country (Germany, Italy, France, England, etc.).
2. Analyzes the concert key:
   in relation to all the instruments that play in that concert key,
   the concert key separates all the instruments tuned higher from the ones tuned lower, and
   the concert key is the key signature for all the non-transposing instruments.
3. Analyzes the tone for the key signature of the transposing instruments.
4. Finds the concert key, the key signature and the key of the instrument.
5. It has a distance verifier that gives:
   the number of tones and ½ tones up from C 34,
   the qualification of the intervals from C up,
   the classification of the intervals from C up,
   the numbers of tones and ½ tones down from C 34,
   qualifications of the intervals from C down,
   classifications of the intervals from C down,
   NOTE: The distance verifier is needed to determine the correct concert key to be used for all of the transposing instruments, if the original concert key is changed.
6. Includes enharmonic keys which enables us to find an easier key to facilitate reading, writing, or simply playing.
7. Includes a reference number to quickly identify a particular instrument and the information pertaining to it.
8. Includes Transposing Clefs:
   for analyzing the distance between a particular key with reference to all other keys,
   showing the distance, upward or downward, from a particular key, and
   useful for:
   a. reading,
   b. playing,
   c. writing for a particular instrument that uses another key that we are not used to using, and
   d. transporting a score a set distance from a particular key.

E. ANALYTICAL REFERENCE SLIDE-RULE OF INTERVALS

The Slide-Rule of Intervals portion of the invention includes 16,349 answers. This portion:
1. Provides a semitone by semitone study:
   a. to determine which and to how many intervals does a semitone belong, and
   b. if the interval is known:
      to which scale does it belong,
      to how many scales does it belong,
      in which grade does it form, and
      in which or how many modes does it appear (or it is found).
2. Analyzes the augmented fourth:
   a. There are two classes of augmented fourths:
      1. the augmented fourth that is Tonal,
      2. the augmented fourth that is Modulant (there are 2 Modulant augmented fourths),
   b. if the augmented four is Tonal, it tells to which tone it belongs, and
   c. if the augmented fourth is Modulant, it tells to which two tones it can go.
3. Analyzes the diminished fifth in the same way as the analysis for the augmented fourth described above.
4. Diatonic Ascending Tone: 4 Semitones can be found on this Tone.
5. The diatonic descending tone (4 Semitones can be found on this Tone).
6. The ascending and descending chromatic tone.
7. The ascending and descending diatonic semitone.
8. The ascending and descending diatonic tone.
9. The ascending and descending chromatic semitone.
10. Analyzes the intervals in a Major Scale in:
    4 perfect intervals,
    4 major intervals,
    3 modal degrees,
    3 principal degrees,
    1 leading tone, and
    7 distances between degrees
11. Analyzes the intervals of a Harmonic Minor scale in the same way as the intervals in a Major Scale.
12. Contains two charts for memorizing intervals of a Major Scale and a Harmonic Minor.
13. Analyzes 16 intervals:
    those intervals written in two different ways, but with the same Classification and Qualification; and
    those intervals written in six different ways, but with different Classifications and Qualifications.
14. Analyzes the transformation of the intervals:
    the Perfect Intervals, up to two times larger,
    the Perfect Intervals, up to two times smaller,
    the Major Intervals, up to two times larger, and
    the Major Intervals, up to two times smaller

F. ANALYTICAL REFERENCE SLIDE-RULE OF INTERVALS AND THEIR INVERSIONS

The Slide-Rule of Intervals and Their Inversions portion includes 8,645 answers. This portion:
1. Analyzes the Classifications of: 3 Firsts, 4 Seconds, 4 Thirds, 4 Fourths, 4 Fifths, 4 Sixths, 4 Sevenths, and 3 Octaves.
2. Analyzes the Qualification for each of the: Firsts, Seconds, Thirds, Fourths, Fifths, Sixths, Sevenths, and Octaves.
3. Analyzes the number of Semitones contained in each existing interval.
4. Analyzes the distances of the semitones in an interval.
5. Analyzes the number of tones contained in an interval.
6. Gives the different names for a particular tone.
7. Gives the different names for a particular semitone.
8. Gives the different Classifications and Qualifications for any number of tones and semitones.

9. Inverts any interval and gives:
   the Classified distance,
   the Qualified distance,
   the number of semitones that it contains, and
   the number of tones that it contains.
10. Compares the interval with its inversion, computing:
   the total number of semitones, and
   the total number of tones.

NOTE: One of the biggest problems that a musician faces is the measurement of distances. Without a knowledge of the measurement of distances, there is no way of determining whether or not a chord is consonant, or if the chord is dissonant, and what distance(s) cause(s) the dissonance. Scales, like chords, also are measured in two ways: from the root and between two different grades. The same is true with Transposition.

G. ANALYTICAL REFERENCE SLIDE-RULE OF TRANSPOSITION

The Slide-Rule of Transposition portion includes 6,119 answers. This portion:

1. Analyzes the actual pitches. It analyzes, grade by grade:
   the number of tones and semitones from the original key up,
   the number of tones and ½ tones from the original key down,
   the Qualifications of the intervals from the original key up,
   the Qualifications of the intervals from the key down,
   the Classification of the intervals from the original key up, and
   the Classification of the intervals from the original key down.
2. Compares the Original Key with the Transposed Key:
   grade by grade, the Original Key with the Transposed Key, and
   simultaneously, in the two keys:
      a. all the Qualifications of the intervals,
      b. all the Classifications of the intervals, and
      C. the number of tones and semitones.
3. Analyzes and shows:
   the name of the note of each grade in the original key with the Transposed Key,
   what notes must be conserved, that have accidentals,
   what notes must be changed, that have accidentals,
   which of the Intervalics are consonant, and
   which of the Intervalics are dissonant.
4. Shows Higher and Lower sounds from the Original Key, i.e.:
   which sounds will sound higher from the original Key, and
   which sounds will sound lower from the original Key.

Note: There are two ways of transposing a score: 1) change the clef or 2) make a note-by-note change. The most difficult part in a written note-by-note transposition has to do with the accidentals. Sometimes the accidentals are kept the same, but the majority of the time they are changed. Thus, the problem presented and solved by this portion is which of the accidentals of the actual pitches are to be kept and which ones changed.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention. The various portions, functional features, or slide rules set out as integrated or separate slide rules ("portions") in the figures of the drawing may all be part of one large slide rule or may be included in a set ("system") of a number of separate slide rules. The printed matter ("data" or "indicia") of the figures may be included on one or both sides of the slide rule body or bodies and cooperates with and is part of the structure of the invention.

FIG. 1A schematically depicts a representative portion of a first embodiment of the music slide rule 100 of the invention in a partially broken perspective view. FIG. 2 is a corresponding partially broken end view of the slide rule reference device shown in FIG. 1A looking from the left.

Referring now to FIGS. 1A and 2, the rule body (i.e., "sleeve") 101 and slide 102 of the invention are preferably made of molded sheet plastic, but can alternatively be formed of paper or lightweight sheet metal. As shown in FIG. 2, the rule body 101 and slide 102 each have a front and back side 101a,b and 102a,b respectively. The rule body 101 preferably includes on at least the front surface 101a a plurality of rectangular apertures (i.e., "windows") 103 spatially arranged according to the principles of music theory and which correspond with the underlying slide indicia 104a–n. Said plurality of apertures are shown in FIG. 1A by way of illustration as having heavy border lines. Visible through said apertures 103 is corresponding music note indicia 104a–n. The music note indicia 104a–n is printed on at least the front side 102a of the slide 102. Adjacent each aperture 103 on the rule 101 is preprinted indicia 105 which in cooperation with the visible music note indicia 104a–n identifies and conveys particular musical data. Printed vertical and horizontal lines 107, 108 form a row and column graphical interface to assist the user in reading and understanding the corresponding slide music data 104a–n and rule indicia 105.

Each particular type and kind of musical data (i.e., slide indicia 104a–n and rule indicia 105) to be derived from the slide rule 100 is more fully explained in specific detail herein below. However, to determine a particular type and kind of music data, the user simply moves the slide 102 back and forth within the rule body 101 in the directions of the arrow 106 and reads the cooperating indicia 104a–n and 105.

Referring now to FIG. 1B there is shown an enlarged view of a representative portion of the first embodiment of FIG. 1A. Shown in greater detail is the front surface 101a of the rule body 101 having the row and column format formed by the vertical and horizontal lines 107, 108, and the apertures 103 with adjacent preprinted indicia 105 through which apertures 103 is visible the music note indicia 104.

One of the key features of this invention is the specific selection, arrangement and cooperation of slide indicia 104a–n. The slide indicia 104a–n comprises a selection of specific notes and their flats and sharps in the following order: C natural, C sharp, C double sharp, D double flat, D flat, D natural, D sharp, D double sharp, E double flat, E flat, E natural, E sharp, E double sharp (or F double flat), F flat, F natural, F sharp, F double sharp, G double flat, G flat, G natural, G sharp, G double sharp, A double flat, A flat, A natural, A sharp, A double sharp, B double flat, B flat, B natural, B sharp, B double sharp (or C double flat), and C flat. Referring now to FIG. 1C, this ordered notation is printed in standard musical note convention and is denoted as the universal scale 109.

As shown in FIG. 1A, the universal scale 109 is printed in rows 104a–n on the slide 102 corresponding to the rule 101 row and column format of the rule indicia 105 and rule apertures 103. The universal scale 109 is repeatedly printed horizontally on at least one side of the slide 102, as required by corresponding data on the rule body 101 and repeated in a number of rows sufficient to provide indicia to display through the apertures 103 of the rule body 101 as described in the following many figures of the drawing. Each row of the slide indicia 104a–n comprises the universal scale repeated sequentially across the rule 101 as many times as is required to convey all the music data of the type to be computed (chords, scales, intervals, etc.). Each horizontal row is then replicated and printed as many times as required to correspond to the number of rows on the rule 100 having apertures 103.

Regardless of the type of music information to be computed, the order of the universal scale 109 remains universally the same. However, as one skilled in the art would understand, the starting and therefor the ending note of the universal scale 109 may differ according to the type of music data to be conveyed.

This universal scale 109, provides a particularly useful spatial relationship between the notes facilitating the construction of the slide rule 100 of this invention as shown and described herein such that a user can easily and handily compute, analyze, learn, teach and compose substantially all known relationships with regard to chords, scales, modes, intervals, transpositions, and transposing instruments.

A. Analytical Reference Slide Rule of Chords:

Referring now to FIG. 3, there is shown a plan view of a first portion 300 of a first embodiment of the music slide rule 100 (FIG. 1A) divided into segments FIGS. 3A–3O. First portion 300 is otherwise referred to as the "Slide Rule of Chords." This is because the music data to be computed and analyzed relates to substantially all aspects of music chords. Due to the large quantity of data included in the first portion 300, as well as other portions of the rule 100 to be described in the following, it is necessary to display each portion in segments. FIG. 3 shows the order of segments of the portion 300 as displayed in FIGS. 3A–3O. Although FIG. 3 displays the various segments in one block, alternative embodiment can include part of the first portion 300 on one or the other or both sides 101a and 101b of the rule body 101. The alternative embodiments apply to the other portions of the music slide rule 100 as described herein and shown in the figures of the drawing as well. [The slide 102 indicia is a series of rows of the universal scale 109 repeated horizontally to provide indicia for the apertures as shown in FIGS. 3A–3O.]

Referring now to FIGS. 3A and 3B, the top two rows include a first row 301 and a second row 302 which are respectively identified by the words "Interval Qualified" and "Interval Classified." The word "Qualified" means that a particular interval can increase or decrease in size. For example, a 2nd can become bigger [Major, Augmented] or smaller [Minor, Diminished] but still remain a 2nd. The corresponding first row 301 letter designations in FIG. 3B are defined as follows:

| | | |
|---|---|---|
| P = perfect | Au = augmented | m = minor |
| M = major | di = diminished | 2di = double diminished |

Below the Interval Qualified row 301 is a row 302 which indicates the "Interval Classified" for each of the 114 named chords; i.e., whether the interval from the fundamental or root note "P" to each of the constituent notes of any of the given 114 chords is "1" (First), "3" (Third), "4" (Fourth), "5" (Fifth), "6" (Sixth) or "7" (Seventh). Also given through a single aperture as shown (reference line 1, FIG. 3B) is the simple interval equivalent "2" and the compound interval "9."

Below the Interval Qualified and Interval Classified rows 301, 302, is printed each of the 108 known and traditionally named chords plus six rarely used chords 303 which have been named as the "15th," "17th," "19th," "21st," "23rd," and "25th" Chords, respectively (FIG. 3M). Each of the 114 "named" chords 303 is given a reference number 304 from 1 to 114 and printed in ascending order according to the number of notes comprising each chord. If a chord is known by more than one name, the alternative names have been provided in parentheses such as, by way of example, the chords identified at reference numbers 1, 2, 6, 9 through 14, etc.

The chords having the same number of notes, e.g., three (Triads), four (Tetrads), five (Pentads) etc., are identified in column fashion 305 with arrows indicating the range and text defining the groups. By way of example, the chords referenced by numbers 1 through 10 are identified as "Three Note Chords (Triads)." The "consonant" and "dissonant" chords are similarly identified 306. In addition, the classification and qualification of each chord is spelled out (e.g., "M3-P5," "m3-P5," "M3-P5-M6," etc.) in column fashion 307 for each chord referenced by number (1–114).

Referring now to FIG. 3B, on each row of referenced chords (1–114), the interval between each constituent note (showing through the corresponding aperture from the slide) is identified by text and arrows 308 indicating the range of measurement. This is known as the "interval by superposition." The apertures are identifiable in the figures by darker bordering and/or by a selected note indicia displayed therethrough from the slide 102 for illustrative purposes. By way of example, the interval by superposition between the first and second notes of reference chord number 1 ("Perfect Major") is "Major 3rd" and the interval by superposition between the second and third notes is "minor 3rd." The interval by superposition is likewise identified for each of the referenced chords (1–114).

Following the constituent notes of each chord on each referenced row, there is identified adjacent the left side of the corresponding aperture the natural grade(s) of the scale in which a chord is found 310. There are as many as seven natural grades that certain given chords can occupy. As shown, each is individually represented by a roman numeral from I to VII. Adjacent the right side of the corresponding aperture, there is given the name(s) of the mode(s) 311. Through the aperture from the slide 102 is given the note (tone) of the grade in the particular mode. By way of example and referring to FIGS. 3B and 3C, in chord reference number 1 there are six grades having associated therewith 12 modes (III Natural Minor, 1 Major and Harmonic major, VI Natural minor and Harmonic minor, IV Major and melodic minor, VII Natural minor and V Major, Harmonic Minor, Harmonic major and Melodic minor). If no natural grade is identified on any given row, this means that the chord is an artificial chord, i.e, one that would not be composed over a natural grade. By way of examples, see chord references 3, 4, 6–8 and 10–12, etc., where no natural grade is identified.

Referring generally to the Slide Rule of Chords portion 300, FIGS. 3A–3O, each of the "named" chords referred to by reference numbers 1 through 114 actually represents not just a single chord, but 29 calculable chords each having a common reference name. Each of the 29 chords of a same name differ by the selection of one of the twenty-nine "fundamental" or "root" notes corresponding to the 29 individual notes printed on the slide 102 of the invention 100. By way of example, reference number 1 will allow the calculation of 29 different Major (Perfect Major) chords. Thus, the overall number of calculable chords (29 times 114) equals 3,306 chords.

Figure 4B:
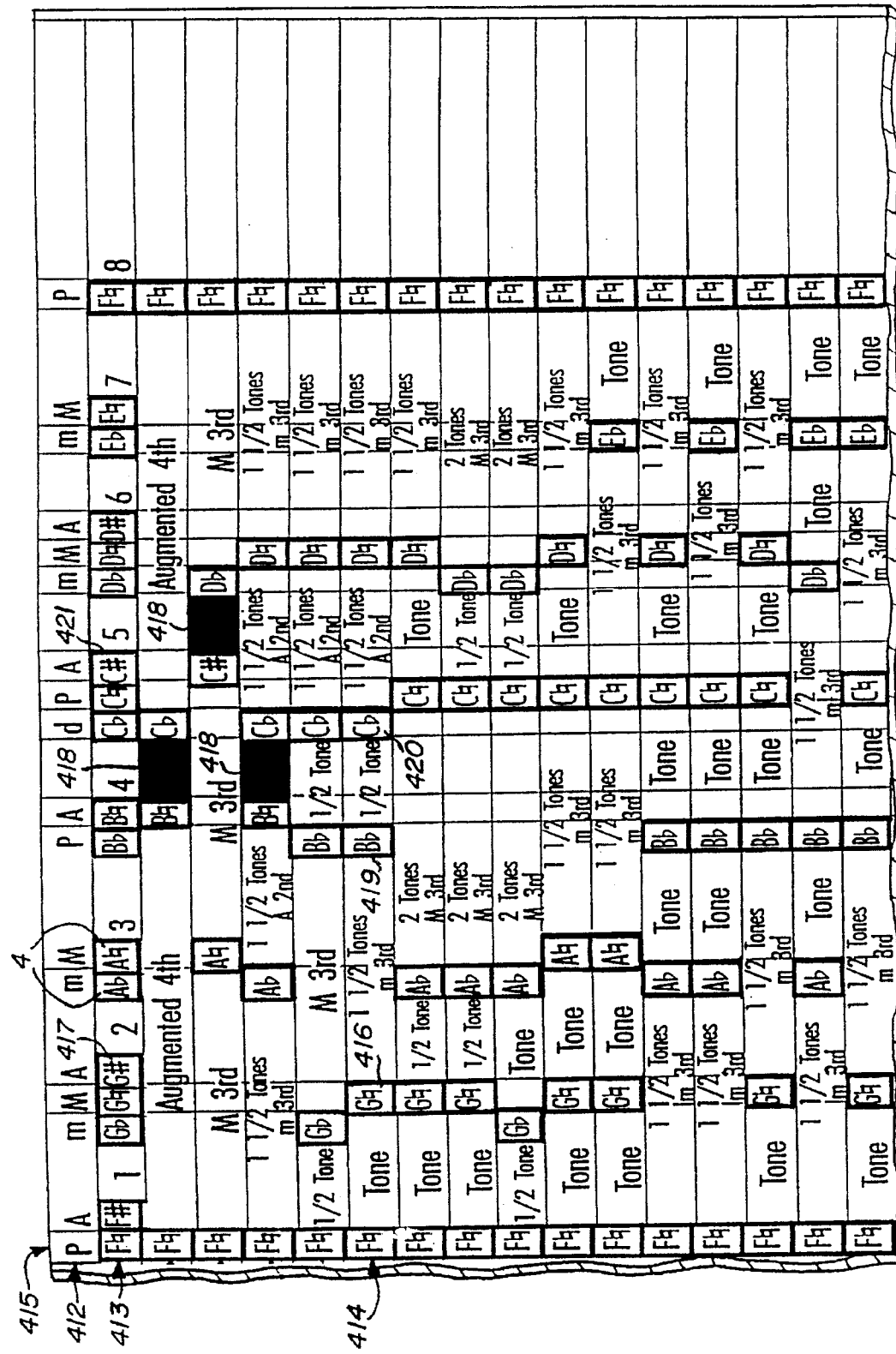
Figure 4D:
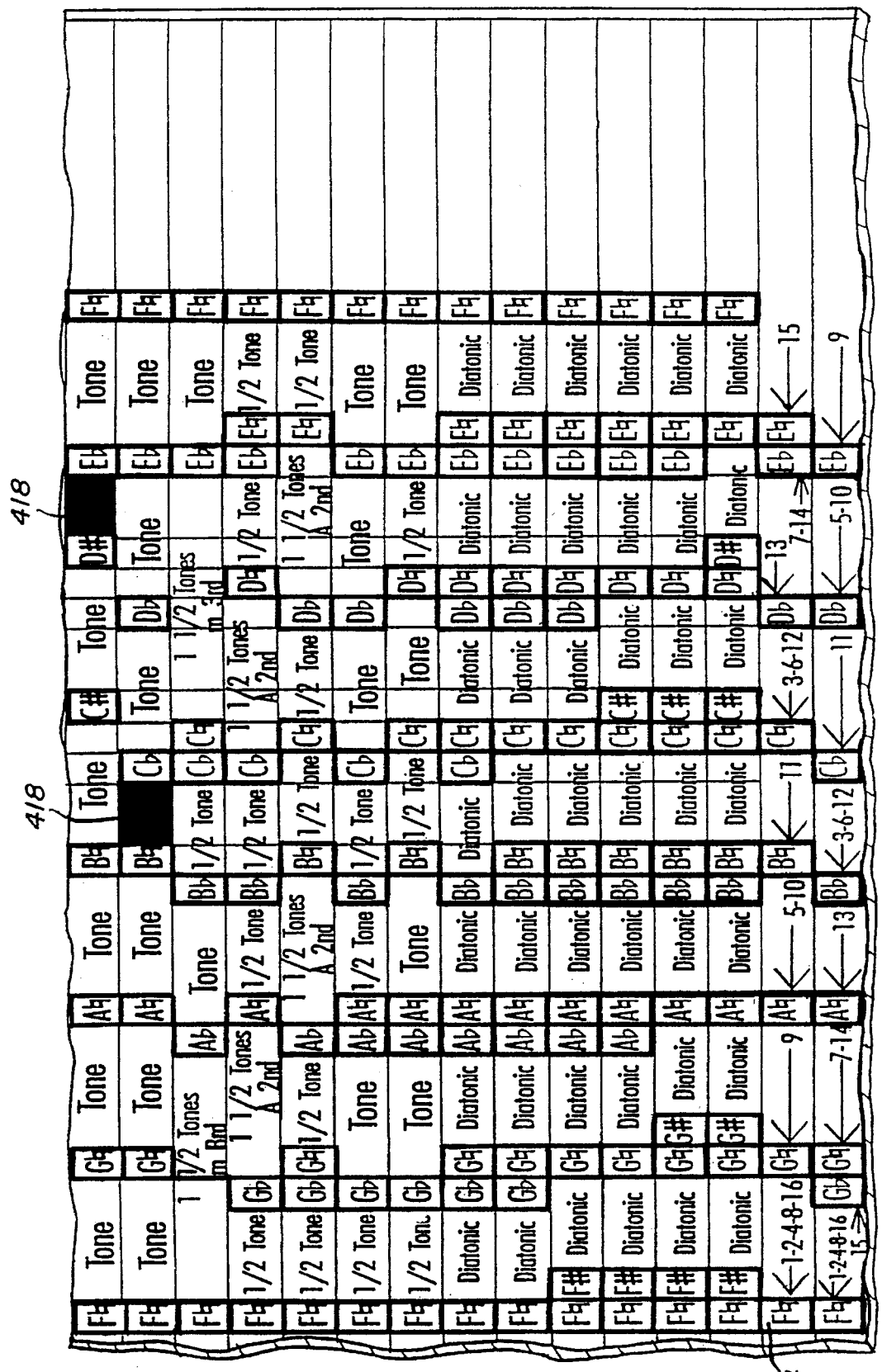
Figure 4E:
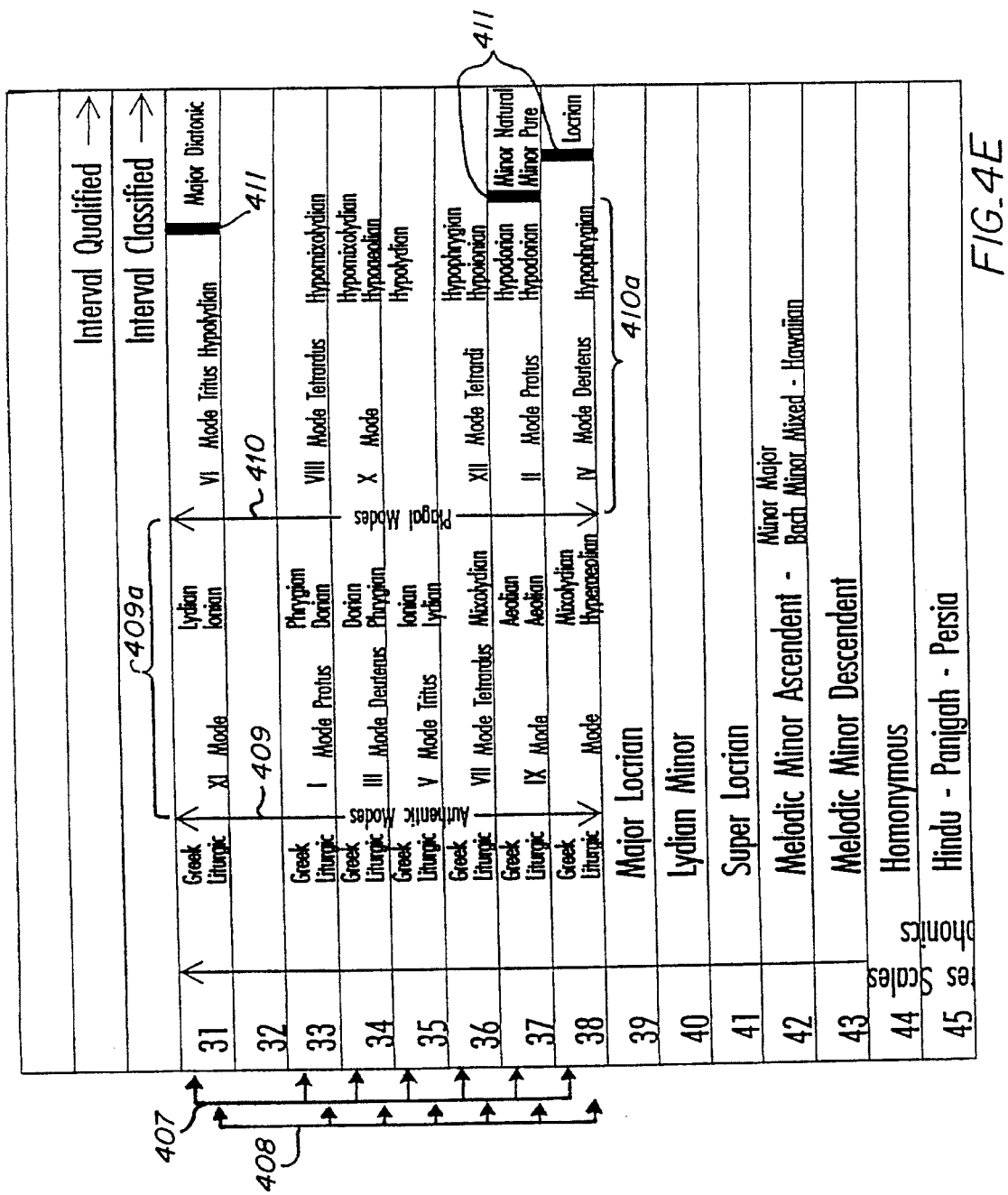

Each chord of this portion 300 of the invention 100 (FIG. 1A) is derived by manually moving the slide 102 within the rule 101 such that the desired root note on the slide 102 appears through the apertures identified at column "P" 309 (FIG. 3B). B. Analytical Reference Slide-Rule of Scales:

Referring now to FIG. 4, there is shown the plan view of a second portion 400 of a first embodiment of the music slide rule 100 (FIG. 1A) divided into sections FIGS. 4A–4H. This second portion is otherwise referred to as the "Analytical Reference Slide Rule of Scales." This is because the music data to be computed and analyzed relates to substantially all aspects of music scales.

The slide 102 indicia is the universal scale 109 repeated to form a series of horizontal rows to serve the apertures as described in the following FIGS. 4A–4H.

The Slide Rule of Scales 400 defines the various musical scales, giving the scale names, notes and interval designations.

Referring generally now to FIGS. 4A, 4C, 4E and 4G, and particularly to FIG. 4A, the first left hand column 402 contains reference numbers from 1–60 for the various scale types. To the right of each reference number, the number of notes 404 in the particular scale is spelled out, the number including the root note and its harmonic one octave higher. The words in brackets "[. . . ]" adjacent to the words identifying six or more notes simply indicates that the scale has one less note if the octave tone is omitted. Following this, the name or names of the scale 406 are given.

There are one or more names identifying each scale, and in some cases one name identifies more than one scale. For example, reference numbers 33 and 34 both contain the name Dorian. In fact, the Dorian scale of number 33 is a Liturgic Dorian Scale, whereas the Dorian scale of number 34 is a Greek Dorian Scale.

In historical and related interest to the Pentatonic scales on reference lines 9, 12, 13, 14 and 15, a Mr. Gevaert discovered four different types of scales that he called Pentaphonic [I–IV]. The Japanese use type 1, and the Egyptians, Assyrians, and Babylonians use type I–IV. The first Pentatonic Mode (reference line 9) is the same as the first type of Pentaphonic Gavaert Scale. The II Pentatonic Mode (reference line 12) corresponds to the IV type of Pentaphonic Gevaert Scale.

Reference lines 31, and 33–38 (FIG. 4E) identify various scales "Greek/Liturgic" requiring additional definition. Each corresponding row provides for two sets of information. The information on the top half 407 of each row is separate from the information on the bottom half 408, and is read from left to right. In addition, there are two vertical arrowed lines 409 and 410 separating the information into two sections. The first arrow 409 from the left margin is called the Authentic Mode Arrow. All the information to the right of this arrow 409a and before the second arrow 410 pertains to the Authentic Mode, the scales named in that region 409a of the rows 31 and 33–38 are known as Authentic Scales. The second arrow 410 is called the Plagal Arrow and all the information 410a to the right of this arrow pertains to the Plagal Mode, the scales denoted therein as Plagal Scales.

The heavy bars 411 at the right ends of lines 31, 37 and 38 are there to separate the other scale names from the names to the right of the bars, which names are neither Greek nor Liturgic.

Figure 4F:
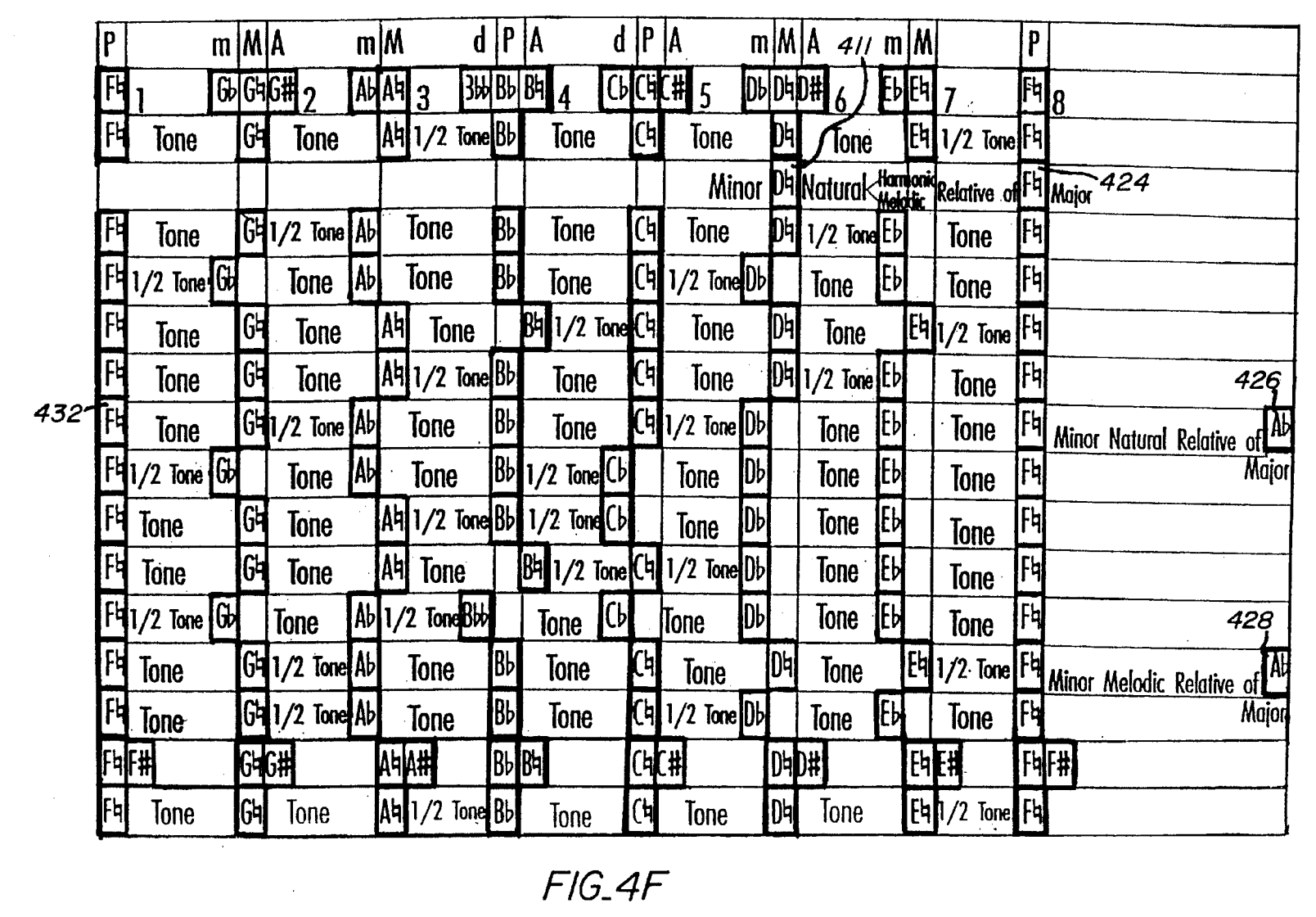
Figure 4H:
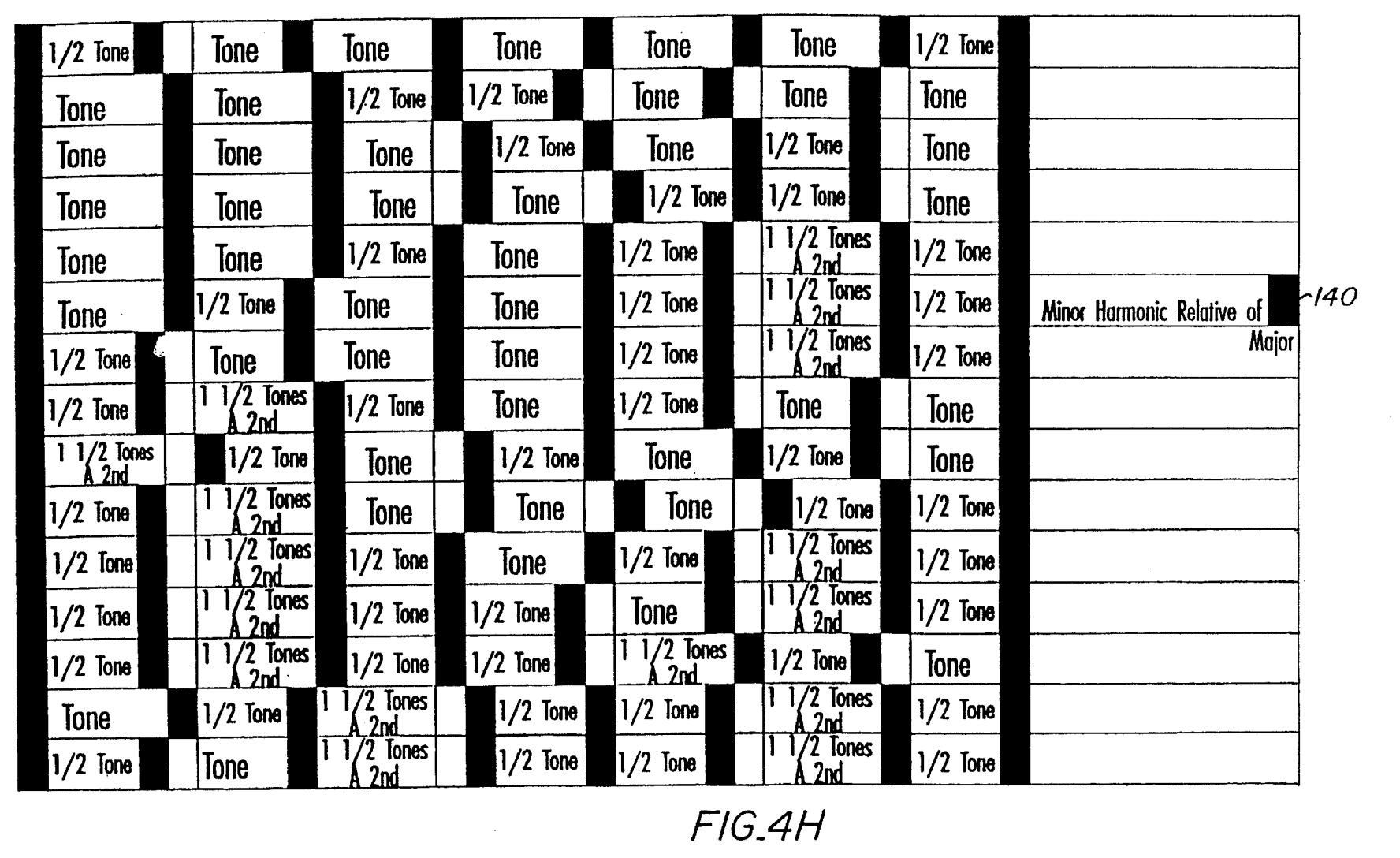

Referring further to FIGS. 4A, 4C, 4E and 4G, the top two rows include a first row 412 and a second row 413 which are respectively identified in FIG. 4A by the words "Interval Qualified" and "Interval Classified". The word "Qualified" means that a particular interval can increase or decrease in size. A 2nd can become bigger [Major, Augmented] or smaller[Minor, Diminished] but still remain a 2nd. The corresponding first row 412 letter designations in FIG. 4B are defined as follows:

| P = perfect | A = augmented | m = minor |
|---|---|---|
| M = major | d = diminished | |

The second row 413 shows eight numbered scale positions, with apertures displaying the corresponding notes on the slide 102. In demonstration, refer to row 414 (FIG. 4B) corresponding to reference number 5 as noted in FIG. 4A. FIG. 4B shows the slide 102 in a position with "F natural" displayed in the root note or "P" column 415. The next aperture 416 to the right from column 415 displays a "G natural" as the second note of the scale, and following the column in which aperture 416 lies all the way to the top shows it terminating in the letter "M" in the Interval Qualified row 412. In row 413, Interval Classified, the "G natural" is again displayed in aperture 417 in the same column as the aperture 416. Note that aperture 417 displays three notes; G flat, G natural and G# in the example slide setting of FIG. 4B. To the right of the G# in aperture 417, the letter "2" is printed. This means that the interval from the fundamental in column 415 to the next note of the scale (G natural) is a "M 2nd" [major second]. The distance between the notes defining an interval is given in tones, ½ tones (semitones) and ½ tones printed between the apertures of the rows corresponding to reference numbers 1–60. Further definition of selected intervals is given, defining them as "m 3rd" (minor third), Augmented 4th, etc.

FIGS. 4B, 4D, 4F and 4H define the various notes for each scale on reference numbered rows 1–60. The distance of a half tone is referred to as a "Diatonic Semitone", and if the two notes are adjacent to each other they are called "Chromatic Semitones". An additional convention is indicated by the gray areas 418 shown in reference lines 1, 2, 3 (FIG. 4B) and 16 and 17 (FIG. 4D) separating two notes showing through the apertures on either side. Only one of the notes is to be used in the scale, since both notes represent the same pitch.

Attention is drawn to the construction of the minor scales in scale reference number rows 32, 37, 42 and 51. The "Minor Natural Harmonic/Melodic Relative of Major" in row 32 refers to the sixth and eighth grades of the scale in reference number row 31. Using the displayed slide indicia as shown through the apertures 422 and 424, row 32 states that the D natural, harmonic and melodic scales are formed from and begin on the sixth degree of the F natural major scale.

The last column in rows 37, 42 and 51 contain the words "Minor Natural/Melodic/Harmonic Relation of Major" and serve as a reminder that the scales of these rows have the root note of column 415 formed from the sixth degree of the major scale with the root note displayed in apertures 426, 428 and 430 (note not shown) respectively for the scales of rows 37, 42 and 51. For example, the scale of row 32, has the root note F natural (aperture 432) which is the sixth degree of the A flat major scale (aperture 426).

The scales in rows 29 and 30 require explanation because they span four full octaves. The numbers refer to the position of a particular displayed note in the scale indicated by the associated arrow. For example, in row 29 the series of digits 1-2-4-8-16 are pointed to the F natural displayed in aperture 434, meaning that the 1st, 2nd, 4th, 8th and 16th note in the scale are F natural. Examination of the elements of the row reveals that the 3rd note is C natural, the 4th is F natural, the 5th is A natural, the 6th is C natural, the seventh is B flat, etc. The scale label in FIG. 4C refers to the scale as Harmonics-Upper Resonance, meaning that there is an ascending scale with the first note (1) being the lowest tone, the second (2) at a higher pitch etc.

In fact, all of the scales 1–60 are ascending in order except for reference row 30, which is descending with the first tone (1) being the highest pitch, the second (2) being lower in pitch, etc.

In use, a particular type of scale is selected corresponding to one of the reference numbers 1–60. The number of notes in the scale (column 404) and the scale name (column 406) are presented in the numbered rows (1–60) following the reference number (column 402). The root note ("P") of the scale (column 415) is then selected and the slide 102 (FIG. 1A) is positioned so that a desired root note letter designation on the slide 102 appears through the apertures at column 415. This letter represents the first note of the scale. Proceeding to the right of the apertures 415, the interval description (number of tones, major, minor, etc.) between the root note and the second scale note is given, followed by an aperture showing the corresponding letter designation from slide 102 for the second note in the scale. Following to the right of this note, there is given a description of the interval between the second and third notes of the scale, etc. The relationship of any of the particular notes of the selected scale to the root note ("P") is determined by projecting ones view vertically from the particular aperture displaying the note to the same note designation in the second row 413 entitled "Interval Classified". Then reading the letter immediately above the note in row 412, one is given the Qualification, i.e., description or definition of the interval from the root note to the particular note being analyzed.

By way of further example, FIG. 4B shows the slide in a position where "F natural" is selected as the root note showing through the root aperture column 415. If the scale selected to be analyzed is reference line 5 (FIG. 4A), the row 414 indicates that the scale has 5 notes ("Pentaphonic") and is called "Japanese II Type." The interval from the root note F natural to the next note G natural as shown through aperture 416 is one tone. The next interval is a "m 3rd" (minor third or ½ tones) to the next note showing through aperture 419 which is "B flat," etc. The next scale tone is a "C flat" showing through aperture 420 and reflecting upward to the Interval Classified row 413 and then the Interval Qualified row 412, it is seen that the interval from the root F natural to C flat is a "d" or diminished interval. The letter "5" to the right of the aperture 421 reveals that the C flat occupies what would be a 5th scale position in an eight note scale.

Figure 5A:
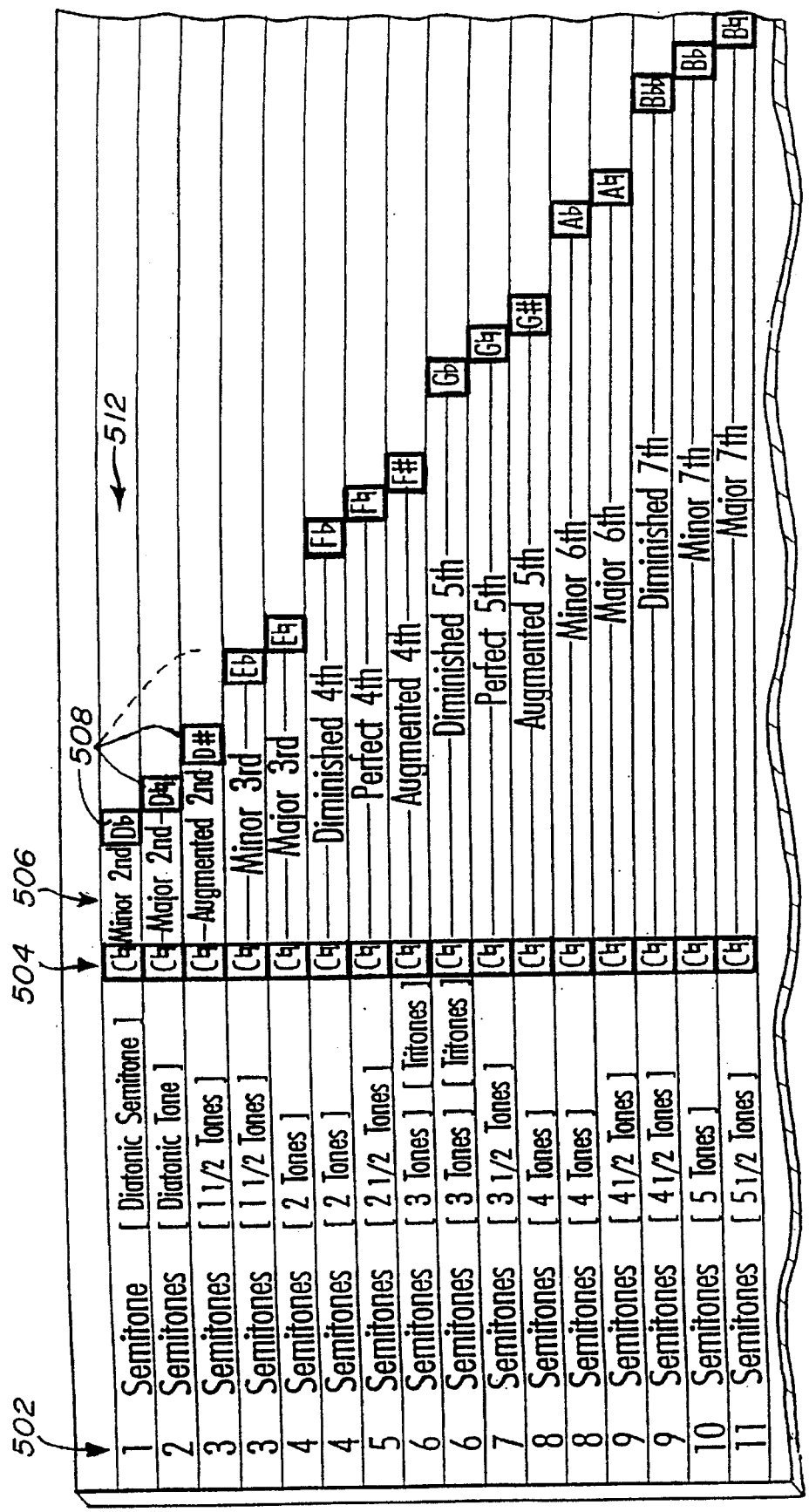
Figure 5E:
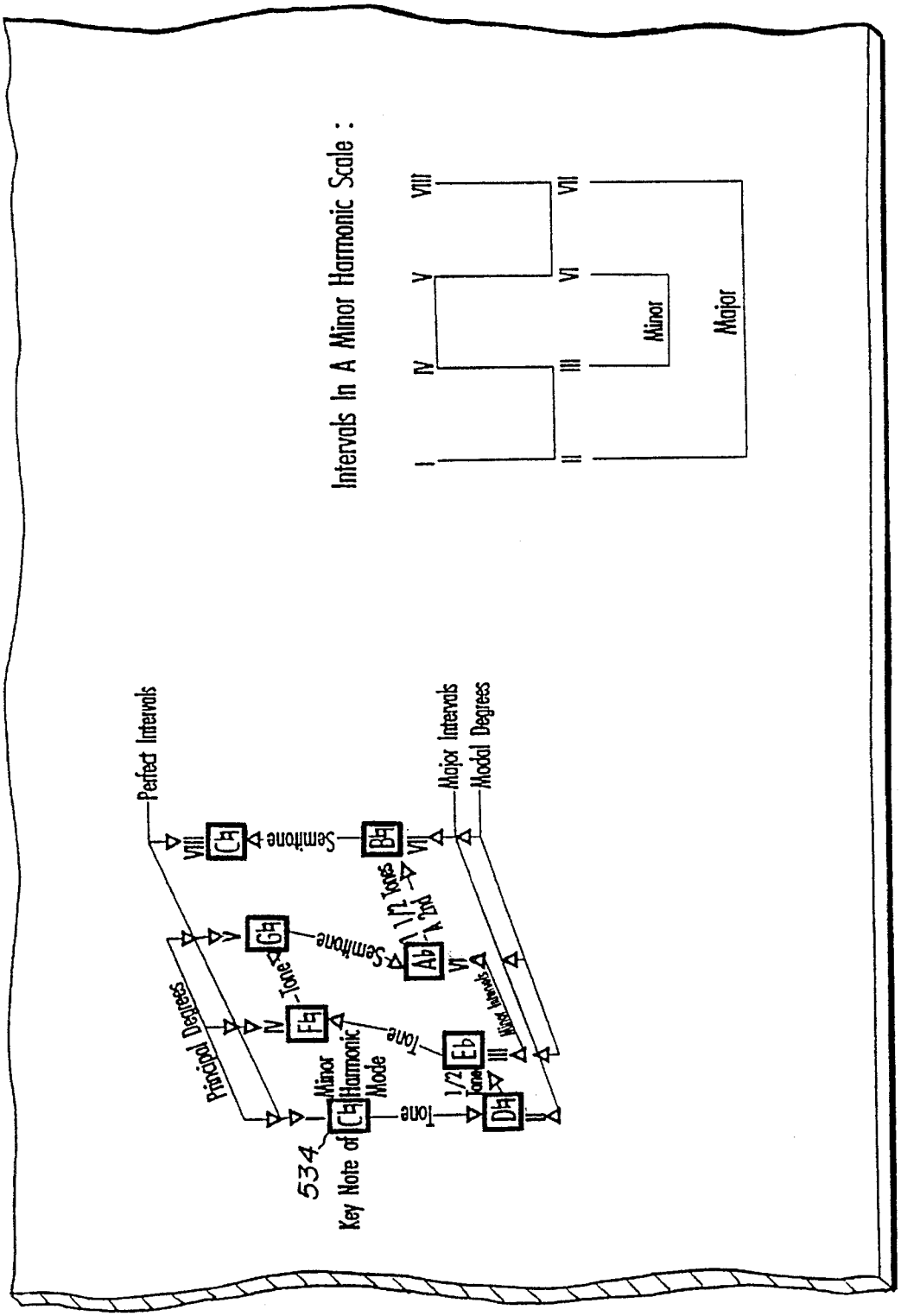
Figure 5H:
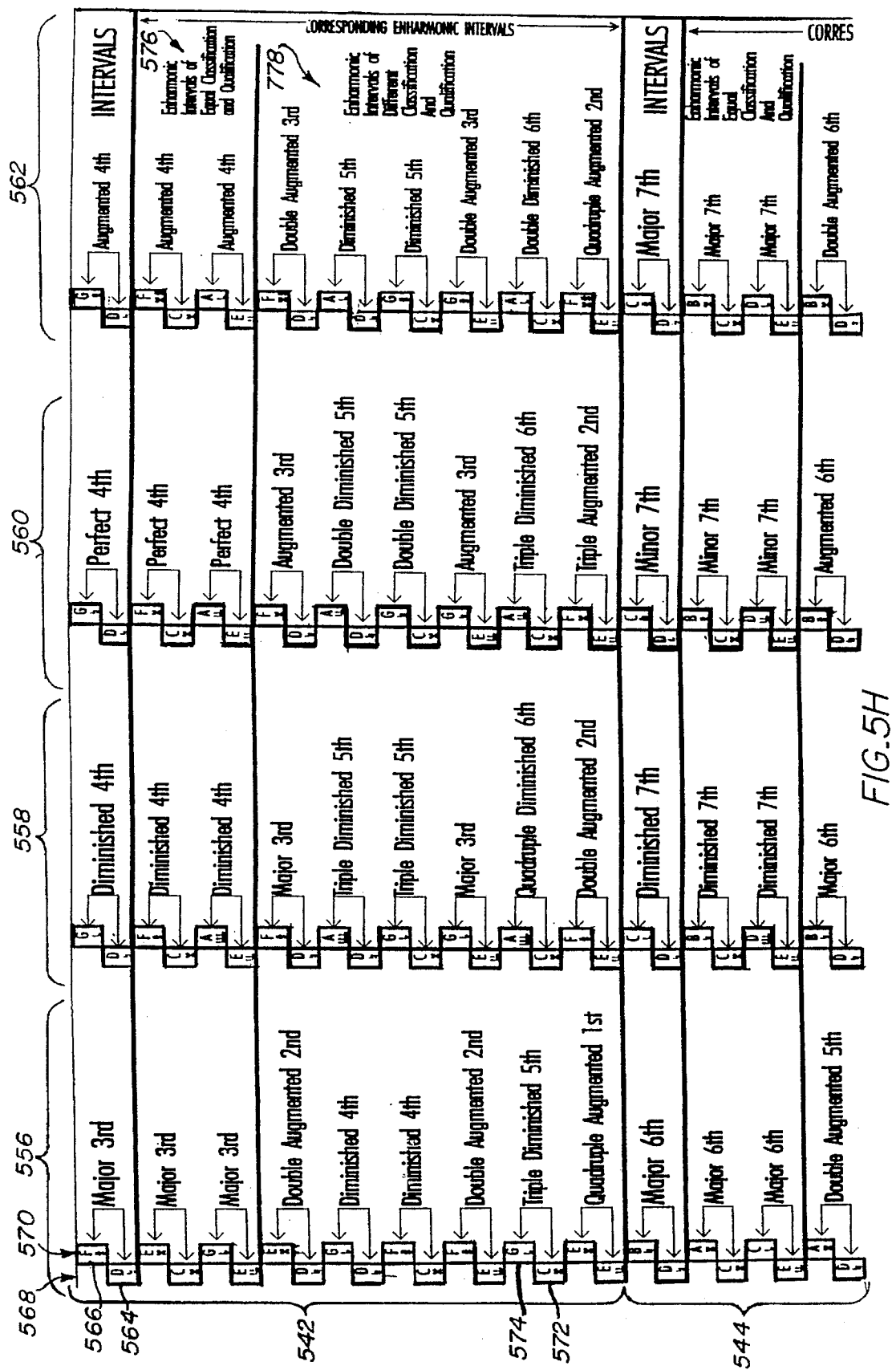

C. Analytical Reference Slide Rule of Intervals:

Referring now to FIG. 5, there is shown the plan view of a third portion 500 of the music slide rule 100. The third portion is otherwise referred to as the Analytical Reference Slide Rule of Intervals, and is illustrated in thirteen sections (the sleeve front and back in FIGS. 5A, FIG. 5J, and the back of the slide in FIG. 5K–5N); shown in detail in corresponding FIGS. 5A–SN, and interconnected as depicted in FIG. 5. The slide 102 front side indicia is the universal scale 109 (FIG. 1C) repeated as required in rows to supply the many apertures as detailed in FIGS. 5A–5F, and the back side indicia has rows of scales repeated as required n columns as shown in FIGS. 5K–5N to supply the many apertures as detailed in FIGS. 5G–5J.

FIG. 5A displays the interval relationships between a reference note and other notes spaced from the reference note in semitones. The rule shows the intervals in semitone divisions from 1 to 11, the various intervals displayed row by row, each row describing one interval. At the beginning of each row there is a Semitone division number (e.g., 1, 2, 3.3, 4.4, etc.) 502 followed by the word "Semitone" or "Semitones" stating in brackets the interval size in numbers of semitones. To the right of this the number of semitones or tones is again expressed in brackets for the particular interval.

Following the description of the interval size in semitones or tones, there is an aperture 504 in which a user displays a reference note by adjusting the slide 102. To the right of aperture 504 there is a printed name description 506 of the interval, followed by an aperture 508 in which is displayed a second note, the aperture 508 being spaced from the reference aperture 504 by the interval described in each respective row.

FIG. 5B is an extension to FIG. 5A giving more definition to the interval being evaluated by describing where it occurs in particular scales. Each of the various apertures 510 display a root note of an eight tone scale in which the selected interval can be found. The type of scale is indicated by the descriptive words to the right side of each aperture. On the left side of each aperture a roman numeral indicates the position of the note specified in the scale. By way of example, in the first row 512 defining the 1 semitone interval, through the aperture 514 is shown an "A flat." The description to the right "Major" describes it as the root note of a major scale. The numeral III to the left of the aperture 514 describes the position of the note as the third note of the scale with root note A flat, which would be C natural which correspond to the selection in root aperture 504.

FIG. 5C displays further information on intervals. The first six rows 516 are numbered 1–6 and provide information on tonal and modulant resolution of tritone intervals. The last three rows 518 include definitions of various interval movements from one note to another.

In operation, and by way of example, the first of rows 516, labeled with the number "1" contains information on the tonal resolution of a tritone as described to the left of the numbers "1" and "2." The particular tritone (Augmented 4th) interval illustrated in row 516 number "1," shows the interval notes as "G flat" and "C natural." The line shows this interval tonally resolved by moving down from the "G flat" a diatonic semitone to "F natural," and moving up from the "C natural" a diatonic Semitone to a "D flat." At the lower right of the row is found the statement, "This Tritone is Found in the IV of" followed by aperture 520 and then the word "Major." This means that the G flat (the lower note of the interval) is the fourth "IV" note of a Major scale having the root note D flat as shown in the aperture 520. The remaining rows 2–6 516 operate in a similar manner.

The last three rows 518 contain definitions of various interval movements between notes. For example, the sequence 521 as shown has three apertures including a first aperture 522 showing a "G flat," a second aperture 524 showing a "G natural" and a third aperture 526 showing a "G double flat," interconnected by arrowed lines 528 and 530. The displayed words "Ascending Chromatic Semitone" adjacent the arrowed line 528 leading from aperture 522 to aperture 524 defines the movement from the G flat to the G natural as an "Ascending Chromatic Semitone." The arrowed line 530 leading from aperture 522 to aperture 526 defines the movement from the G flat to the G double flat as a "Descending Chromatic Semitone." The various other sequences shown in rows 518 are interpreted in a similar manner.

FIG. 5D provides note and interval information for the Major scales. The interval diagram on the left shows two types of intervals, "Major" and "Perfect." The Perfect intervals are the I, IV, V and VIII intervals. The Major intervals are II, III, VI and VII.

The scale diagram shown on the right displays all of the key notes in a selected Major scale. The scale notes, or degrees, are defined in the degree categories of "Principle Degrees" including the I, IV and V scale tones, and "Modal Degrees" including the III, VI and VII scale tones. Additionally, the VII degree is labeled as the "Leading Tone." Starting with the root note of the scale, denoted as "Key Note of" displayed through aperture 532, each successive note of the scale is given by following the arrows which include definition of the distance between notes or degrees in tones or semitones. For example, the distance between the 1 and II degree notes is a whole tone, for example, and the distance between the II and III degrees is a whole tone.

In operation, the slide 102 (FIG. 5) is positioned to display a desired scale root note in aperture 532. The various notes or degrees of the scale are then displayed in the apertures for reference.

FIG. 5E provides note and interval information for the "Minor Harmonic Scale" in a similar manner to FIG. 5D for the Major scale. The interval diagram on the right emphasizes the III and VI intervals as "Minor," and the II and VII as "Major." The scale diagram on the left defines the I, IV, V and VIII as "Perfect intervals," and emphasizes the minor intervals III and VI, distinguishing the Minor Harmonic scale from the Major scale, and gives the various scale notes or degrees displayed through the apertures along with the distance between notes in tones or semitones.

In operation, the user positions the slide 102 (FIG. 5) indicia for the root note or Key Note for the desired scale to be shown through the aperture 534. The corresponding various scale notes are then displayed through the other apertures of the diagram defining the scale parameters.

Referring to FIG. 5F there is a display 536 showing the effect of adding flats to a given note. Display 538 defines the addition of double sharps and sharps. The distances in tones between notes with flats and sharps added in sequence is displayed at 540.

Figure 5K:
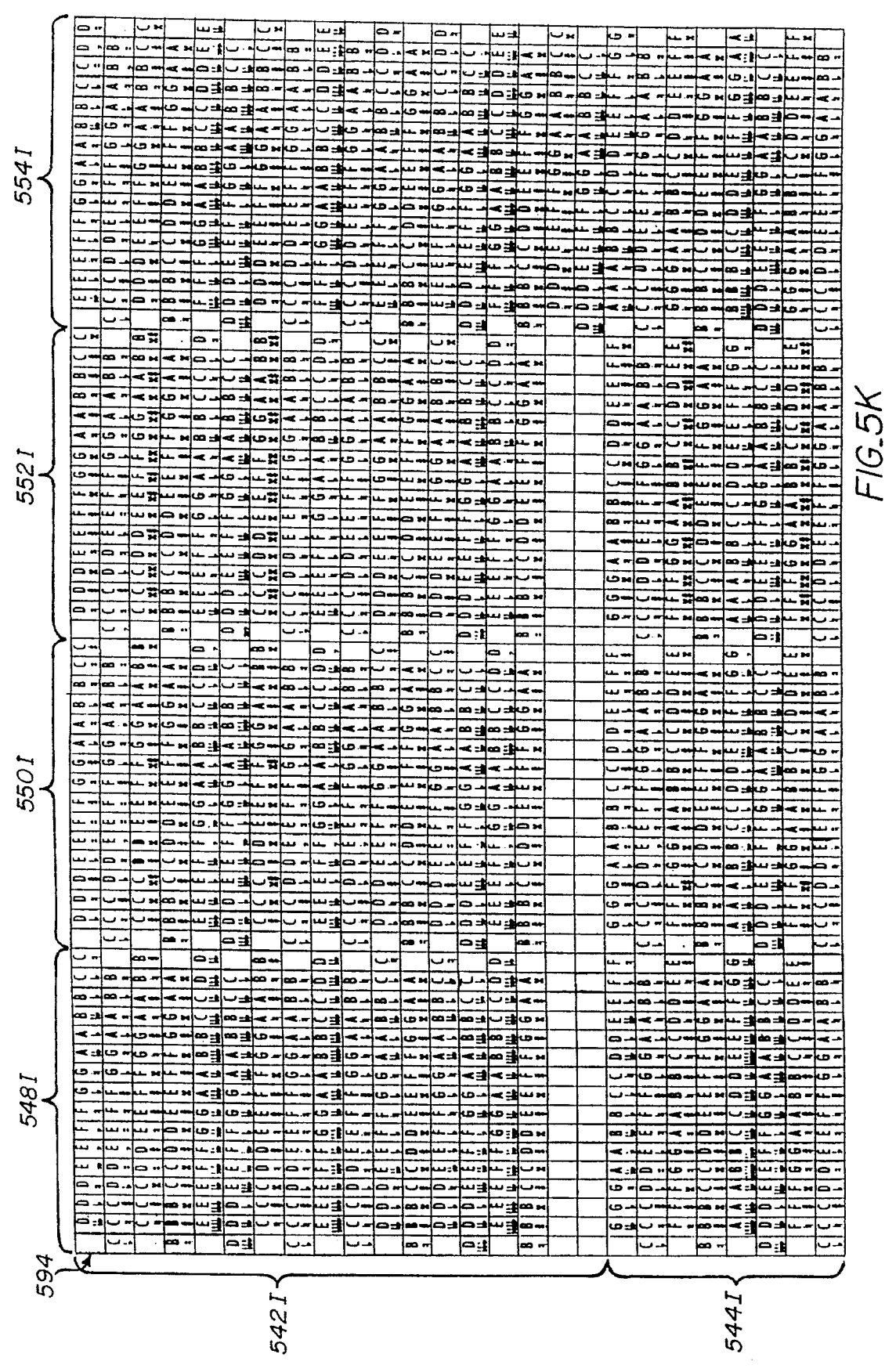

FIGS. 5G–5N show the back face of the sleeve of the Slide Rule of Intervals, in which the intervals are shown in columns in a first group of rows 542 defining the Minor 2nd, 548, the Major 2nd, 550, the Augmented 2nd, 552, the Minor 3rd, 554, the Major 3rd, 556, the Diminished 4th, 558, the Perfect 4th, 560, and the Augmented 4th, 562, respectively (FIGS. 5G and 5H). The same columns identify in row group 544 (in FIGS. 5G and H), continued in row group 546 (in FIGS. 5I and J), the Diminished 5th, 548, the Perfect 5th, 550, the Augmented 5th, 552, the Minor 6th, 554, the Major 6th, 556, the Diminished 7th, 558, the Minor 7th, 560, and the Major 7th, 562, respectively. Each named interval in row groups 542, 544, 546 includes an offset column of apertures 596 (FIG. 58) and 570 (FIG. 5H) starting below line 568 (FIG. 5H). As best seen in FIG. 5H for example, the Major 3rd interval is D natural, the indicia of which on slide 102 is visible through aperture 564, to F sharp, the indicia of which on slide 102 is visible through aperture 566. The enharmonic intervals corresponding to each of the named intervals in the first two rows of row groups 542 and 544 are identified on the right of this sleeve (FIGS. 5H and 5J) with the first four rows being the Enharmonic Intervals of Equal Classification and Qualification 576, and the lower ten rows (in columns 548, 550 and 552) or twelve rows (in columns 554, 556, 558, 560 and 562) being the Enharmonic Intervals of Different Classification and Qualification 778. The same is illustrated for the interval row groups 544, 546. Thus, for example, the Triple Diminished 5th enharmonic interval of different classification and qualification for the Major 3rd interval (column 556 in FIG. 5H) are between notes C double sharp 572, to G flat 574. Note that the fundamental note for each of the named intervals (second row from the top in row groups 542 and 544, e.g., D natural visible in aperture 564 of FIG. 5H) is identical in each aperture of the interval fundamental, and the notes follow the pattern of the scale 109 of FIG. 1C.

The lower half of FIGS. 5I and 5J show two groups of rows identifying Perfect Intervals (upper row group) and Major Intervals (lower row group) with the fundamental of the interval being revealed in rows of apertures 580 and 582. The various perfect intervals (Perfect 1st [Prime] 584A, Perfect 4th 584B, Perfect 5th 584C and Perfect 8th 584D, respectively) and major intervals (Major 2nd Diatonic Tone 586A, Major 3rd 586B, Major 6th 586C, and Major 7th 586D, respectively) are grouped in columns and named in the center horizontal row of the respective row groups.

The tones going up are identified in the staggered aperture above the interval name, while the tones going down are below. The arrows from the fundamental interval aperture direct the user to the several tones, diminished, augmented and chromatic. For example, starting with E flat as the fundamental 590, the Perfect 4th is A flat 588, and going up, the Augmented 4th is A natural 592. Again, note that the fundamental of the interval, in the example E flat, is identical in the rows of interval fundamental apertures 580 and 582, respectively.

FIGS. 5K–5N are enlarged views of the back side of slide 102 of FIG. 5, and correspond to FIGS. 5G–5L, respectively. They show the staggered repeat arrangement of scales to reveal the appropriate intervals in the vertical columns of apertures 596 (FIGS. 5G and 5I) and 570 (FIGS. 5H and 5L). The horizontal row 594 is revealed in the top row of apertures of the Minor 2nd, Major 2nd, Augmented 2nd, Minor 3rd, Major 3rd, Diminished 4th, Perfect 4th and Augmented 4th intervals (FIGS. 5G and 5H), and each row is staggered accordingly in row group 542I to correspond to these interval row groups 542 of FIGS. 5G and 5H. The same is true for row groups 544I and 546I in FIGS. 5K, 5L, 5M and 5N corresponding to row groups 544 and 546 in FIGS. 5G, 5H, 5I and 5J. Note columns 548I, 550I, 552I, 554I of FIGS. 5K and M, and 556I, 558I, 560I and 562I correspond to the named interval group columns of the same respective numbers in FIGS. 5G–5J. Likewise, the grouping 584AI and 586AI in FIG. 5M correspond to the perfect interval column 584A (Perfect 1st) and the major interval column 586A (Major 2nd) of FIG. 5I.

D. Analytical Reference Slide Rule of Transposition:

Referring now to FIG. 6 there is shown the fourth portion of the musical slide rule 100, otherwise identified as an Analytical Reference Slide-Rule of Transposition 600. There is a portion 602 containing printed matter on the rule body 101, and two slides 604 and 606. As with all of the slide rule portions, the printed matter 602 may be fabricated on a separate slide rule body, or on a body 101 containing any number of the various slide rule portions. The Analytical Reference Slide-Rule of Transposition differs from the other slide rule portions in that two slides 604 and 606 are used, one or both of which may be independent of the larger scale 102 if the rule is incorporated in the larger body 101.

FIG. 6A shows the indicia 608 on the slides 604 and 606. The rule body 101 contains two apertures 610 and 612 through which the slide indicia 608 are visible.

The slide indicia 608 is the universal scale 109 (FIG. 1C) with the sharps and flats etc., placed under the letter notes instead of beside them for convenience in providing a compact rule. The data includes row 614 containing the number of tones and ½ tones that a given note lies above or below the "original key" reference position 616. Row 618 describes the qualification of the interval from the original key 616 to a selected note on the slide 604, the various intervals being either "d" (diminished), "m" (minor), "M" (major), "A" (augmented), "2d" (twice diminished), "P" (perfect) or "2A" (twice augmented). Line 620 gives what termed the "Classifications of the interval from the original key" to the transposed note, which is the basic position of a note in an 8 tone scale with the original key note as the root note of the scale.

In operation, a user first selects one of the note indicia 608 on slide 604 to represent the root note of the original key from which transposition is to be accomplished. For example, in FIG. 6 slide 604 is shown positioned to transpose from the key of D natural by positioning the D natural under the Original Key position 616. The root note of the key that is being transposed to, is selected from the indicia on slide 606 and also placed under position 616. In the FIG. 6 example, the key being transposed to is C natural. With the slides 604 and 606 in these positions, any note in the key of D can be transposed to the key of C by finding the selected note in the original key of D on slide 604, at which point the corresponding transposed note in the key of C is the note indicia on the slide 606 immediately below the selected note. For example, an F natural 622 in the original key of D is transposed to an $E^b$ 624 in the key of C.

The rows 614, 618 and 620 define the interval of transposition, and are used with the slide 604. For example, with the original key of D in the position 616, the C natural being transposed to (as indicated on slide 606) is also found on slide 604 at position 626. Reflecting directly downward to row 614 it can be seen that the transposition from D to C is one tone down from the original key. Directly below these, on row 618, the letter M indicates that the transpositions interval is qualified as major, and below that on row 620, the interval classification is a second.

Figure 7D:
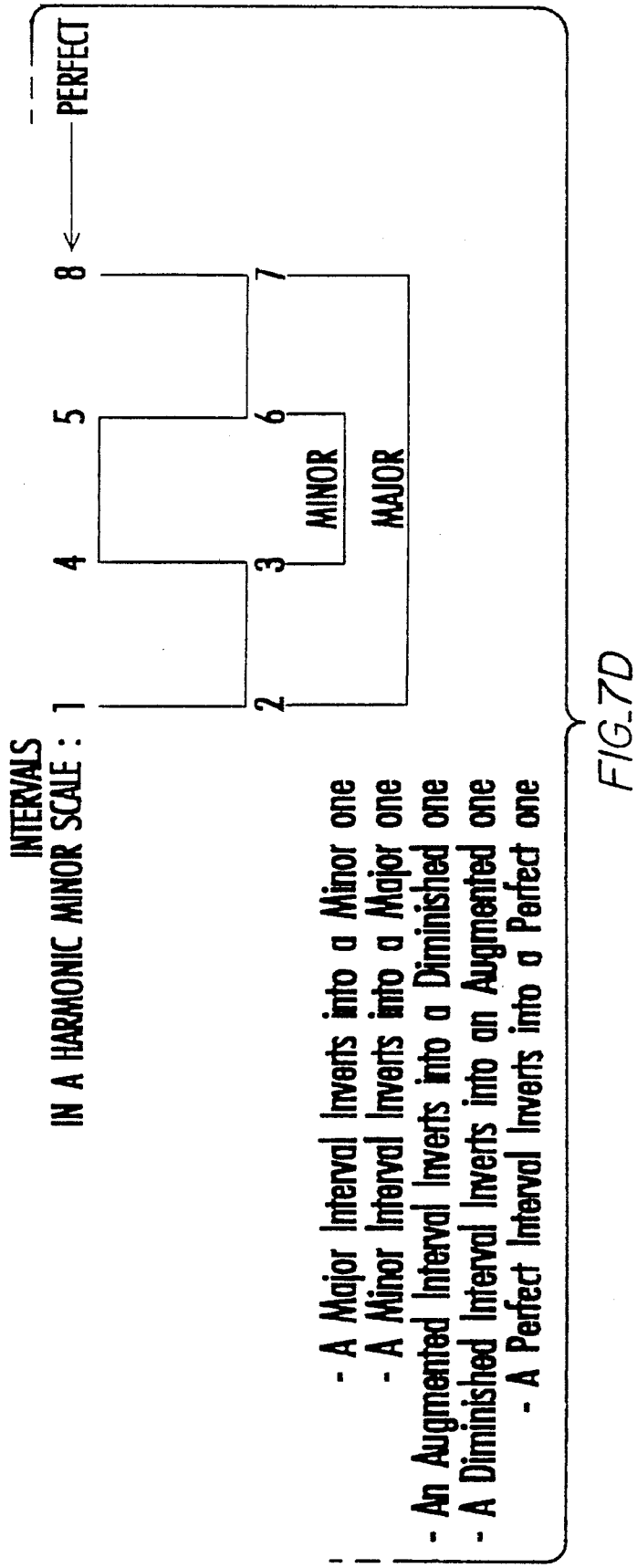

E. Analytical Reference Slide Rule of Intervals and Their Inversions:

Referring now to FIG. 7, there is shown the plan view of a fifth portion 700 of the music slide rule 100 divided into sections FIG. 7A, FIG. 7B, FIG. 7C and FIG. 7D. The fifth portion is otherwise referred to as the "Analytical Reference Slide-Rule of Intervals and Their Inversions," and is illustrated in sections displayed in detail in corresponding FIGS. 7A–7D, and interconnected as depicted in FIG. 7.

FIG. 7A shows the rule indicia 702 printed on the rule body 101 (FIG. 7). There is an elongated aperture 704 through which the slide indicia 706 (FIG. 1A) printed on the slide 102 (FIG. 7) are displayed. The slide indicia 706 is a single line of the universal scale 104 repeated as required to provide indicia for the aperture 704 for all necessary settings of the slide.

The first position 708 and last position 710 are reference positions for the rule. The upper part of the scale has four rows 712–718 which contain data defining intervals from a lower note reference 708 to a higher note. Row 712 gives the number of whole tones a given note displayed in the aperture 704 is above the first reference position 708. Row 714 displays the number of half tones a given displayed note is above the first reference position. The numbers in this line are a factor of 2 of the numbers in row 712. Row 716 gives the qualification of an interval, and row 718 gives the interval classification. The lower portion of the rule has four rows 720–726 which provide similar information to the top four rows except the information is relative to the reference position 710 defining intervals referenced from the higher note in reference position 710 to a lower note. Row 726 displays the number of whole tones in the interval, and Row 724 gives the number of half tones. Row 722 shows the qualification, and row 720 gives the classification. The intervals defined in the lower rows are known as the "Inversion of the Interval," meaning that they are referencing a lower tone relative to a higher tone as opposed to the top portion of the rule (rows 712–718) referencing a higher tone relative to a lower tone.

In operation, to analyze an interval, the user positions the slide 102 (FIG. 7) to display through aperture 704 the lower reference note in position 708. For example, in FIG. 7A, the slide 102 shows E flat in position 708, which also places E flat in position 710, an octave higher. If the interval to be analyzed is E flat to F sharp, the E flat is placed in reference position 708, placing F sharp in position 728. The interval data then lies in the various rows directly above and below the F sharp as follows:

| Line No. | Interval data |
| --- | --- |
| 712 | the interval is ½ whole tones |
| 714 | the interval is 3 half tones |
| 716 | the interval qualification is augmented |
| 718 | the interval classification is a 2nd |

In addition, the inversion of the interval, from the octave note in position 710 to position 728 is defined by the lower portion of the rule as follows:

| Line No. | Interval data |
| --- | --- |
| 720 | the interval classification is a 7th |
| 722 | the interval qualification is a diminished |
| 724 | the interval is 9 half tones |
| 726 | the interval is 4½ whole tones |

As shown in FIG. 7, FIG. 7B is adjacent to the left of FIG. 7A. The rows 712–726 of FIG. 7B line up with the rows of FIG. 7A. The descriptions in the rows of FIG. 7B give definition to the data in the rows of FIG. 7A as explained above. The arrows and numbers 1–4 located to the left of FIG. 7B connect the equivalent lines for the intervals and the inversions of the interval. In addition, the arrows help to identify the relationships between the interval and its inversion as follows:

Arrow No. 1:
   The sum of the classification of the interval and the classification of the inversion of the interval is always 9.
Arrow No. 2:
   a. A Perfect Interval always inverts into a Perfect Interval.
   b. An Augmented Interval always inverts into a Diminished Interval.
   c. A 2 Augmented Interval always inverts into a 2 Diminished Interval.

d. A Diminished Interval always inverts into an Augmented Interval.

e. A Minor Interval always inverts into a Major Interval.

f. A Major Interval always inverts into a Minor Interval.

Arrow No. 3:

The number of half tones in the interval added to the number of half tones in the inversion of the interval is equal to 12.

Arrow No. 4:

The number of tones in the interval added to the number of tones in the inversion to the interval is equal to 6 tones.

In FIG. 7B the rows 728–740 give further definition to the intervals defined by the first six note indicia. The rows 728–740 interconnect with corresponding arrowed lines 728A–740A of FIG. 7A. For example, the E flat in position 708 is labeled as the key of the interval by row 740, and as a prime-unison by row 738. In further example, the interval from the B flat in position 708 to F flat in position 742 is labeled as a diatonic semitone by row 730 of FIG. 7B. FIGS. 7C and 7D also contain interval information and are included on the rule body along with FIGS. 7A and 7B as shown in FIG. 7. FIG. 7C depicts the fact that the qualification of the 1st, 4th, 5th and 8th intervals is "Perfect," and the 2nd, 3rd, th and 7th is Major for notes lying within a "Major" scale. The notations 744 in FIG. 7C clarify the fact that in the common eight tone scale, the sum of the number of tones included in any interval added to the number of tones included in the inversion of the interval is always equal to nine.

FIG. 7D depicts the fact that in a "Harmonic Minor Scale," the qualification of the 1st, 4th, 5th and 8th intervals is "Perfect,"the qualification of the 2nd and 7th is "Major," and the 3rd and 6th is "Minor." Also noted at the lower left of FIG. 7D are data giving the names of intervals and their inversions.

Figure 8:
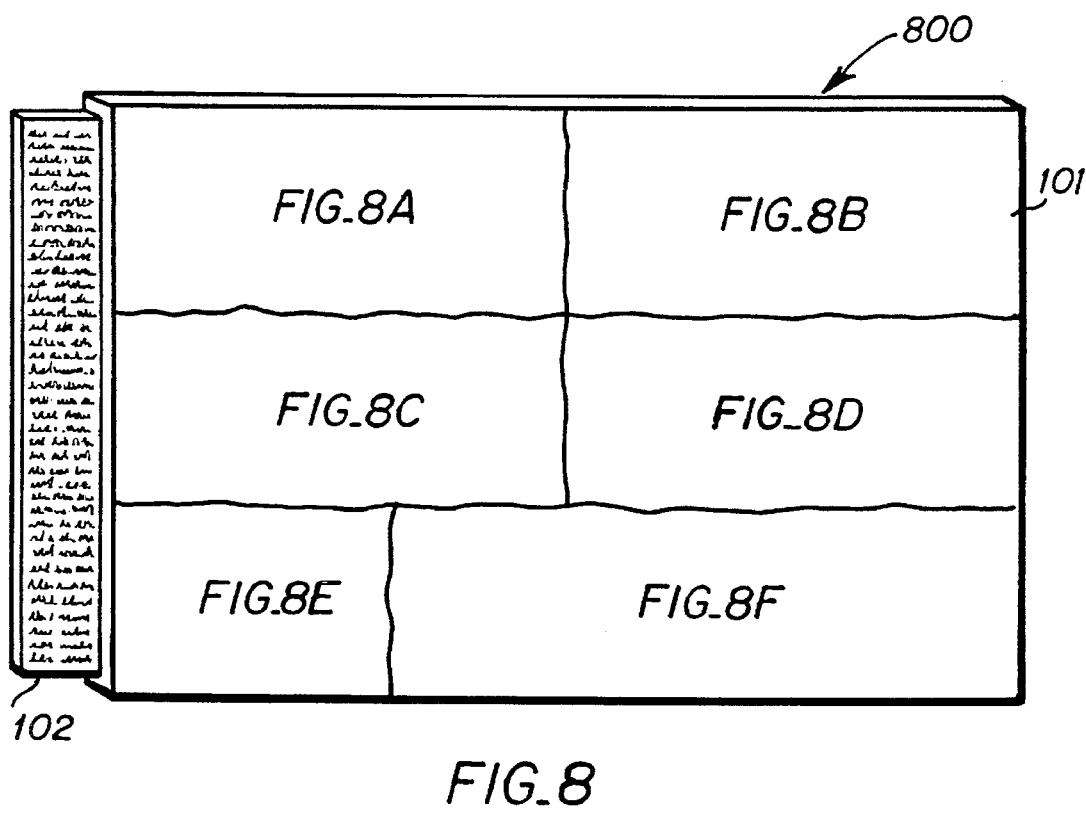
FIG. 8 is an isometric view of the Analytical Reference Slide-Rule of Key Signatures portion of the music slide rule divided into segments 8A–F.

F. Analytical Reference Slide Rule of Key Signatures:

Referring now to FIG. 8, there is shown the plan view of a sixth portion 800 of the music slide rule 100. The sixth portion is otherwise referred to as the "Analytical Reference Slide-Rule of Key Signatures," and is illustrated in interconnected sections FIG. 8A, FIG. 8B, FIG. 8C and FIG. 8D which are displayed in detail in corresponding independent FIGS. 8A–8D. A single line of the slide 102 indicia for FIG. 8 is displayed in FIG. 8E as a musical staff, the various sharps and flats arrayed on the staff in the usual manner. This line is repeated and spaced apart to provide a line of indicia for each row of the apertures as displayed in FIGS. 8A–8D.

Referring to FIGS. 8A–8D, there are apertures 801 shown in each of the figures through which the slide 102 (FIG. 8) is visible, having printed thereon the clef lines and sharp and flat indicators for the various keys. Printed on the slide rule body 101 (FIG. 8) there are depicted in FIGS. 8A–8D a G clef 802, five different C clefs having the note C located on the 1st, 2nd, 3rd, 4th and 5th lines 804–812 and two F clefs having the note F on the 3rd and 4th lines 814 and 816. To the left of the clefs in FIGS. 8A and 8C are blocks 818 containing definitions as shown of the voice range that each clef serves. To the right of the clefs in FIGS. 8B and 8D there are blocks 820 defining as shown the various instruments that each of the clefs serves. The names 822 of the respective clefs are given and presented on the right of the apertures in FIGS. 8A and 8C.

In operation, a composer may have a score in one of the clefs and be in need of defining the key signature in another clef. In order to do this, the user moves the slide 102 (FIG. 8) to position the key signature(number of sharps or flats) in the existing clef. The key signature in the new clef, and in all the clefs is then displayed in the apertures 801 for identification and use. For example, in FIG. 8C the C clef 810 is positioned indicating the 4th line as C. The placement of the accidentals, sharps in this case, show that in a key or scale with three sharps and the C clef on the 4th line, the notes on the 2nd line (F), the 2nd space (G), and the 4th line (C) are all sharped.

Referring now to FIG. 8F there is displayed a slide rule 830 which gives definition to the root notes of the various scales listed in FIG. 4A–4H. The Selected scale reference numbers 402 of FIG. 4 are displayed in the rows 834 of FIG. 8F, these rows being printed on the rule body 101. These are two elongated apertures 838 and 840 bordering opposing sides of the rows 834. The apertures 838 and 840 and letters displayed form columns which are in line with the apertures 801 of FIGS. 8A–8D. This relationship is more clearly shown in FIG. 8I.

Figure 8G:
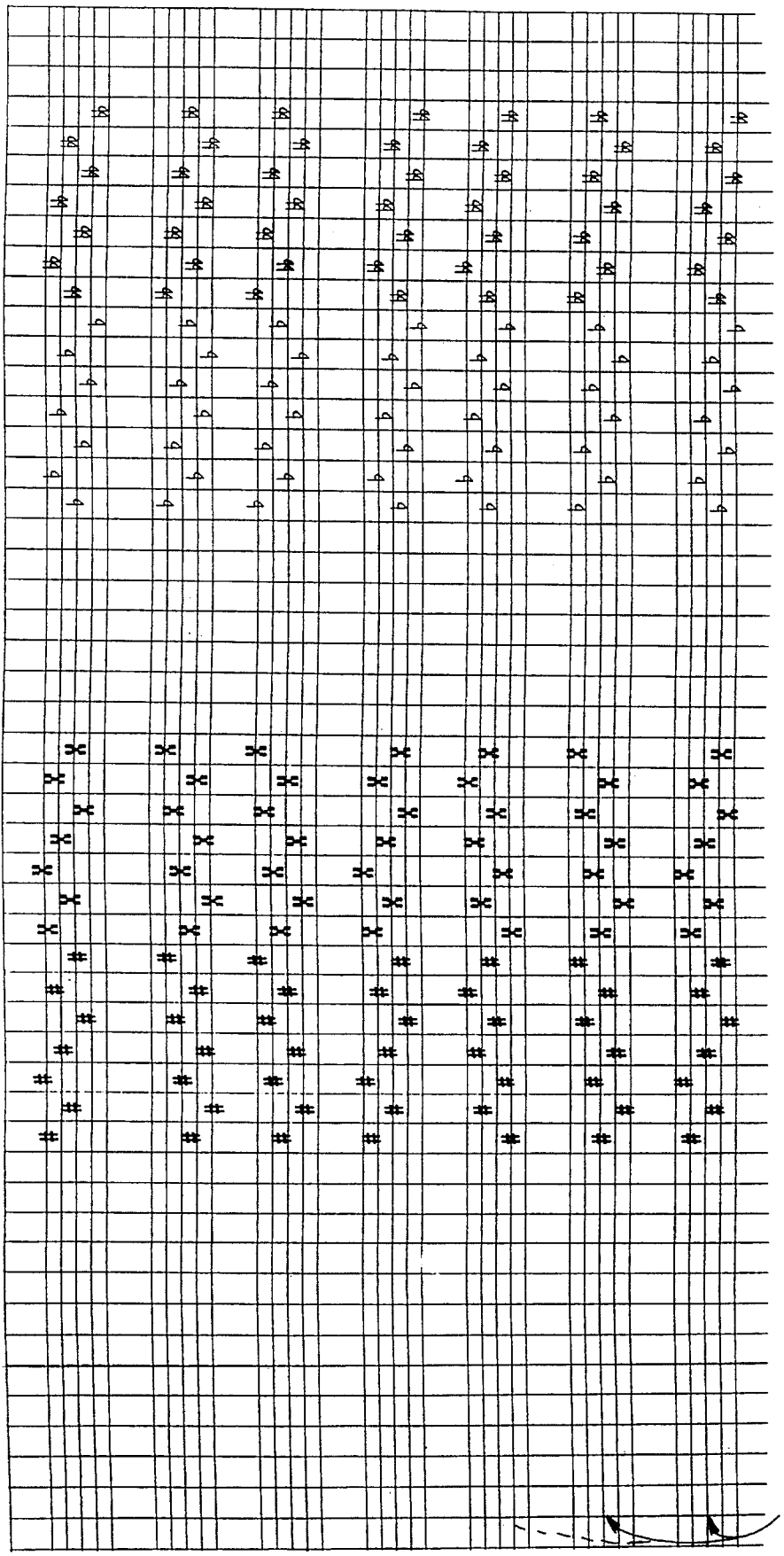
Figure 8H:
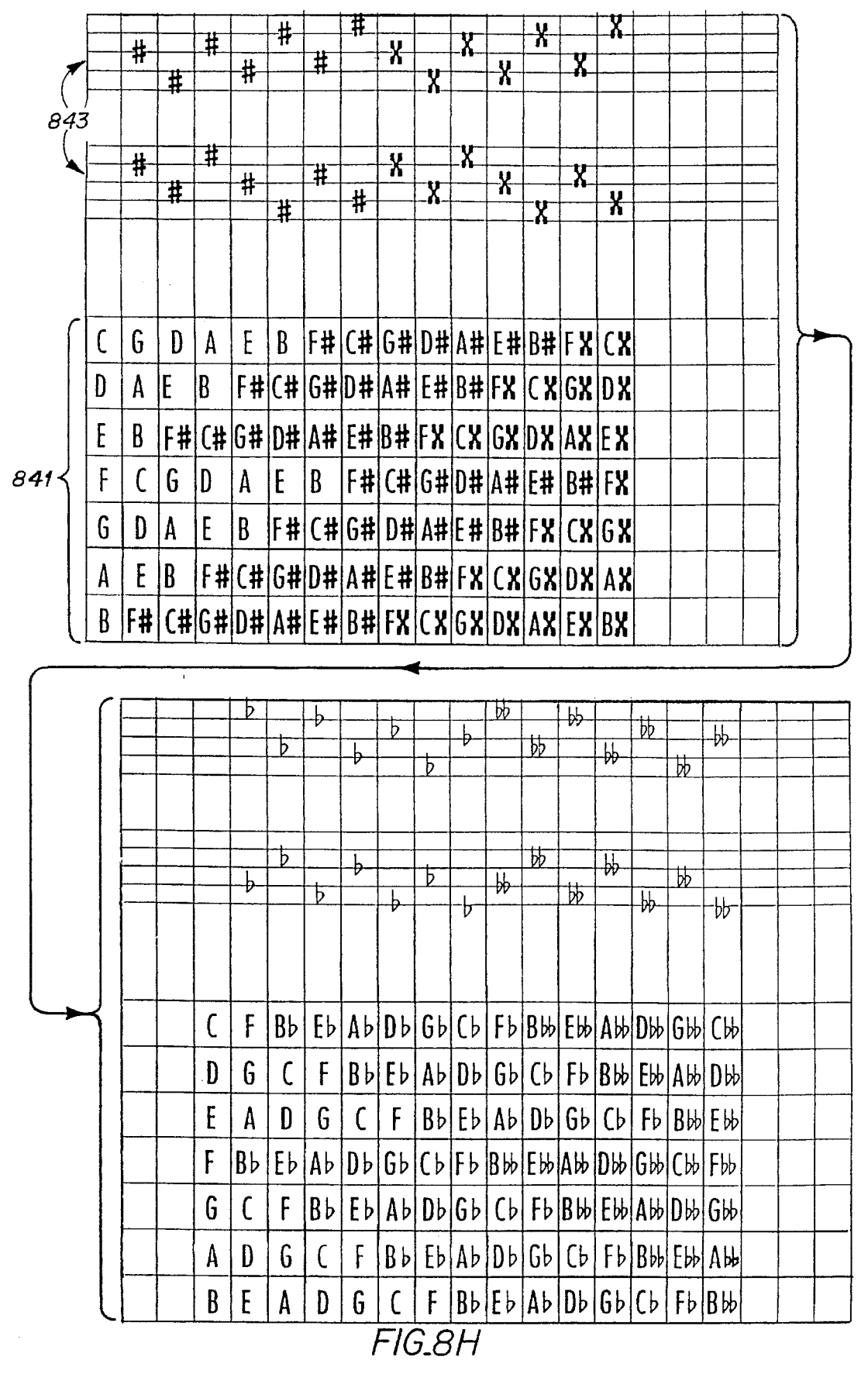

The arrangement of note indicia on the slide 102 for rule 830 is shown in FIG. 8H as item 841 including seven rows of indicia displayable a column at a time in each of apertures 838 and 840. Above item 841 are the bottom two rows of the key signature information displayed in FIG. 8G, included in FIG. 8H in order to clarify the positioning of item 841 relating to the key signature rows 843.

Figure 8I:
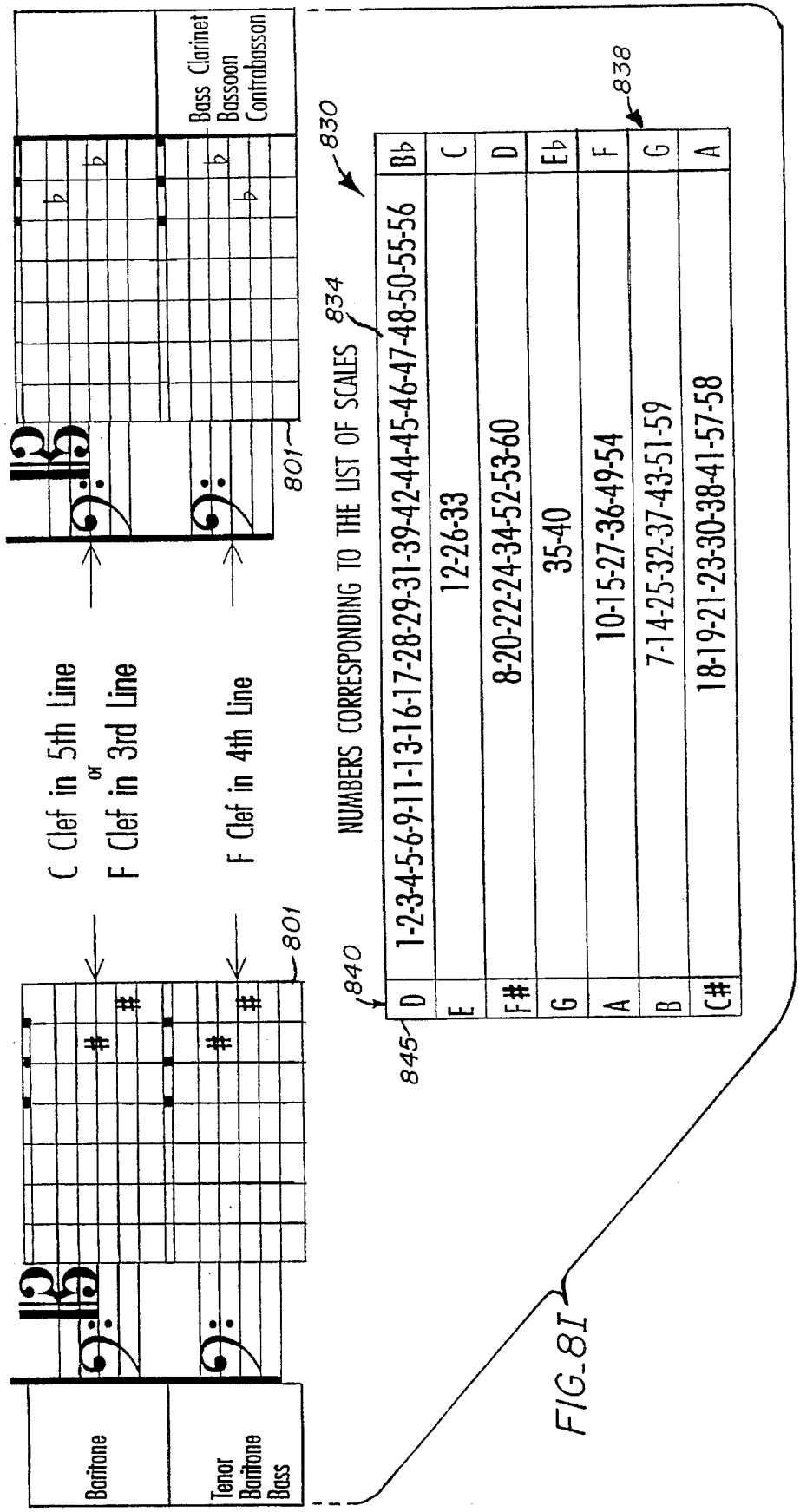
FIG. 8I shows the relative positioning of portions of the rule of FIGS. 8A–8F, and which portions are also shown on sheet 14 of 17 of Appendix A.
Figure 10:
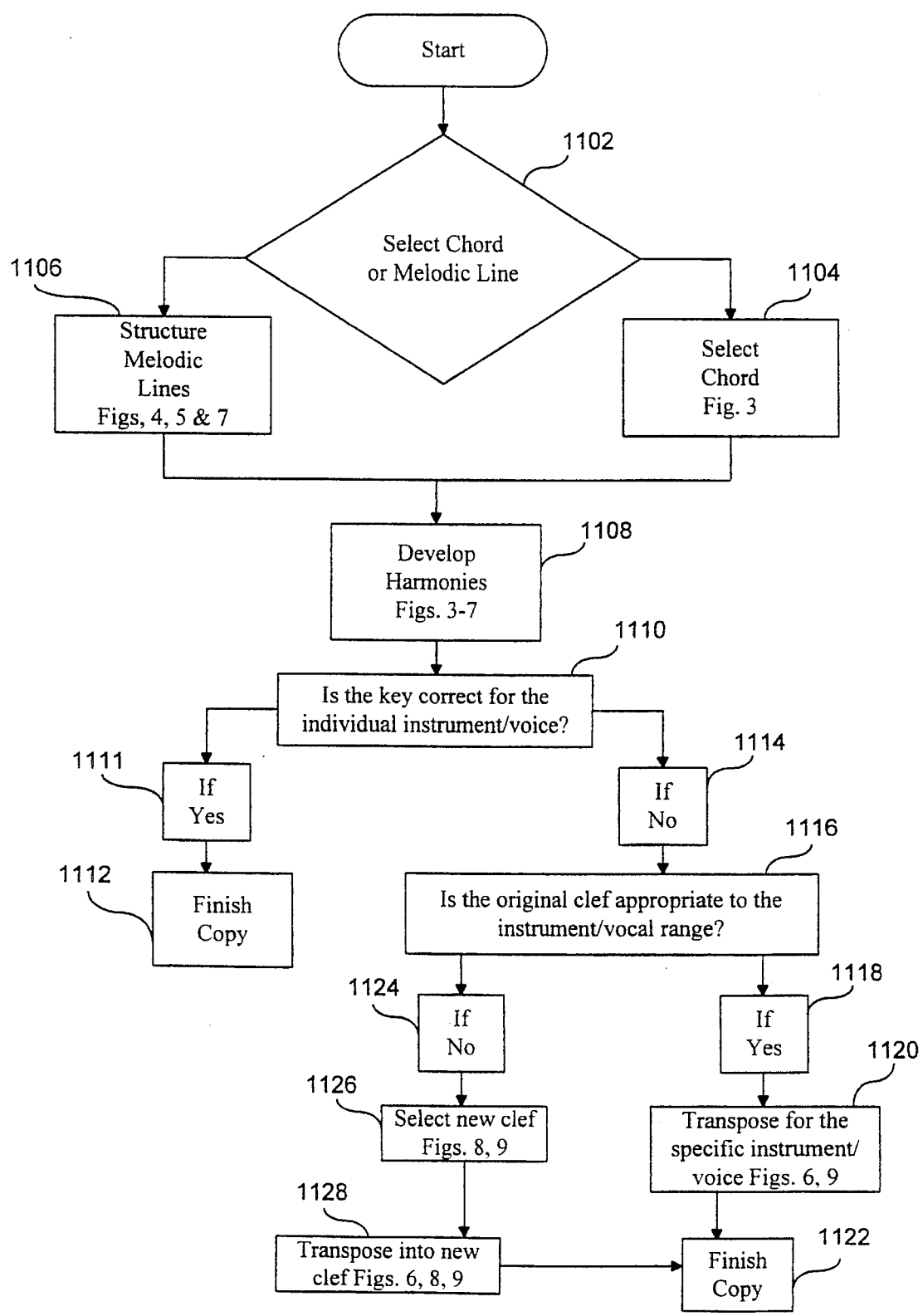
FIG. 10 is a flow chart showing the method of use of the various slide rules of FIGS. 1A–9 in producing a musical composition.

The use of the rule 830 is clarified through reference to FIG. 8I. The slide 101 is shown positioned so as to display the note indicia D in position 845 of aperture 840. Two sharps are displayed in the apertures 801 directly above the aperture 840. The row 834 to the right of the D indicia contains the reference numbers 402 of selected scales. The relationship is such that the referenced scales 1-2-3-4 . . . , showing a root note of D, have a key signature of two sharps. Similarly, referring to the B flat in the aperture 838, the referenced scales 1-2-3-4 . . . , etc. with a root note of B flat, have a key signature of two flats as indicated in the aperture 801 directly above the B flat.

In further clarification, the 4th row contains reference scale numbers 35 and 40, therefore scales 35 and 40 with a root note of G have a key signature with two sharps as indicated in aperture 801.

FIG. 8E contains definitions and intervals associated with the accidentals or alterations i.e., sharps, flats, naturals, etc. Item 826 defines each of the various symbols and 828 shows the interval spacing between a given note on the staff and that same note position with various accidentals applied. For example, a note that is double flatted 829, is a ½ tone interval below the same note when it is flatted only once 831, as indicated by the ½ tone reference 833.

Referring again to FIG. 8F, there is A display 832 containing two 5 line staffs 842 and 844 in the conventional relationship with the most often used clefs including the G clef 846 with the 2nd line as G, the C clef 848 with C equidistant between the two staffs 842 and 844, and the F clef 850 with the F defined on the 4th line.

To the right of display 832 there is a display 852 showing various clefs in position on staffs and their names.

Above the aperture 801 in FIG. 8A are column headings 854, 856 and 858. The notation 860 indicates that the notes in the column under 858 defined by the accidentals such as those labeled 862 are leading tones and are the seventh tone in the common major eight tone scale with the displayed key signature. In the case illustrated, the scale could be A major, and the seventh line would be G sharp as indicated in the column under item 858. Similarly, the accidentals in the column under 856 are the third note as indicated by the numeral 111, and the accidentals in the column under 854 are the sixth tones of the A major scale. The notation 864 labels the three tones as modal grades.

In FIG. 8B, the two columns 866 indicate that the note defined by the accidental is the first, or root note, of the major scale of the key signature displayed. Similarly, the accidentals under 868 define the fourth note or tone of the major scale of the displayed key signatures. In the case as displayed, the key signature is E flat, and the E flat major scale as depicted has the three flats, E flat, A flat, and B flat. Notation 870 indicates that the notes in column 866 are the first tone of the major scale and notation 872 indicates that the fourth tone is a modal leading tone.

G. Analytical Reference Slide Rule of Transposing Instruments and Analytical Reference Slide Rule of Transposing Clefs:

Referring now to FIG. 9, there is shown the plan view of the seventh portion 900 of the music slide rule 100. The seventh portion is otherwise referred to as the "Analytical Reference Slide Rule of Transposing Instruments," and is illustrated in interconnected sections FIG. 9A, FIG. 9B, FIG. 9C and FIG. 9D which are displayed in detail in corresponding FIGS. 9A–9D. The slide 102 indicia for the portion 900 is the order presented in the universal scale 109 (FIG. 1C) with the sharps and flats positioned below the letter designations, as shown in detail in FIG. 9E, item 936.

In addition, an "Analytical Reference Slide Rule of Transposing Clefs" 902 is included as shown in the top most portion of FIGS. 9A and 9B. The slide 102 indicia for the rule 902 is a single line of abbreviated clef designations repeated in the order as shown in FIG. 9E, item 938.

Referring to the Analytical Reference Slide Rule of Transposing Clefs 902 part of the rule, there are seven apertures 906 and 908a–f through which abbreviated clef symbols 904 are displayed. The first aperture 906 is used to display the original clef from which the transposition is made. The remaining apertures 908a–f display the clefs to receive the transposed score. Above each of the six apertures 908a–f, there is either the word "Ascendent" 910 or "Descendent" 912 depending on whether the transposition is to a higher or lower key than the original. Below each of the six apertures 908a–f there is printed an interval number 914 representing the shift in the displayed scale on the transposed clef.

In operation, a user adjusts the slide 102 (FIG. 9) to position a selected original clef symbol in aperture 906. The remaining apertures 908a–f then display the clefs 904 onto which a transposition may optimally be made, the shift being indicated by the words "Ascendent" 910, "Descendent" 912, and the interval descriptions 914.

By way of example, FIG. 9A shows a "G2" displayed in the original clef aperture 906. If a composer writes his original score in the G2 clef and then wants to adjust the notes of a particular part a descendent 2nd interval in order to more properly fit within the clef lines, he would select FIG. 9A which adjusts the note displayed by the descendent 2nd interval aperture 908b which displays the C4 clef required to accomplish the adjustment.

FIGS. 9C and 9D in cooperation with FIGS. 9A and 9B further illustrate the "Analytical Reference Slide-Rule Of Transposing Instruments" 915. This portion 915 includes a matrix 916 of rows of data organized in columns defining transposition intervals. Row 918 contains the notes of the universal scale 109 (FIG. 1C) and is entitled "Key of The Instrument." Row 920 includes a reference number for each key note. Row 922 displays the number of tones or half tones that the key of a particular instrument is above or below the "Concert Key" position, column 924, and therefore also "C natural" in column reference number position "34" as shown in line 918 and column 924. Row 926 and 928 define the Qualification and Classification of the intervals referenced to C natural in column reference number position "34." For ease of description, the various notes of row 918 containing the key of the instrument are abbreviated by their letter and reference number. For example, C natural in column reference number 34 is denoted "C34." This terminology is used throughout FIG. 9. As indicated above, the aperture 926, the designation "Instruments Sounding Lower" 930 in FIG. 9C and "Instruments Sounding Higher" 932 delegate instruments relative to C34, the lower pitched instruments to the left and higher pitched instruments to the right.

The various boxes 934 distributed throughout FIGS. 9A–9D contain the instrument names, their keys and reference numbers. In those cases where one letter description is given followed by the letter "C," (e.g. Fliscorno 935) the key of the instrument is actually C for scoring and transposition purposes.

In operation, a user who has written a score in the particular key may determine what key any of the various instruments listed in the blocks 934 will play in by adjusting the slide 102 (FIG. 9) to place the particular key on the slide above C34, column 924. The key of the instrument is determined from the blocks 934 and that key is referred to in row 918. The key designation on the slide 102 immediately above the key of the instrument in row 918 is the key the selected instrument will be playing in.

By way of example, the slide 102 is shown in FIG. 9C in a position such that "G natural" is in column reference "34" 924 above C34. If the composer has written his score in the key of G natural and he wants to find out what key to write the score for the B flat trumpet (B flat-29) in, he simply refers to the reference number 29 in row 920 and glances upward to the slide 102 which displays "A natural" in that column. As a result, the B flat 29 trumpet will play in the key of A, and the composer knows that he must write the score for that instrument one whole tone higher in pitch in order to sound the same. H. Use of the Slide-Rule(s) for Music Composition:

FIG. 1 serves to clarify how the various slide rules function together as a system to enable a user to produce a musical composition. As a first step, it is usual to begin with a melody or a chord sequence as indicated at 1002. If the starting point is a melody, the next step is to select chords to compliment the melodic line. This step is indicated at 1004 and the composer would refer to FIG. 3 as noted to add in chord selection. If the starting point is a certain set of chords, such as a I-IV-V progression for example, the composer would then structure a melody for use with the selected chords, and would use FIGS. 4, 5 and 7 as indicated at 1006.

The next step of composition is to write the harmonies, aided by FIGS. 3–7 per item 1008. At this point, if the key is correct (item 1011) for the individual instruments or voices as detailed at 1010, the composer may proceed to a finished copy (1012).

If the keys are not optimum for a given instrument or voice (1014), one then determines if the clef being used 1016 is appropriate. If it is (1018), the composer may proceed directly to transposition utilizing FIGS. 6 and 9 as indicated at 1020. Following this, a finished copy 1022 can be produced.

If the clef is not appropriate (1024), one proceeds to 1026 to select a new clef through use of FIGS. 8 and 9. Following the selection of the appropriate clef or clefs, the composer proceeds to step 1028 to transpose into the new clef through use of FIGS. 6, 8 and 9, followed by the production of a finished copy 1022.

It should be understood that various modifications within the scope of this invention can be made by one of ordinary skill in the art without departing from the spirit thereof. In addition, the disclosed manual embodiment of the invention can be easily implemented in an alternative electronic form by one skilled in the art of computer programming; the slide rule body indicia 105 (FIG. 1A) forming the basis for a single or series of interactive program templates to be displayed on a computer monitor and the slide indicia 104a–n (FIG. 1A) forming the basis for one or more answer database(s) cooperative to the templates as described in the manual embodiment disclosed herein above for displaying substantially all music information related to chords, scales, intervals, inversions of intervals, transpositions, key signatures, instrument transpositions and clef transpositions. The microprocessor can be sound activated, e.g. by voice or musical tone(s), and located in a musical instrument, e.g., a stringed instrument such as a guitar or an electronic keyboard (e.g. in part of a MIDI circuit having voice recognition circuitry and programming), so that upon the player "identifying" a note (by name, singing the note or actuating the instrument) a microphone picks up the sound which is processed to activate a display of selected related notes to form, e.g. a chord, scales, intervals, etc. For example, strumming a single guitar string of an instrument having this system activates lights (e.g. LCD's) to illuminate and thereby indicate the stops of other strings to be fretted for a selected chord to assist in teaching use of the instrument. Alternately, the microphone can be associated with an independent computer containing the microprocessor-based musical system of this invention. The player, upon strumming a note on his/her guitar sees the appropriate notes to form the chord, scale, etc., on the monitor or screen. The computer can be hooked to a printer so that upon the player picking out single note melody, say of an original composition, it will automatically, by reference to the templates of this invention, print out, in standard musical notation, the melody, and/or the fully chorded composition. I therefore wish my invention to be defined by the scope of the appended claims as broadly as the prior art will permit, and in view of the specification.

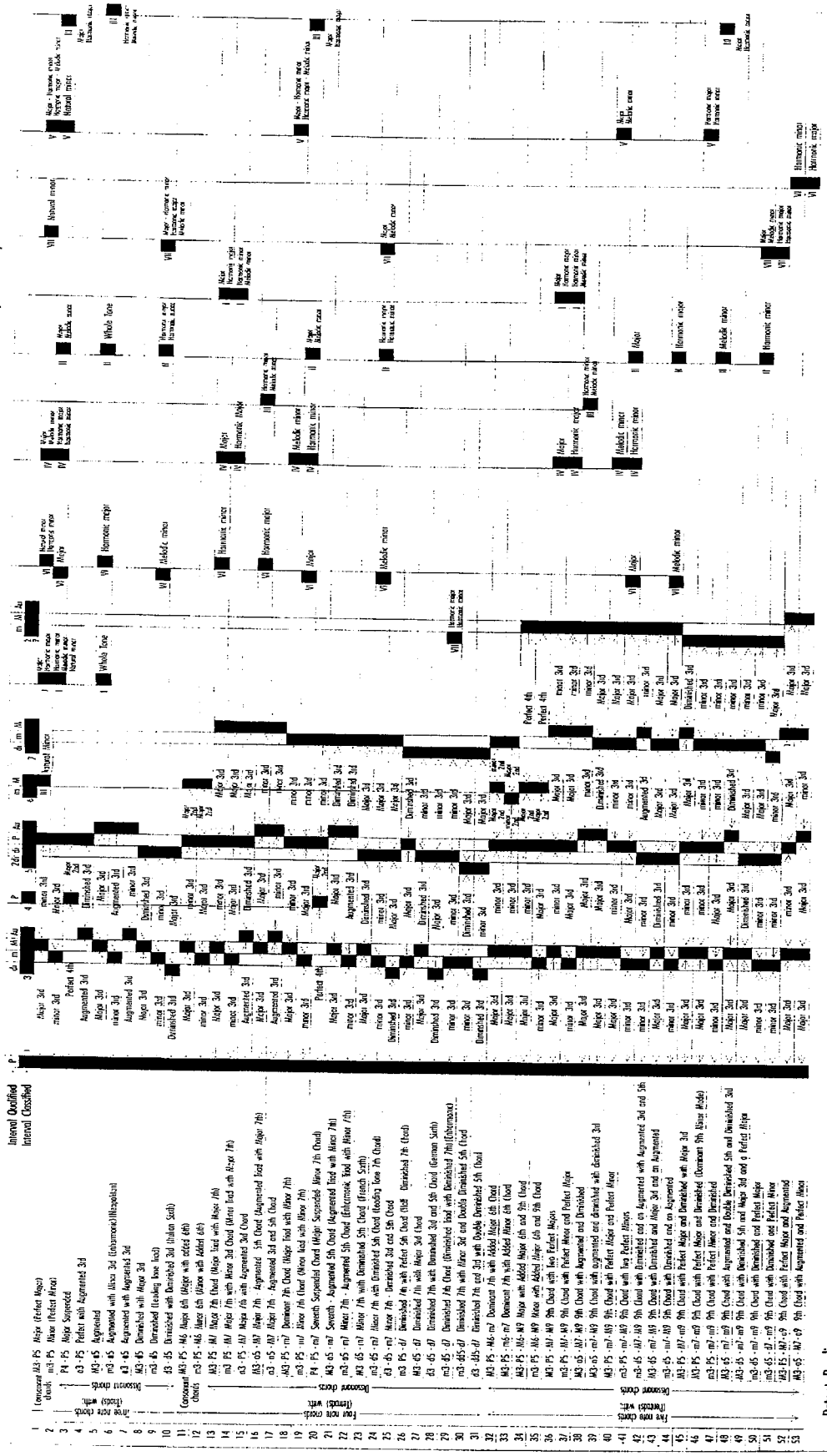

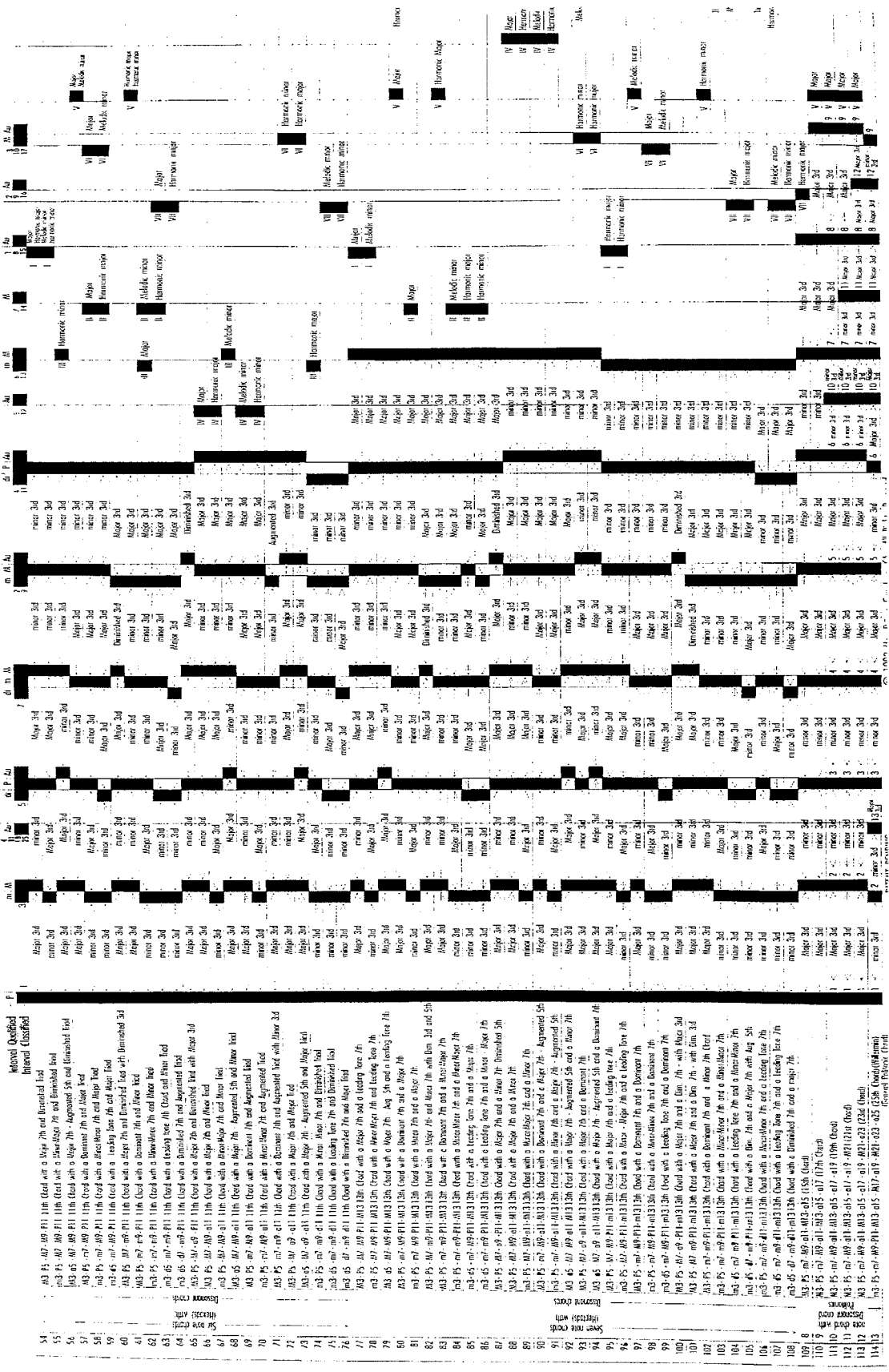

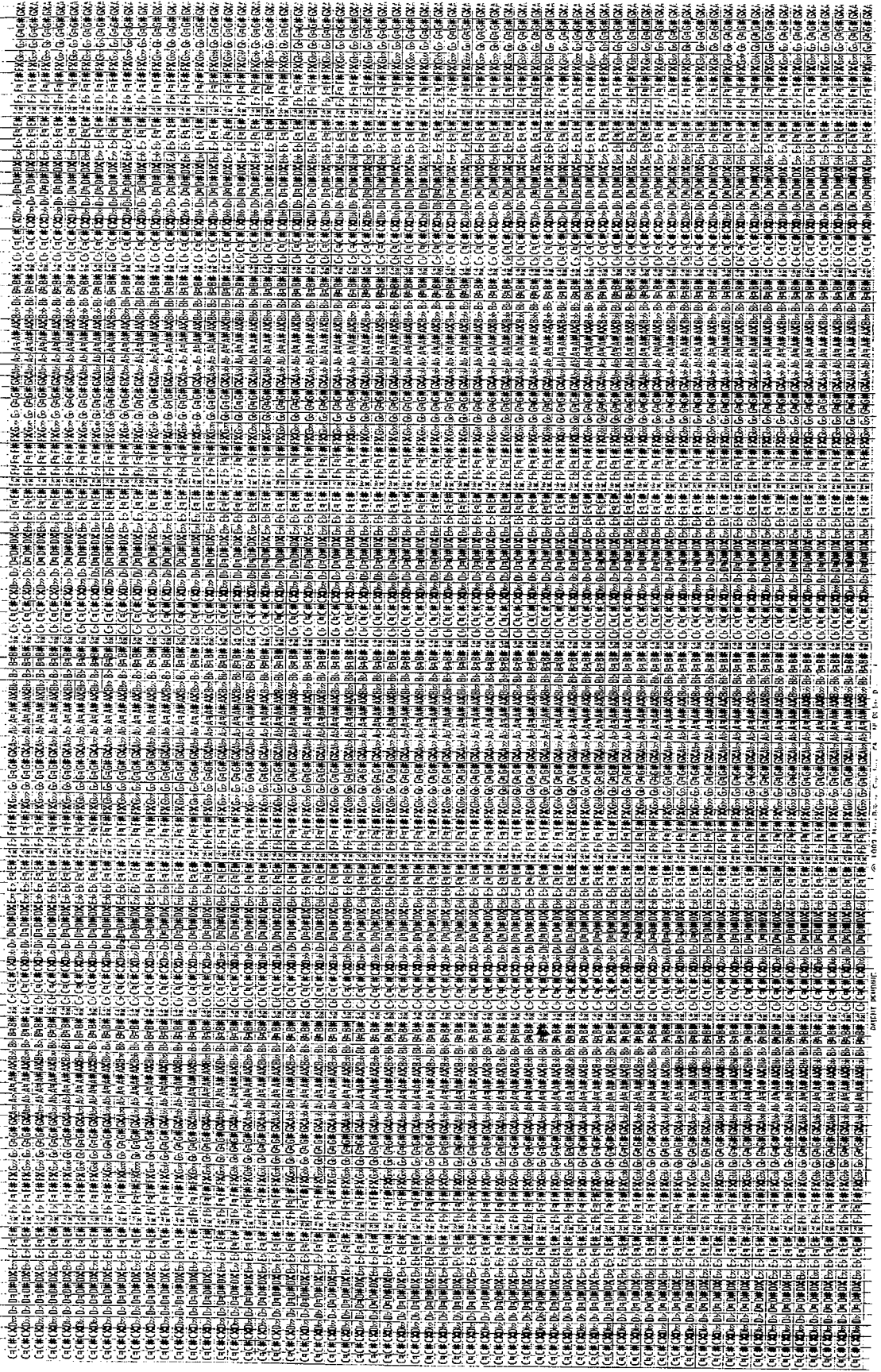

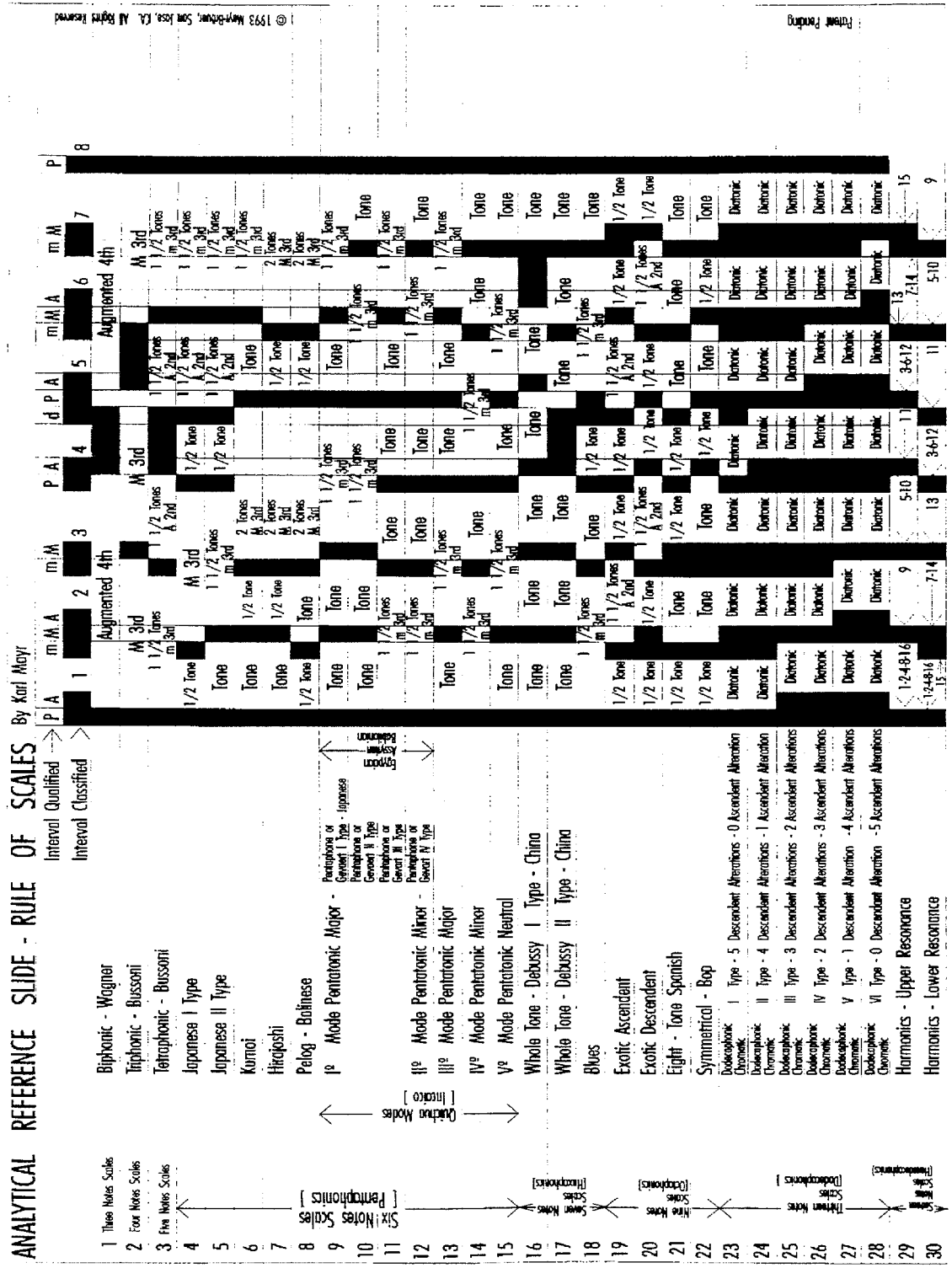

© 1993 Mayr-Bàñuelos, San Jose, CA. All Rights Reserved

Patent Pending

| # | Scale Name | P | 1 | 2 | 3 | 4 | 5 | 6 | 7 | P | Notes |
|---|---|---|---|---|---|---|---|---|---|---|---|
| | | | m\|M\|A | m M | d P A | d P A | m\|M A | m M | | |
| 31 | Greek Liturgic — Mode Titus Hypolydian | | | | | | | | | | Major Diatonic |
| 32 | Greek Liturgic XI Mode — Lydian/Ionian | | Tone | Tone | 1/2 Tone | Tone | Tone | Tone | 1/2 Tone | | Hypomixolydian/hypomixolydian/hypoaeolian/hypolydian |
| 33 | Greek Liturgic I Mode Protus — Phrygian/Dorian | | Tone | 1/2 Tone | Tone | Tone | Tone | 1/2 Tone | Tone | | |
| 34 | Greek Liturgic III Mode Deuterus — Dorian/Phrygian | | 1/2 Tone | Tone | Tone | Tone | 1/2 Tone | Tone | Tone | | |
| 35 | Greek Liturgic V Mode Tritus — Ionian/Lydian | | Tone | Tone | Tone | 1/2 Tone | Tone | Tone | 1/2 Tone | | |
| 36 | Greek Liturgic VII Mode Tetrardus — Mixolydian | | Tone | Tone | 1/2 Tone | Tone | Tone | 1/2 Tone | Tone | | Hypophrygian/hypoionian |
| 37 | Greek Liturgic IX Mode — Aeolian | | Tone | 1/2 Tone | Tone | Tone | 1/2 Tone | Tone | Tone | | Hypodorian/hypoaeolian — Minor Natural/Minor Pura |
| 38 | Greek Liturgic Mode — Mixolydian/Hypomixolydian/Hypoaeolian | | 1/2 Tone | Tone | Tone | 1/2 Tone | Tone | Tone | Tone | | Locrian |
| 39 | Major Locrian | | Tone | Tone | 1/2 Tone | 1/2 Tone | Tone | Tone | Tone | | |
| 40 | Lydian Minor | | Tone | Tone | Tone | 1/2 Tone | 1/2 Tone | Tone | Tone | | |
| 41 | Super Locrian | | 1/2 Tone | Tone | 1/2 Tone | Tone | Tone | Tone | Tone | | |
| 42 | Melodic Minor Ascendent — Minor Major / Bach Minor Mixed - Honolian | | Tone | 1/2 Tone | Tone | Tone | Tone | Tone | 1/2 Tone | | |
| 43 | Melodic Minor Descendent | | Tone | 1/2 Tone | Tone | Tone | 1/2 Tone | Tone | Tone | | Minor Melodic Relative of Major |
| 44 | Homonymous | | Tone | 1/2 Tone | Tone | Tone | Tone | 1/2 Tone | Tone | | |
| 45 | Hindu - Panjagh - Persia | | Tone | Tone | 1/2 Tone | Tone | 1/2 Tone | Tone | Tone | | |
| 46 | Neopolitan Major | | 1/2 Tone | Tone | Tone | Tone | Tone | Tone | 1/2 Tone | | |
| 47 | Arabian | | Tone | Tone | 1/2 Tone | 1/2 Tone | Tone | Tone | 1/2 Tone | | |
| 48 | Overtone | | Tone | Tone | Tone | 1/2 Tone | Tone | 1/2 Tone | Tone | | |
| 49 | Scriabin | | Tone | 1/2 Tone | Tone | Tone | 1/2 Tone | Tone | Tone | | |
| 50 | Major Minor - Hauptman - Basevi Mid Mode - Weitzmann Mid Major Mode / Major Harmonic - Major Artificial Mixed - Heintz Semi Major Mode | | Tone | Tone | 1/2 Tone | Tone | 1/2 Tone | 1 1/2 Tones A 2nd | 1/2 Tone | | |
| 51 | Harmonic Minor | | Tone | 1/2 Tone | Tone | Tone | 1/2 Tone | 1 1/2 Tones A 2nd | 1/2 Tone | | Minor Harmonic Relative of Major |
| 52 | Neopolitan Minor | | 1/2 Tone | Tone | Tone | Tone | 1/2 Tone | 1 1/2 Tones A 2nd | 1/2 Tone | | |
| 53 | Spanish Gypsy | | 1/2 Tone | 1 1/2 Tones A 2nd | 1/2 Tone | Tone | 1/2 Tone | Tone | Tone | | |
| 54 | Hungarian Major | | 1 1/2 Tones A 2nd | 1/2 Tone | Tone | 1/2 Tone | Tone | 1/2 Tone | Tone | | |
| 55 | Enigmatic - Verdi | | 1/2 Tone | 1 1/2 Tones A 2nd | Tone | Tone | Tone | 1/2 Tone | 1/2 Tone | | |
| 56 | Hungarian Gypsy - Exotic - Double Harmonic | | 1/2 Tone | 1 1/2 Tones A 2nd | 1/2 Tone | Tone | 1/2 Tone | 1 1/2 Tones A 2nd | 1/2 Tone | | |
| 57 | Persian | | 1/2 Tone | 1 1/2 Tones A 2nd | 1/2 Tone | 1/2 Tone | Tone | 1 1/2 Tones A 2nd | 1/2 Tone | | |
| 58 | Oriental - Wollet | | 1/2 Tone | 1 1/2 Tones A 2nd | 1/2 Tone | 1/2 Tone | 1 1/2 Tones A 2nd | Tone | 1/2 Tone | | |
| 59 | Oriental - Bohemia - Hungarian Minor - Magyr | | Tone | 1/2 Tone | 1 1/2 Tones A 2nd | 1/2 Tone | 1/2 Tone | 1 1/2 Tones A 2nd | 1/2 Tone | | |
| 60 | Egyptian | | 1/2 Tone | Tone | 1 1/2 Tones A 2nd | 1/2 Tone | 1 1/2 Tones A 2nd | Tone | 1/2 Tone | | |

Eight Notes Scales — Heptaphonics

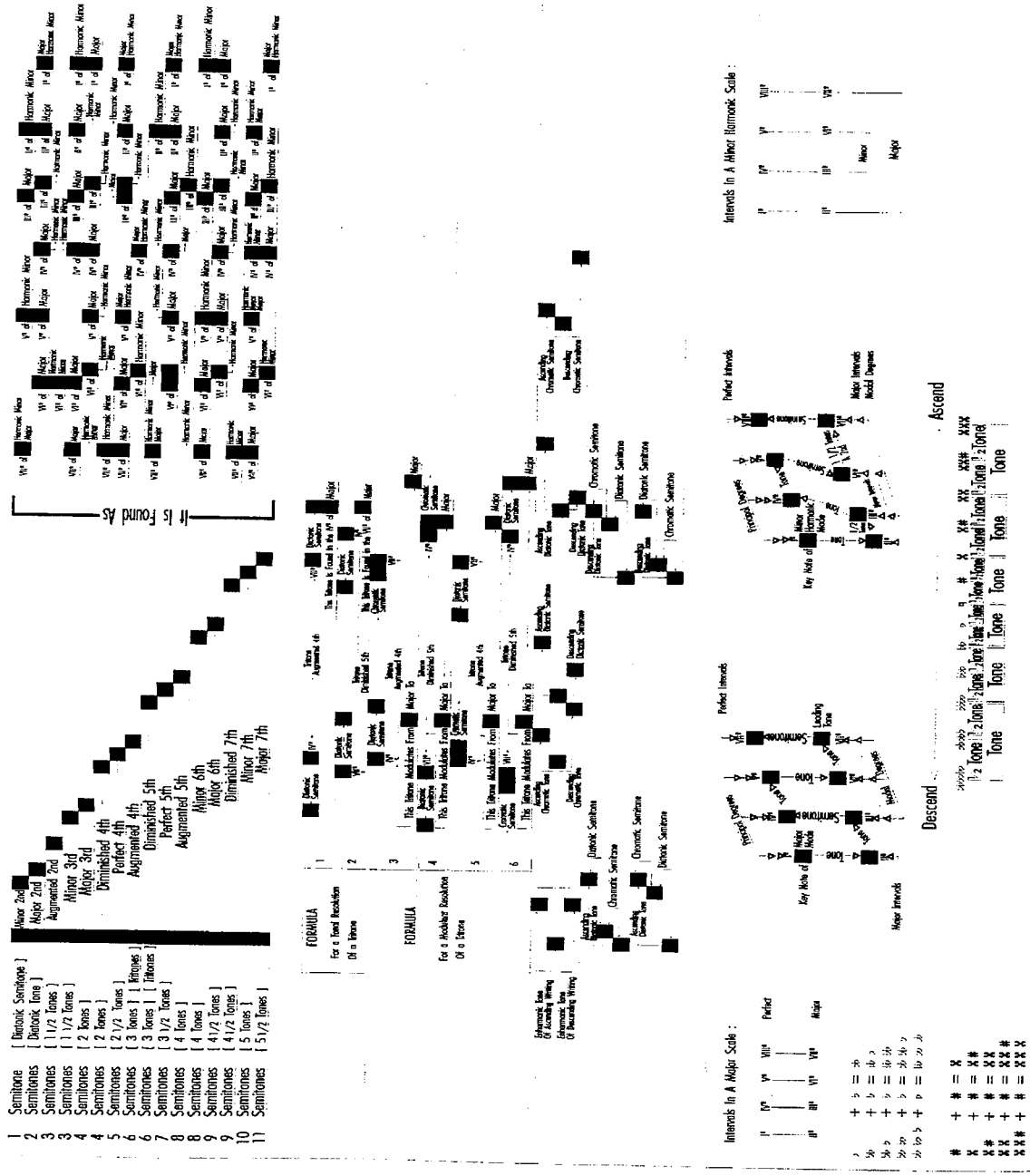

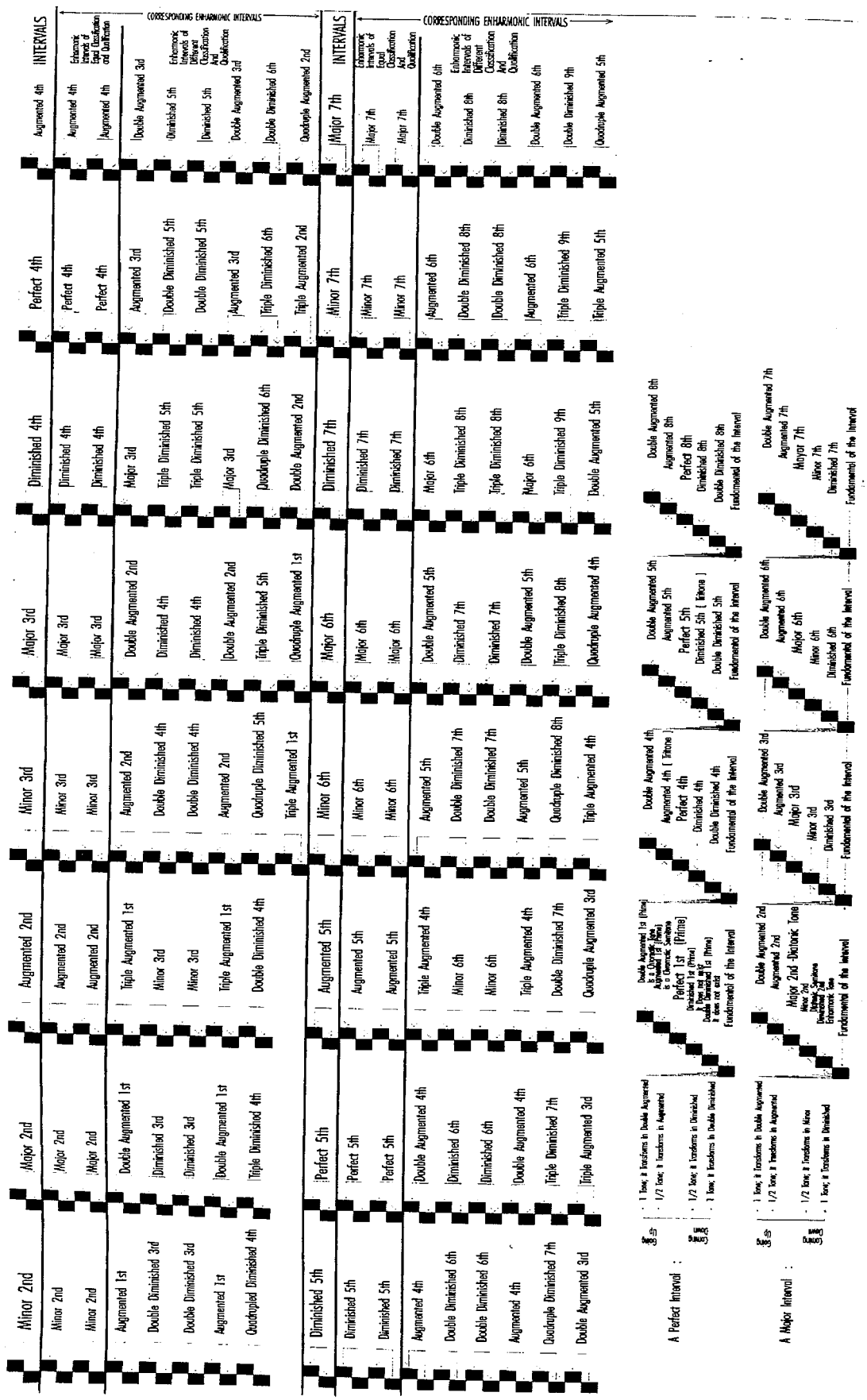

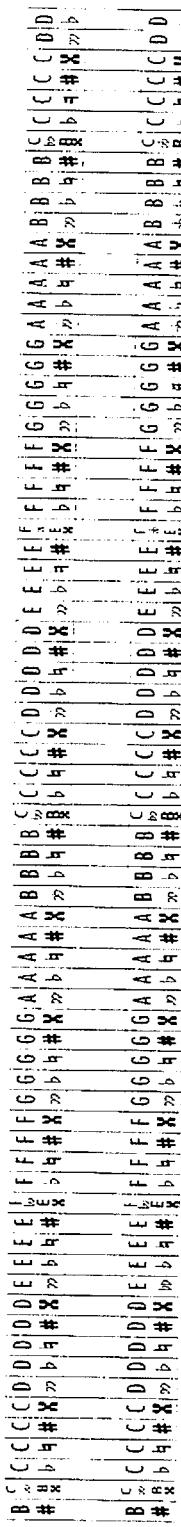

ANALYTICAL REFERENCE SLIDE-RULE OF INTERVALS
AND
THEIR INVERSIONS    By Karl Mayr

| | | | | | | | | | | | | | | | | | | | | | | | | |
|---|---|---|---|---|---|---|---|---|---|---|---|---|---|---|---|---|---|---|---|---|---|---|---|---|
| 7 | Diatonic Tone | | | | | | | | | | | | | | | | | | | | | | | |
| 6 | Diatonic Semitone | | | | | | | | | | | | | | | | | | | | | | | |
| 5 | Enharmonic Tones | | | | | | | | | | | | | | | | | | | | | | | |
| 4 | Chromatic Tone | | | | | | | | | | | | | | | | | | | | | | | |
| 3 | Chromatic Semitone | | | | | | | | | | | | | | | | | | | | | | | |
| 2 | Prime - Unison | | | | | | | | | | | | | | | | | | | | | | | |
| 1 | Key of the Interval | | | | | | | | | | | | | | | | | | | | | | | |
| | Number of Tones in the Interval | 0 | ½ | 1 | 1 | 1½ | 2 | 2 | 2½ | 3 | 3 | 3½ | 4 | 4½ | 5 | 5 | 5½ | 6 | | | | | | |
| | Number of ½ Tones in the Interval | 0 | 1 | 2 | 2 | 3 | 4 | 5 | 5 | 6 | 7 | 8 | 8 | 9 | 10 | 10 | 11 | 12 | | | | | | |
| | Qualification of the Interval | P | aug | 2aug | dim | m | M | aug | 2dim | dim | m | M | aug | dim | m | M | aug | 2dim | dim | P | | | | |
| | Classification of the Interval | 1st | 1st | 1st | 2nd | 2nd | 2nd | 2nd | 3rd | 3rd | 3rd | 3rd | 4th | 4th | 4th | 5th | 5th | 5th | 6th | 6th | 6th | 7th | 7th | 7th | 8th |

(Slide-rule with inversion scale)

| | | | | | | | | | | | | | | | | | | | | | | | | |
|---|---|---|---|---|---|---|---|---|---|---|---|---|---|---|---|---|---|---|---|---|---|---|---|---|
| | Classification in the Inversion of the Interval | 8th | 7th | 7th | 7th | 6th | 6th | 6th | 5th | 5th | 5th | 4th | 4th | 4th | 3rd | 3rd | 3rd | 2nd | 2nd | 2nd | 1st | 1st | 1st | |
| | Qualification in the Inversion of the Interval | P | dim | 2dim | aug | M | m | dim | 2aug | P | aug | M | m | dim | aug | M | m | dim | aug | M | m | dim | aug | P | |
| | Number of ½ Tones in the Inversion of the Interval | 12 | 11 | 10 | 10 | 9 | 8 | 8 | 7 | 7 | 6 | 5 | 4 | 4 | 3 | 2 | 2 | 1 | 1 | 0 | 0 | | | | |
| | Number of Tones in the Inversion of the Interval | 6 | 5½ | 5 | 5 | 4½ | 4 | 4 | 3½ | 3 | 3 | 2½ | 2 | 2 | 1½ | 1 | 1 | ½ | ½ | 0 | 0 | | | | |

© 1993 Mayr-Bräuer, San Jose, CA. All Rights Reserved

- A Major Interval Inverts into a Minor one
- A Minor Interval Inverts into a Major one
- An Augmented Interval Inverts into a Diminished one
- A Diminished Interval Inverts into an Augmented one
- A Perfect Interval Inverts into a Perfect one

```
INTERVALS
IN A MAJOR SCALE :     1       4       5               8          PERFECT
                           3               6                      MINOR
                       2           4               7              MAJOR

INTERVALS
IN A HARMONIC MINOR SCALE :  1       4       5               8    PERFECT
                                 3           6           7        MINOR
                             2           4               7        MAJOR

INTERVALS     1 - 2 - 3 - 4 - 5 - 6 - 7 - 8
INVERSION     8 - 7 - 6 - 5 - 4 - 3 - 2 - 1
TOTAL         9 - 9 - 9 - 9 - 9 - 9 - 9 - 9
```

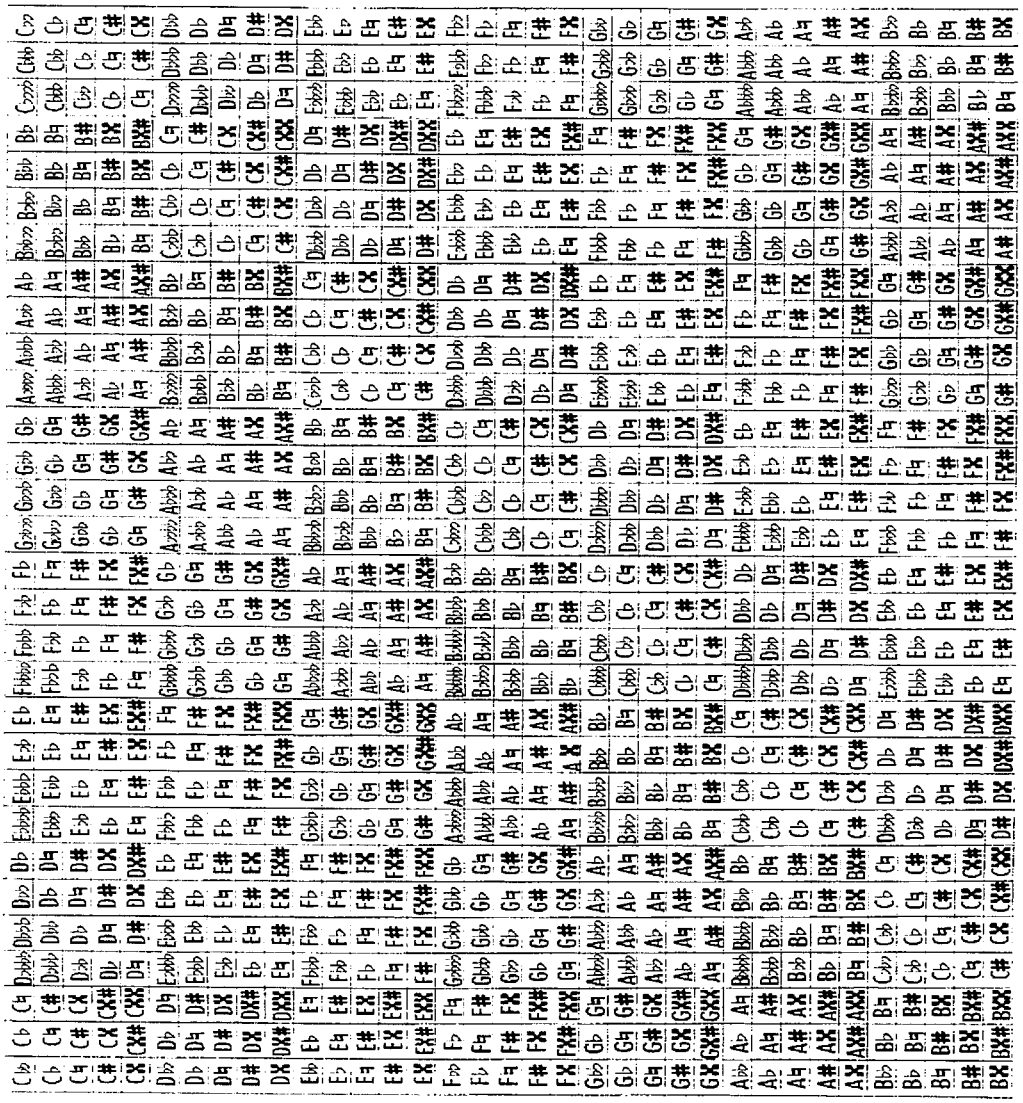

ANALYTICAL REFERENCE SLIDE-RULE OF KEY SIGNATURE IN 7 CLEFS

By Karl Mayr

© 1993 Mayr-Behuer, San Jose, CA. All Rights Reserved

NUMBERS CORRESPONDING TO THE LIST OF SCALES 1-2-3-4-5-6-7-9-11-13-16-17-28-29-31-39-44-45-46-47-48-50-55-56
1-2-26-33
8-19-20-22-24-34-52-53-60
35-40
10-15-27-36-49-54
7-14-25-32-37-42-43-51-59
18-21-23-30-38-41-57-58

ACCIDENTALS OR ALTERATIONS

Descend — Ascend
♭♭  ♭  ♮  ♯  𝄪
1/2 Tone  1/2 Tone 1/2 Tone  1/2 Tone
Tone       Tone
1 1/2 Tones    1 1/2 Tones
2 Tones

- ♭♭ — Double Flat
- ♭ — Flat
- ♮ — Natural
- ♯ — Sharp
- 𝄪 — Double Sharp

Clefs

- G Clef in 2nd Line
- C Clef in 1st Line
- C Clef in 2nd Line
- C Clef in 3rd Line
- C Clef in 4th Line
- C Clef in 5th Line or F Clef in 3rd Line
- F Clef in 4th Line

Voice Clefs
- Treble / Soprano, Mezzo Soprano, Alto
- Soprano
- Mezzo - Soprano
- Alto
- Tenor
- Baritone
- Tenor / Baritone / Bass

Woodwind Clefs
Piccolo / Flute / Oboe
Alto Flute / English Horn
Oboe d'Amore / Saxophone
Bassoon / Clarinet
Bass Clarinet

- English Horn
- Bassoon / Contrabassoon
- Bass Clarinet / Bassoon / Contrabassoon

Brass Clefs
Horn / Cornet / Trumpet
Baritone (Euphonium)

- Trombone
- Trombone
- Horn / Baritone (Euphonium) / Trombone / Tuba / Organ (Bass)

Percussion Clefs
Antique Cymbals / Chimes / Tubular Bells / Glockenspiel / Marimba / Vibraphone / Xylophone

- Timpani

Strings Clefs
Violin I - II / Viola / Violoncello / Double Bass / Harp

- Viola / Double Bass
- Violoncello / Double Bass
- Harp / Violoncello / Double Bass

Keyboard Clefs
Celesta / Harpsichord / Piano Right Hand / Organ Right Hand

- Harpsichord / Piano Left Hand / Organ Left Hand / Organ Pedal

Ranges

Low Range · Middle Range · High Range
- F Clef in 4th Line
- C Clef in 5th Line
- C Clef in 4th Line
- C Clef in 3rd Line
- C Clef in 2nd Line
- C Clef in 1st Line
- G Clef in 2nd Line
- F Clef in 4th Line

CDEFG ABCDEFG
CBAGF EDCBAGF

| | | | | | | | | | | | | | |
|---|---|---|---|---|---|---|---|---|---|---|---|---|---|
| C | F | B♭ | E♭ | A♭ | D♭ | G♭ | C♭ | F♭ | B♭♭ | E♭♭ | A♭♭ | D♭♭ | G♭♭ |
| D | G | C | F | B♭ | E♭ | A♭ | D♭ | G♭ | C♭ | F♭ | B♭♭ | E♭♭ | A♭♭ |
| E | A | D | G | C | F | B♭ | E♭ | A♭ | D♭ | G♭ | C♭ | F♭ | B♭♭ |
| F | B♭ | E♭ | A♭ | D♭ | G♭ | C♭ | F♭ | B♭♭ | E♭♭ | A♭♭ | D♭♭ | G♭♭ | C♭♭ |
| G | C | F | B♭ | E♭ | A♭ | D♭ | G♭ | C♭ | F♭ | B♭♭ | E♭♭ | A♭♭ | D♭♭ |
| A | D | G | C | F | B♭ | E♭ | A♭ | D♭ | G♭ | C♭ | F♭ | B♭♭ | E♭♭ |
| B | E | A | D | G | C | F | B♭ | E♭ | A♭ | D♭ | G♭ | C♭ | F♭ |

| | | | | | | | | | | | | | |
|---|---|---|---|---|---|---|---|---|---|---|---|---|---|
| C | G | D | A | E | B | F# | C# | G# | D# | A# | E# | B# | F𝄪 |
| D | A | E | B | F# | C# | G# | D# | A# | E# | B# | F𝄪 | C𝄪 | G𝄪 |
| E | B | F# | C# | G# | D# | A# | E# | B# | F𝄪 | C𝄪 | G𝄪 | D𝄪 | A𝄪 |
| F | C | G | D | A | E | B | F# | C# | G# | D# | A# | E# | B# |
| G | D | A | E | B | F# | C# | G# | D# | A# | E# | B# | F𝄪 | C𝄪 |
| A | E | B | F# | C# | G# | D# | A# | E# | B# | F𝄪 | C𝄪 | G𝄪 | D𝄪 |
| B | F# | C# | G# | D# | A# | E# | B# | F𝄪 | C𝄪 | G𝄪 | D𝄪 | A𝄪 | E𝄪 |

© 1993 MoynBäuer, San Jose, CA. All Rights Reserved

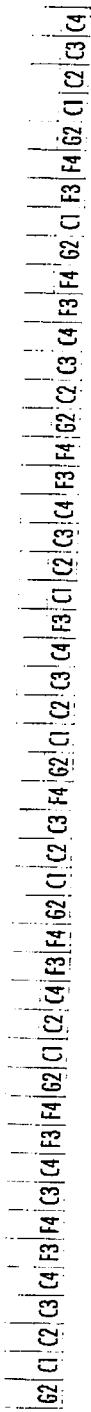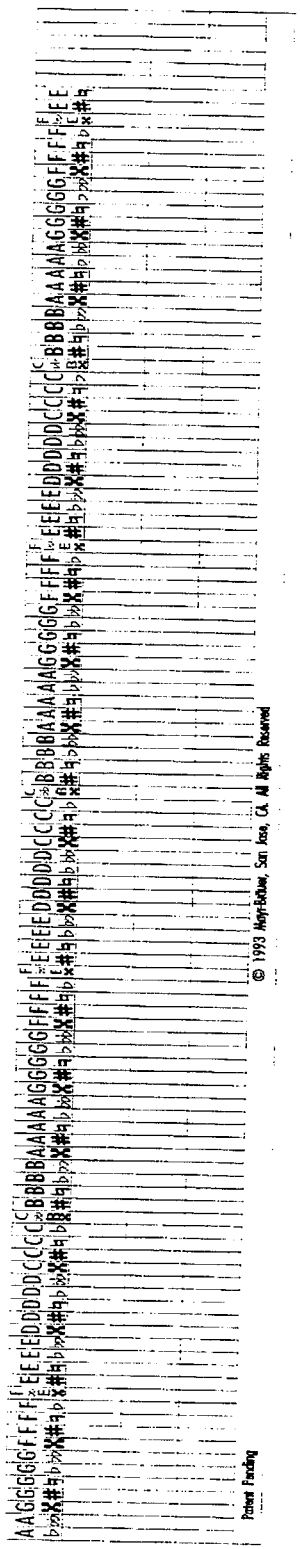

What is claimed is:

1. A music information reference device comprising:
   a) a substantially flat sleeve body of thin sheet material having a front surface and a back surface and two opposing open ends, said body including:
      (1) apertures disposing spatially arranged in a predetermined array on at least one of said front or back surfaces; and
      (2) first music indicia disposed visible on at least one of said front or back surfaces in cooperative association with at least selected ones of said apertures;
   b) a slide of said thin sheet material having a front side and a back side, said side having second music indicia disposed visible on at least one of said front or back sides, with said first music indicia of said body and at least some of said apertures visible therethrough;
   c) said slide movably disposed between said front and back surfaces of said body, portion of the slide extending beyond at least one of said opposing ends of said body for moving the slide to a desired location relative to said apertures of said body for displaying therethrough segments of said second music indicia, which when read cooperatively with said first music indicia displays substantially all music information related to natural and artificial chords, scales, intervals, inversions of intervals, transpositions, key signatures, instrument transpositions and clef transpositions.

2. A music information reference device as in claim 1 wherein said second music indicia includes an array of repeated, sequentially ordered sets of music notes universally useable to display in cooperation with said first music indicia substantially all music information related to natural and artificial chords, scales, intervals, and transpositions, and any note of said sequence set of notes is interchangeably selectable as the beginning note of said note sequence set depending upon the music information to be displayed and said note set is reversible in sequence depending upon the music information to be displayed.

3. A music information reference device as in claim 2 wherein said set of music notes comprises the notes of C natural, C sharp, C double sharp, D double flat, D flat, D natural, D double sharp, E double flat, E flat, E natural, E sharp, F double flat or E double sharp, F flat, F natural, F sharp, F double sharp, G double flat, G flat, G natural, G sharp, G double sharp, A double flat, A flat, A natural, A sharp, A double sharp, B double flat, B flat, B natural, B sharp, C double flat or B double sharp, and C flat.

4. A music information reference device as in claim 1 wherein said sheet material is selected from plastic, paper, cardboard, light gauge metal or the like.

5. A music information reference device as in claim 1 wherein said sleeve body and said slide interrelated indicia and apertures are operatively divided into a plurality of physically separate and distinct but cooperatingly interrelated slide and sleeve assemblies to provide an interrelated music reference system for the analysis and composition of music, including at least two selected from among:
   a) a first slide/sleeve assembly displaying substantially all music information related to said chords;
   b) a second slide/sleeve assembly displaying substantially all music information related to said scales;
   c) a third slide/sleeve assembly displaying substantially all music information related to said intervals;
   d) a fourth slide/sleeve assembly displaying substantially all music information related to said transpositions;
   e) a fifth slide/sleeve assembly displaying substantially all music information related to said intervals and their inversions;
   f) a sixth slide/sleeve assembly displaying substantially all music information related to said key signatures;
   g) a seventh slide/sleeve assembly displaying substantially all music information related to said instrument transpositions; and
   h) an eighth slide/sleeve assembly displaying substantially all music information related to said clef transpositions.

6. A music information reference system having first and second music indicia, the improvement comprising:
   a) said first music indica includes cooperatively positioned locations for the selective display of a plurality of second music indicia, said first music indicia defines the spatial relationships of said second music indicia as displayed in said cooperative locations, said spatial relationships includes substantially all natural and artificial chords, scales, intervals, inversions of intervals, transpositions, key signatures, instrument transpositions and clef transpositions;
   b) a database of music notes from which said plurality of second music indicia is determined for display in said cooperative locations to said first music indicia; and
   c) means for generating from selected ones of said music notes said second music indicia, and automatically displaying said second music indicia in said cooperative locations.

7. A music reference system as in claim 6 wherein:
   a) said means for generating said second music indicia based on said selection of said music note(s) includes a microprocessor.

8. A music reference system as in claim 7 wherein:
   a) said second indicia are displayed on a screen.

* * * * *